(12) United States Patent
Yang et al.

(10) Patent No.: US 10,573,932 B2
(45) Date of Patent: Feb. 25, 2020

(54) HIGH CAPACITY CORROSION RESISTANT V-BASED METAL HYDRIDE ELECTRODES FOR RECHARGEABLE METAL HYDRIDE BATTERIES

(71) Applicant: CALIFORNIA INSTITUTE OF TECHNOLOGY, Pasadena, CA (US)

(72) Inventors: Heng Yang, Pasadena, CA (US); Nicholas J. Weadock, Pasadena, CA (US); Brent T. Fultz, Pasadena, CA (US); Bryce W. Edwards, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 64 days.

(21) Appl. No.: 15/996,380

(22) Filed: Jun. 1, 2018

(65) Prior Publication Data
US 2019/0006718 A1 Jan. 3, 2019

Related U.S. Application Data

(60) Provisional application No. 62/514,619, filed on Jun. 2, 2017.

(51) Int. Cl.
*H01M 10/34* (2006.01)
*C25B 11/04* (2006.01)
(Continued)

(52) U.S. Cl.
CPC ............ *H01M 10/345* (2013.01); *B22F 7/08* (2013.01); *C22C 1/045* (2013.01); *C22C 32/0026* (2013.01); *C22C 32/0031* (2013.01); *C25B 11/04* (2013.01); *H01M 4/242* (2013.01); *H01M 4/32* (2013.01); *H01M 4/383* (2013.01);
(Continued)

(58) Field of Classification Search
None
See application file for complete search history.

(56) References Cited

U.S. PATENT DOCUMENTS

| 6,040,087 A | 3/2000 | Kawakami |
| 2016/0285130 A1 | 9/2016 | Meng et al. |

FOREIGN PATENT DOCUMENTS

| JP | 08-190931 A | 7/1996 |
| WO | WO 2018/223091 A2 | 12/2018 |

OTHER PUBLICATIONS

Al-Kharafi et al. (1997) "Electrochemical behaviour of vanadium in aqueous solutions of different pH," Electrochimica Acta 42(4): 579-586.

(Continued)

*Primary Examiner* — Wyatt P McConnell
(74) *Attorney, Agent, or Firm* — Leydig, Voit & Mayer, Ltd.

(57) ABSTRACT

In an aspect, an electrochemical cell comprises: a positive electrode; a negative electrode, said negative electrode having an alloy having a composition comprising V; and an electrolyte; wherein an additive is provided in said electrolyte to form primary vanadate ions upon dissociation of said additive in said electrolyte; and wherein the electrochemical cell is a metal hydride battery. In some embodiments of this aspect, the alloy is configured to sorb hydrogen during charging of said electrochemical cell and desorb hydrogen during discharging of said electrochemical cell. In some embodiments of this aspect, the electrolyte has a pH selected from the range of 13 to 15.

29 Claims, 25 Drawing Sheets

(51) Int. Cl.
*H01M 4/38* (2006.01)
*C22C 32/00* (2006.01)
*H01M 4/32* (2006.01)
*H01M 10/44* (2006.01)
*H01M 4/24* (2006.01)
*C22C 1/04* (2006.01)
*B22F 7/08* (2006.01)

(52) U.S. Cl.
CPC ......... *H01M 10/44* (2013.01); *B22F 2998/10* (2013.01); *C22C 2200/00* (2013.01); *H01M 2300/0014* (2013.01)

(56) References Cited

OTHER PUBLICATIONS

Beverskog et al. (1997) "Revised pourbaix diagrams for chromium at 25-300 ° C.," Corrosion Science 39(1): 43-57.
Beverskog et al. (1997) "Revised Pourbaix diagrams for nickel at 25-300 ° C.," Corrosion Science 39(5): 969-980.
Burch et al. (1979) "Absorption of hydrogen by titanium—cobalt and titanium—nickel intermetallic alloys. Part 1.—Experimental results," Journal of the Chemical Society, Faraday Transactions 1: Physical Chemistry in Condensed Phases 75(0): 561-577.
Choi et al. (Mar. 2016) "Promise and reality of post-lithium-ion batteries with high energy densities," Nature Reviews Materials 1: 1-16.
Electricfuel (2015) "Electric Fuel Air Electrodes," http://electric-fuel.com/rd/zinc-air/air-electrode/.
Evans (1960) "Crystal structure refinement and vanadium bonding in the metavanadates $KVO_3$, $NH_4VO_3$ and $KVO_3H_2O$," Zeitschrift für Kristallographie—Crystalline Materials 114(1-6): 257-277.
Guo et al. (2003) "The effect of Ni content on the phase structures and electrochemical properties of $V_{2.1}TiNi_x$ (x=0.1-0.9) hydrogen storage alloys," International Journal of Hydrogen Energy 28(8): 803-808.
Hill et al. (1971) "Thermochemistry and oxidation potentials of vanadium, niobium, and tantalum," Chemical Reviews 71(1): 127-137.
Howard et al. (2007) "Theoretical evaluation of high-energy lithium metal phosphate cathode materials in Li-ion batteries," Journal of Power Sources 165(2): 887-891.
Inoue et al. (1996) "Crystallographic and electrochemical characterization of $TiV_{4-x}Ni_x$ alloys for nickel-metal hydride batteries," Electrochimica Acta 41(6): 937-939.
Inoue et al. (2002) "Charge—discharge characteristics of $TiV_{2.1}Ni_{0.3}$ alloy surface-modified by ball-milling with Ni or Raney Ni," Journal of Alloys and Compounds 330: 597-600.
Inoue et al. (2012) "Charge—discharge performance of Cr-substituted V-based hydrogen storage alloy negative electrodes for use in nickel-metal hydride batteries," Electrochimica Acta 59: 23-31.
Inoue et al. (Oct. 2015) "High capacity hydrogen storage alloy negative electrodes for use in nickel-metal hydride batteries," Journal of Alloys and Compounds 645(Suppl 1): S136-S139.
Iwakura et al. (2000) "Electrochemical and Structural Characterization of Ti—V—Ni Hydrogen Storage Alloys with BCC Structure," Journal of the Electrochemical Society 147(7): 2503-2506.
Kagawa et al. (1991) "Absorption of hydrogen by vanadium-rich V—Ti-based alloys," Journal of the Less Common Metals 172(A): 64-70.
Kim et al. (2003) "A study on the improvement of the cyclic durability by Cr substitution in V—Ti alloy and surface modification by the ball-milling process," Journal of Alloys and Compounds 348(1-2): 293-300.
Libowitz et al. (1988) "Hydride Formation by B.C.C. Solid Solution Alloys," Materials Science Forum 31: 177-196.
Liu et al. (2008) "Intrinsic/Extrinsic Degradation of Ti—V-Based Hydrogen Storage Electrode Alloys upon Cycling," The Journal of Physical Chemistry C 112(42): 16682-16690.
Liu et al. (2012) "The redox behavior of vanadium in alkaline solutions by cyclic voltammetry method," Electrochimica Acta 76: 262-269.
Maeland et al. (1961) "A Novel Hydride of Vanadium," Journal of the American Chemical Society 83(17): 3728-3729.
Noonan et al. (2012) "Phosphonium-Functionalized Polyethylene: A New Class of Base-Stable Alkaline Anion Exchange Membranes," Journal of the American Chemical Society 134(44): 18161-18164.
Ono et al. (1980) "The reaction of hydrogen with alloys of vanadium and titanium," Journal of the Less Common Metals 72(2): 159-165.
Pjescic et al. (2002) "Investigation of titanium corrosion in concentrated NaOH solutions," Materials and Corrosion 53(1): 44-50.
Post et al. (1976) "Thermodynamic diagrams for the vanadium-water system at 298•15K," Electrochimica Acta 21(6): 401-405.
Purushothaman et al. (2012) "Analysis of Pressure Variations in a Low-Pressure Nickel-Hydrogen Battery—Part 2: Cells with Metal Hydride Storage," J. Power Sources 206: 421-428.
Reilly et al. (1970) "The higher hydrides of vanadium and niobium," Inorganic Chemistry 9(7): 1678-1682.
Sakai et al. (1992) "Rechargeable hydrogen batteries using rare-earth-based hydrogen storage alloys," Journal of Alloys and Compounds 180(1-2): 37-54.
Sakai et al. (1993) "Nickel-metal hydride battery for electric vehicles," Journal of Alloys and Compounds 192(1-2): 158-160.
Schrebler Guzman et al. (1978) "The kinetics and mechanism of the nickel electrode—III. The potentiodynamic response of nickel electrodes in alkaline solutions in the potential region of $Ni(OH)_2$ formation," Corrosion Science 18(8): 765-778.
Search Report and Written Opinion, dated Feb. 28, 2019, corresponding to International Application No. PCT/US2018/035739 (filed Jun. 1, 2018), related to the present application, 12 pp.
Shangguan et al. (2013) "Sodium tungstate as electrolyte additive to improve high-temperature performance of nickel-metal hydride batteries," International Journal of Hydrogen Energy 38(12): 5133-5138.
Sun et al. (publicly available Jul. 2015) "Electrochemical hydrogen storage properties of $Ti_{1.4}V_{0.6}Ni$ alloy comprising quasicrystal coating with Cu," Journal of Alloys and Compounds 650: 15-21 (published Nov. 2015).
Tsukahara et al. (1995) "Phase structure of V-based solid solutions containing Ti and Ni and their hydrogen absorption-desorption properties," Journal of Alloys and Compounds 224(1): 162-167.
Tsukahara et al. (1995) "Metal hydride electrodes based on solid solution type alloy $TiV_3Ni_x$ (0≤x≤0.75)," Journal of Alloys and Compounds 226(1-2): 203-207.
Tsukahara et al. (1995) "The $TiV_3Ni_{0.56}$ hydride electrode: its electrochemical and cycle life characterization," Journal of Alloys and Compounds 231(1-2): 616-620.
Tsukahara et al. (1996) "Heat-treatment effects of V-based solid solution alloy with TiNi-based network structure on hydrogen storage and electrode properties," Journal of Alloys and Compounds 243(1-2): 133-138.
Tsukahara et al. (1999) "Improvement of the cycle stability of vanadium-based alloy for nickel-metal hydride (Ni—MH) battery," Journal of Alloys and Compounds 287(1-2): 215-220.
Van Vucht et al. (1970) "Reversible Room-Temperature Absorption of Large Quantities of Hydrogen by Intermetallic Compounds," Philips Res. Rept. 25: 133-140.
Wang et al. (2006) "Grain size effect in corrosion behavior of electrodeposited nanocrystalline Ni coatings in alkaline solution," Scripta Materialia 55(7): 657-660.
Wilhelmsen et al. (1987) "Passive behaviour of titanium in alkaline solution," Electrochimica Acta 32(1): 85-89.
Yang et al. (2010) "Low temperature electrochemical properties of $LaNi_{4.6-x}Mn_{0.4}M_x$ (M=Fe or Ce) and effect of oxide layer on EIS responses in metal hybride electrodes," Electrochemica Acta 55(3):648-655.

(56) References Cited

OTHER PUBLICATIONS

Yang et al. (Sep. 2017) "High capacity V-based metal hydride electrodes for rechargeable batteries," Journal of Materials Chemistry A (41): 10 pp.
Yu et al. (2004) "A Ti—V-based bcc phase alloy for use as metal hydride electrode with high discharge capacity," The Journal of Chemical Physics 121(2): 987-990.
Yukawa et al. (2002) "Alloying Effects on the Phase Stability of Hydrides Formed in Vanadium Alloys," Materials Transactions 43(11): 2757-2762.

U (V) = -0.027 - 0.0000592 J - 0.000000236 J^2

HIGH CAPACITY CORROSION RESISTANT V-BASED METAL HYDRIDE ELECTRODES FOR RECHARGEABLE METAL HYDRIDE BATTERIES

CROSS-REFERENCE TO RELATED APPLICATIONS

This application claims the benefit of priority to U.S. Provisional Patent Application No. 62/514,619, filed Jun. 2, 2017, which is hereby incorporated by reference in its entirety.

STATEMENT REGARDING FEDERALLY SPONSORED RESEARCH OR DEVELOPMENT

This invention was made with government support under Grant No. DE-SC0001057 and under Grant No. DE-AR0000366 awarded by the U.S. Department of Energy. The government has certain rights in the invention.

BACKGROUND OF INVENTION

Metal hydride-based batteries provide a low-cost energy storage system as well as an alternative to Li-ion batteries, which face technical and commercial challenges associated with flammability. Metal hydride batteries operate, in part, via sorption of hydrogen at a negative electrode during charging and desorption of hydrogen at the negative electrode during discharging of the battery. In addition to practical consideration such as cost of materials, important considerations for a metal-hydride battery include the capacity of the negative electrode for storing hydrogen, the thermodynamic and kinetic barriers to storing and releasing the hydrogen, and the stability of the materials, particularly of the negative electrode.

Vanadium-based metal hydride batteries have been proposed, for example by Iwakura et al. (J. Electrochem. Soc., 2000, 147, 2503-2506), due to a theoretical (thermodynamic) maximum of some V-based materials to absorb up to 3.9 mass % of hydrogen, corresponding to a theoretical electrochemical capacity of 1041 mAh/g. In practice, however, V-based metal-hydride batteries have demonstrated significantly lower electrochemical capacities due, in part, to kinetic limitations (e.g., see H. Yukawa, et al., Mater. Trans., 2000, 43, 2757-2762). Another significant challenge for and barrier to commercialization of V-based metal-hydride batteries is the degradation of the metal hydride electrode in the electrolyte (e.g., see Iwakura, et al. J. Electrochem. Soc., 2000, 147, 2503-2506), for example via oxidation and dissolution of vanadium from the electrode. As a result, conventional V-based metal hydride batteries have limited cycle stability, for example, losing a third of the capacity over 10 cycles.

In view of the above, there remains a need for V-based electrochemical systems, including V-based metal hydride batteries, which demonstrate improved stability and capacities. Provided herein are electrochemical systems, and associated methods, that address these, and other challenges.

SUMMARY OF THE INVENTION

Provided herein are a class of electrochemical cells, and associated methods for forming and operating these electrochemical cells, which address challenges related to limited stability and capacity of conventional electrochemical systems such as those including metal hydride electrodes that comprise vanadium. The electrochemical cells disclosed herein include one or plurality of approaches for improving stability, such as increasing discharge-capacity stability. In some embodiments, for example, the electrochemical cells disclosed herein have a negative electrode having an alloy that comprises vanadium and chromium. In some embodiments, for example, an additive is provided in an electrolyte of the electrochemical cell, where the additive dissociates into vanadate ions. These, and other approaches discloses here, increase the (electro)chemical stability of the negative electrode by slowing or otherwise limiting the processes that oxidize and/or otherwise degrade V-containing alloy(s) of the negative electrode.

In an aspect, an electrochemical cell comprises: a positive electrode; a negative electrode, said negative electrode having an alloy having a composition comprising V; and an electrolyte; wherein an additive is provided in said electrolyte to form primary vanadate ions upon dissociation of said additive in said electrolyte; and wherein the electrochemical cell is a metal hydride battery. In some embodiments of this aspect, the alloy is configured to sorb hydrogen during charging of said electrochemical cell and desorb hydrogen during discharging of said electrochemical cell.

In an aspect, an electrochemical cell comprises: a positive electrode; a negative electrode, said negative electrode having an alloy that is configured to sorb hydrogen during charging of said electrochemical cell and desorb hydrogen during discharging of said electrochemical cell; wherein said alloy has a composition comprising V and Cr; and an electrolyte; wherein an additive is provided in said electrolyte to form primary vanadate ions upon dissociation of said additive in said electrolyte. In some embodiments of this aspect, the electrolyte has a pH selected from the range of 13 to 15. In some embodiments of this aspect, the electrochemical cell is a metal hydride battery.

In an aspect, an electrochemical cell comprises: a positive electrode; a negative electrode, said negative electrode having an alloy that is configured to sorb hydrogen during charging of said electrochemical cell and desorb hydrogen during discharging of said electrochemical cell; wherein said alloy has a composition comprising V and Cr; and an electrolyte; wherein said electrolyte has a pH selected from the range of 13 to 15. In some embodiments of this aspect, an additive is provided in said electrolyte to form primary vanadate ions upon dissociation of said additive in said electrolyte. In some embodiments of this aspect, the electrochemical cell is a metal hydride battery.

In an aspect, a method for operating an electrochemical cell comprises steps of: providing an electrochemical cell, the electrochemical cell comprising: positive electrode; a negative electrode, said negative electrode having an alloy that is configured to sorb hydrogen during charging of said electrochemical cell and desorb hydrogen during discharging of said electrochemical cell; wherein said alloy has a composition comprising V; and an electrolyte; wherein an additive is provided in said electrolyte to form primary vanadate ions upon dissociation of said additive in said electrolyte; and applying a cell cut-off voltage during discharging of said electrochemical cell, or applying an electrode cut-off potential during discharge of said electrochemical cell. In some embodiments of this aspect: (i) said alloy comprises V and Cr; and/or (ii) the method further comprises a step of monitoring a cell voltage of said electrochemical cell; and/or (iii) the cell cut-off voltage is 1.10 V; and/or (iv) the electrode cut-off potential is selected from the range equivalent to −0.65 V to −0.75 V vs. Hg/HgO reference electrode in said electrolyte having a pH in the range of 14 to 15; and/or (v) the step of applying a cell cut-off voltage comprises a step of determining said cell cut-off voltage; and/or (vi) the step of applying an electrode cut-off potential comprises a step of determining said electrode cut-off potential; and/or (vii) the electrochemical cell is a metal hydride battery.

In an aspect, a method for forming an electrochemical cell comprises steps of: providing an electrochemical cell, the electrochemical cell comprising: a positive electrode; a negative electrode, said negative electrode having an alloy; wherein said alloy has a composition comprising V; and an electrolyte; providing an additive in said electrolyte to form primary vanadate ions upon dissociation of said additive in said electrolyte; and wherein said electrochemical cell is a metal hydride battery. In some embodiments, of this aspect, the alloy is configured to sorb hydrogen during charging of said electrochemical cell and desorb hydrogen during discharging of said electrochemical cell. In some embodiments of this aspect, the said electrolyte has a pH selected from the range of 13 to 15.

In an aspect, a method for forming an electrochemical cell comprises steps of: providing an electrochemical cell, the electrochemical cell comprising: a positive electrode; a negative electrode, said negative electrode having an alloy that is configured to sorb hydrogen during charging of said electrochemical cell and desorb hydrogen during discharging of said electrochemical cell; wherein said alloy has a composition comprising V and Cr; and an electrolyte; providing an additive in said electrolyte to form primary vanadate ions upon dissociation of said additive in said electrolyte; and wherein said electrochemical cell is a metal hydride battery. In some embodiments of this aspect, the said electrolyte has a pH selected from the range of 13 to 15. In some embodiments of this aspect, the electrochemical cell is a metal hydride battery.

In an aspect, a method for forming an electrochemical cell comprises steps of: providing an electrochemical cell, the electrochemical cell comprising: a positive electrode; a negative electrode, said negative electrode having an alloy that is configured to sorb hydrogen during charging of said electrochemical cell and desorb hydrogen during discharging of said electrochemical cell; wherein said alloy has a composition comprising V and Cr; and an electrolyte; wherein said electrolyte has a pH selected from the range of 13 to 15. In some embodiments of this aspect, an additive is provided in said electrolyte to form primary vanadate ions upon dissociation of said additive in said electrolyte. In some embodiments of this aspect, the electrochemical cell is a metal hydride battery.

In some embodiments of the electrochemical cells disclosed herein, an additive is provided in said electrolyte to form primary vanadate ions upon dissociation of said additive in said electrolyte. In those embodiments where an additive is provided in the electrolyte, a concentration of said primary vanadate ions in said electrolyte may be selected from the range of 5 mM to 500 mM. In those embodiments where an additive is provided in the electrolyte, said vanadate ions may be $VO_4^{3-}$ ions. In those embodiments where an additive is provided in the electrolyte, said additive may be selected from the group consisting of $V_2O_3$, $V_2O_5$, V, $KVSO_4$, $Fe(VO_2)_3$, a salt having $VO_3^-$, and any combination thereof. In those embodiments where an additive is provided in the electrolyte, said additive may be selected from the group consisting of $V_2O_3$, $V_2O_5$, V, $KVSO_4$, $Fe(VO_2)_3$, $LiVO_3$, $NaVO_3$, $KVO_3$, $NH_4VO_3$, and any combination thereof. In those embodiments where an additive is provided in the electrolyte, said primary vanadate ions may provide for a discharge-capacity stability increase of at least 300% at 200 cycles compared to an otherwise equivalent electrochemical cell free of said primary vanadate ions. In those embodiments where an additive is provided in the electrolyte, said primary vanadate ions may provide for a discharge-capacity stability increase of at least 400% at 200 cycles compared to an otherwise equivalent electrochemical cell free of said primary vanadate ions.

In some embodiments of the electrochemical cells disclosed herein, said alloy composition comprises V, Cr, and at least one of Ti, Ni, Fe, Co, and Zr. In some embodiments of the electrochemical cells disclosed herein, said alloy composition comprises V, Cr, and at least two of Ti, Ni, Fe, Co, and Zr. In some embodiments of the electrochemical cells disclosed herein, said alloy composition comprises Ti, V, Ni, and Cr. In some embodiments of the electrochemical cells disclosed herein, said alloy composition comprises V, Cr, and at least three of Ti, Ni, Fe, Co, and Zr, said alloy composition has the formula $TiV_{2.1-x}Ni_{0.3}(Cr_yM_{1-y})_x$, where M is Fe, Co, or Zr, y is greater than 0 and less than or equal to 1, and x is greater than 0 and equal to or less than 0.4. In some embodiments of the electrochemical cells disclosed herein, said alloy composition has the formula $Ti_{29}V_{62-x}Ni_9(Cr_yM_{1-y})_x$, where M is Fe, Co, or Zr, y is greater than 0 and less than or equal to 1, and x is greater than 0 and equal to or less than 12. In some embodiments of the electrochemical cells disclosed herein, said alloy composition has the formula $Ti_{29}V_{62-x}Ni_9Cr_x$, where x is greater than 0 and equal to or less than 12. In some embodiments of the electrochemical cells disclosed herein, said alloy has a body centered cubic (BCC) crystal structure prior to a first cycle of said electrochemical cell. In some embodiments of the electrochemical cells disclosed herein, said alloy has a face centered cubic (FCC) crystal structure, a body center tetragonal (BCT) crystal structure, or a combination of these, during charging and discharging of said electrochemical cell. In some embodiments of the electrochemical cells disclosed herein, said alloy has a combination of FCC crystal structure and BCT crystal structure during charging and discharging of said electrochemical cell. In some embodiments of the electrochemical cells disclosed herein, a fraction of said alloy having said FCC crystal structure during charging of said electrochemical cell is greater than said fraction during discharging of said electrochemical cell. In some embodiments of the electrochemical cells disclosed herein, a fraction of said alloy having said BCT crystal structure during discharging of said electrochemical cell is greater than said fraction during charging of said electrochemical cell. In some embodiments of the electrochemical cells disclosed herein, a ratio of H to V in said alloy is selected from the range of 0.2 to 2 during charging and discharging of said electrochemical cell. In some embodiments of the electrochemical cells disclosed herein, a ratio of H to V in said alloy is selected from the range of 1 to 2 during charging and discharging of said electrochemical cell. In some embodiments of the electrochemical cells disclosed herein, a ratio of H to V in said alloy is selected from the range of 1 to less than 2 during charging and discharging of said electrochemical cell. In some embodiments of the electrochemical cells disclosed herein, a maximum hydrogen absorption capacity of said alloy is selected from the range of 2.8 mass % and 3.2 mass %.

In some embodiments of the electrochemical cells disclosed herein, said electrochemical cell has a discharge-capacity fade of less than or equal to 15% at 200 cycles. In some embodiments of the electrochemical cells disclosed herein, said electrochemical cell has a discharge-capacity fade of less than or equal to 5% at 200 cycles. In some embodiments of the electrochemical cells disclosed herein, said electrochemical cell has a reversible discharge capacity of at least 400 mAh/g at 200 cycles. In some embodiments of the electrochemical cells disclosed herein, said electrochemical cell has a reversible discharge capacity selected from the range of 400 to 600 mAh/g at 200 to 400 cycles. In some embodiments of the electrochemical cells disclosed herein, said electrochemical cell has a reversible discharge capacity of at least 500 mAh/g at 300 cycles. In some embodiments of the electrochemical cells disclosed herein, said electrochemical cell has a reversible discharge capacity of at least 400 mAh/g at 400 cycles.

In some embodiments of the electrochemical cells disclosed herein, the cell further comprises a circuit configured to apply a cell cut-off voltage to said electrochemical cell during discharge of said electrochemical cell. In some embodiments of the electrochemical cells disclosed herein, said cell cut-off voltage is 1.10 V. In some embodiments of the electrochemical cells disclosed herein, the cell further comprises a circuit configured to apply an electrode cut-off potential to said electrochemical cell during discharge of said electrochemical cell. In some embodiments of the electrochemical cells disclosed herein, said electrode cut-off potential is selected from the range equivalent to −0.65 V to −0.75 V vs. Hg/HgO reference electrode. In some embodiments of the electrochemical cells disclosed herein, said electrode cut-off potential is selected from the range equivalent to −0.65 V to −0.75 V vs. Hg/HgO reference electrode in said electrolyte having a pH in the range of 14 to 15. In some embodiments of the electrochemical cells disclosed herein, said electrode cut-off potential is equivalent to −0.75 V vs. Hg/HgO reference electrode in said electrolyte having a pH in the range of 15. In some embodiments of the electrochemical cells disclosed herein, said electrode cut-off potential is equivalent to −0.65 V vs. Hg/HgO reference electrode in said electrolyte having a pH in the range of 14.

In some embodiments of the electrochemical cells disclosed herein, said electrochemical cell has an irreversible discharge capacity of at least 800 mAh/g. In some embodiments of the electrochemical cells disclosed herein, said electrochemical cell has an irreversible discharge capacity selected from the range of 800 to 1000 mAh/g. In some embodiments of the electrochemical cells disclosed herein, said electrochemical cell has an irreversible discharge capacity selected from the range of 1000 to 1200 mAh/g.

In some embodiments of the electrochemical cells disclosed herein, said electrochemical cell has cumulative discharge capacity of at least 2000 mAh/g over 10 cycles. In some embodiments of the electrochemical cells disclosed herein, said electrochemical cell has cumulative discharge capacity of at least 3000 mAh/g over 10 cycles. In some embodiments of the electrochemical cells disclosed herein, said negative electrode has a discharge capacity selected from the range of 150 to 550 mAh/g.

In some embodiments of the electrochemical cells disclosed herein, a concentration of dissolved oxygen gas in said electrolyte is less than $1 \cdot 10^{-4}$ M. In some embodiments of the electrochemical cells disclosed herein, an amount of dissolved oxygen gas in said electrolyte is less than $1 \cdot 10^{-7}$ mol. In some embodiments of the electrochemical cells disclosed herein, a ratio of amount of V in said alloy to amount of dissolved oxygen gas in said electrolyte is at least 20 (i.e., 20-to-1), at least 60, at least 80, selected from the range of 20 to 80, or selected from the range of 60 to 80. In some embodiments of the electrochemical cells disclosed herein, a concentration of dissolved oxygen gas in said electrolyte is selected to provide for an increase of discharge-capacity stability by at least 15% at 50 to 200 cycles compared to an otherwise equivalent electrochemical cell having a dissolved oxygen gas concentration in said electrolyte corresponding to an equilibrium concentration of dissolved oxygen gas at ambient conditions.

In some embodiments of the electrochemical cells disclosed herein, said positive electrode comprises nickel. In some embodiments of the electrochemical cells disclosed herein, said positive electrode comprises nickel hydroxide. In some embodiments of the electrochemical cells disclosed herein, said electrochemical cell is a Ni metal hydride battery.

In some embodiments of the electrochemical cells disclosed herein, said negative electrode is isolated from ambient air by one or more materials that are substantially impermeable to dissolved oxygen gas. In some embodiments of the electrochemical cells disclosed herein, the cell further comprises a membrane, said membrane being permeable to anions present in said electrochemical cell and being substantially impermeable to dissolved oxygen gas; wherein said membrane is positioned between said negative electrode and ambient air, between said negative electrode and said positive electrode, both between said negative electrode and both ambient air and said positive electrode. In some embodiments of the electrochemical cells disclosed herein, said membrane is stable in said electrolyte. In some embodiments of the electrochemical cells disclosed herein, said positive electrode is an air electrode. In some embodiments of the electrochemical cells disclosed herein, the cell is a sealed coin cell. In some embodiments of the electrochemical cells disclosed herein, the cell is a sealed coin cell wherein a concentration of dissolved oxygen gas in said electrolyte is less than or equal to $8 \cdot 10^{-5}$ M.

In some embodiments of the electrochemical cells disclosed herein, the cell further comprises an electrolyte flow channel through which electrolyte is configured to flow during charging and discharging of said electrochemical cell. In some embodiments of the electrochemical cells disclosed herein, the electrochemical cell is a metal hydride battery.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 2A: XRD patterns; FIG. 2B: low magnification; FIG. 2C: high magnification BES images of the $Ti_{29}V_{50}Ni_9Cr_{12}$ alloy ingot; FIG. 2D: Hydrogen absorption isotherms of the alloys performed at room temperature (298 K).

FIG. 3A: First cycle charge/discharge curves for the alloy electrodes in a beaker cell. Ex situ experiments were performed at the numbered points on the graph. FIG. 3B: Diffractograms of the three alloy electrodes at corresponding states of charge. Hydride phases are marked with squares (BCC), triangles (BCT), and circles (FCC).

FIG. 4B: $Ti_{29}V_{50}Ni_9Cr_{12}$ electrodes in an Ar-purged three-electrode cell.

FIG. 5A: $Ti_{29}V_{62}Ni_9$ electrodes with $KVO_3$ additions to the KOH electrolyte and FIGS. 5B-5C: $Ti_{29}V_{62-x}Ni_9Cr_x$ electrodes with KOH electrolyte. The MH electrodes were charged to 550 mAh/g in FIGS. 5A-5B, and charged to 400 mAh/g in FIG. 5C. In FIG. 5A, cycling was interrupted after 110 cycles and restarted after two weeks for the cell containing KOH with 500 mM $KVO_3$. In FIGS. 5B-5C, cycling was interrupted for two weeks after the 100th cycle for the $Ti_{29}V_{56}Ni_9Cr_6$ and $Ti_{29}V_{50}Ni_9Cr_{12}$ electrodes.

STATEMENTS REGARDING CHEMICAL COMPOUNDS AND NOMENCLATURE

Figure 1:
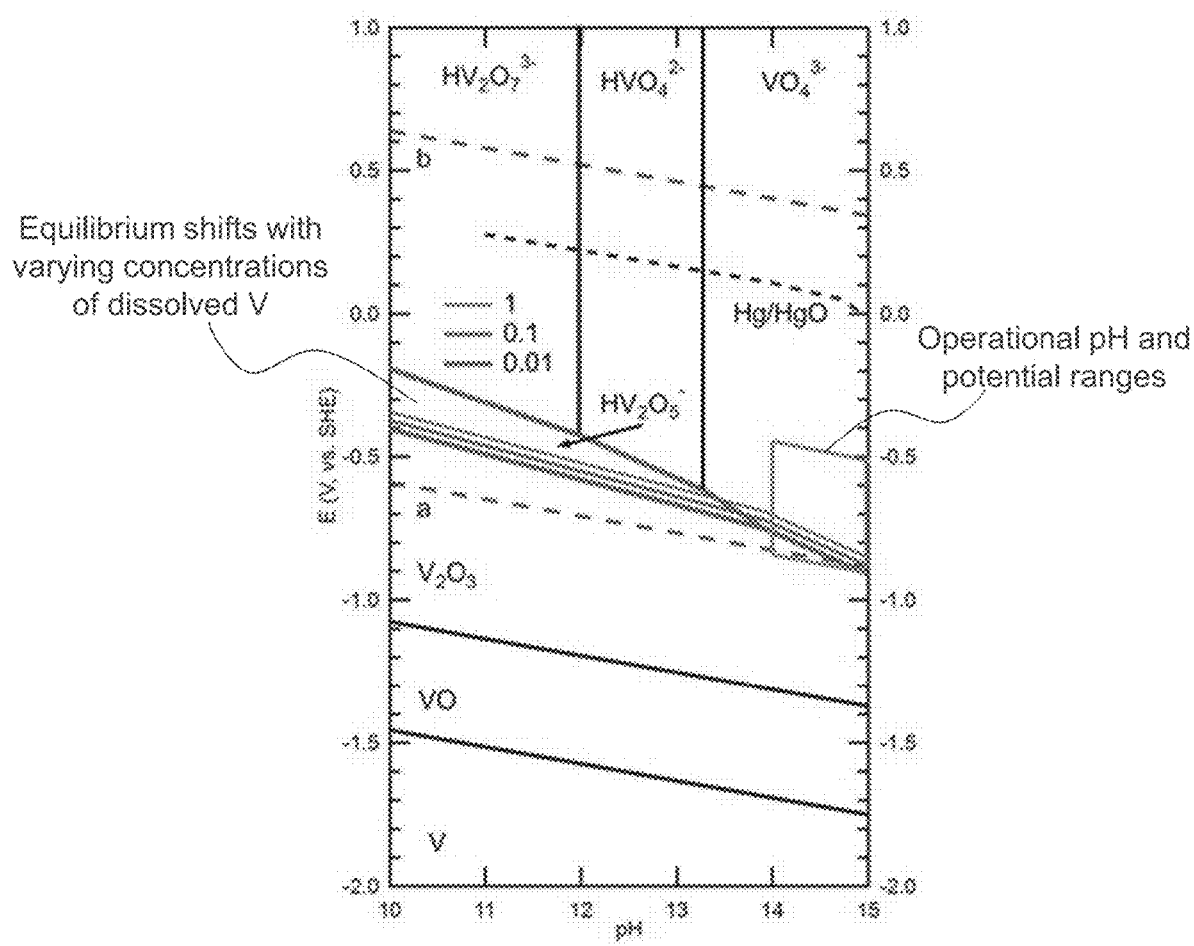
FIG. 1. Pourbaix diagram of V with the potential of the Hg/HgO reference electrode indicated by the short-dash blue line. The orange box outlines the operational pH and potential ranges for metal hydride ("MH") batteries, and the green lines indicate how equilibrium shifts with varying concentrations of dissolved V (in units of grams V per kilogram $H_2O$). Line a: $2H^+ + 2e^- \rightarrow H_2$; and line b: $2H_2O \rightarrow O_2 + 4H^+ + 4e^-$.

In general, the terms and phrases used herein have their art-recognized meaning, which can be found by reference to standard texts, journal references and contexts known to those skilled in the art. The following definitions are provided to clarify their specific use in the context of the invention.

The term "electrochemical cell" refers to devices and/or device components that convert chemical energy into electrical energy or electrical energy into chemical energy. Electrochemical cells have two or more electrodes (e.g., positive and negative electrodes) and an electrolyte. Reactions occurring at the electrode, such as sorption and desorption of hydrogen in an alloy material, contribute to charge transfer processes in the electrochemical cell. Electrochemical cells include, but are not limited to, primary (non-rechargeable) batteries and secondary (rechargeable) batteries. In certain embodiments, the term electrochemical cell includes metal hydride batteries, metal-air batteries, fuel cells, supercapacitors, capacitors, flow batteries, solid-state batteries, and catalysis or electrocatalytic cells utilizing an alkaline aqueous electrolyte.

The term "electrode" refers to an electrical conductor where ions and electrons are exchanged with an electrolyte and an outer circuit. The term "negative electrode" refers to the electrode that is conventionally referred to as the anode during discharging of the electrochemical cell. During charging of the electrochemical cell, the negative electrode is one that is conventionally referred to as the cathode. The term "positive electrode" refers to the electrode that is conventionally referred to as the cathode during discharging of the electrochemical cell. During charging of the electrochemical cell, the positive electrode is one that is conventionally referred to as the anode. The negative electrode may comprise multiple elements, including, but not limited to, a substrate, binder(s), and an alloy which may sorb and desorb hydrogen. Exemplary substrates include, but are not limited to, a Ni mesh or a Ni foam. An exemplary binder includes, but is not limited to, Ni powder. An exemplary positive electrode is, but is not limited to, nickel hydroxide.

The term "sorbing" refers to absorbing and/or adsorbing. The term "sorption" refers to absorption and/or adsorption. The term "desorbing" refers to a reverse process of absorbing and/or a reverse process of adsorbing.

The term "metal hydride" refers to a chemical species (e.g., an element or a chemical compound) that includes one or more atoms of a metallic or metalloid element chemically bonded to one or more hydrogen atoms. A metallic element is one that is conventionally considered a metal in pure, bulk state. Metallic elements include, but are not limited to transitional metal elements. Metallic elements include, but are not limited to, Ti, Ni, V, Cr, Fe, Co, Zr, and Al. Metalloid elements are B, Si, Ge, As, Se, Sb, Te, Po, and At. Exemplary chemical bonds are covalent bonds, ionic bonds, coordination bonds, which are also referred to as coordinate covalent bonds or dative bonds, metallic bonds, and bonds due to hydrogen bonding. The metal hydride, as a whole, may be a metal, a semiconductor, or an insulator. Typically, a metal hydride is a solid. In some embodiments, a metal hydride is a metal. In some embodiments, a metal hydride is a metallic material having electrical resistivity less than or equal to $1 \cdot 10^{-6}$ $\Omega$m at 20° C. For example, an alloy having the formula $TiV_{2.1-x}Ni_{0.3}(Cr_yM_{1-y})_x$ may be a metal hydride, where M is Fe, Co, or Zr, y is greater than 0 and less than or equal to 1, and x is greater than 0 and equal to or less than 0.4. For example, an alloy having the formula $Ti_{29}V_{62-x}Ni_9(Cr_yM_{1-y})_x$ may be a metal hydride, where M is Fe, Co, or Zr, y is greater than 0 and less than or equal to 1, and x is greater than 0 and equal to or less than 12. For example, an alloy having the formula $Ti_{29}V_{62-x}Ni_9Cr_x$ may be a metal hydride, where x is greater than 0 and equal to or less than 12. The term "metal hydride" may be abbreviated as MH.

The term "metal hydride battery" refers to a battery having an electrode, typically the negative electrode, which comprises a metal hydride. In a metal hydride battery, the metal hydride absorbs and/or adsorbs hydrogen during charging of the battery and desorbs hydrogen during discharging of the battery. Exemplary metal hydride batteries include, but are not limited to, batteries conventionally referred to as nickel metal hydride batteries (NiMH).

The term "capacity" is a characteristic of an electrochemical cell that refers to the total amount of electrical charge an electrochemical cell, such as a battery, is able to hold. Capacity may be expressed in units of ampere-hours (Ah) or milliampere-hours (mAh). The term "specific capacity" refers to the capacity output of an electrochemical cell, such as a battery, per unit mass. Specific capacity may be expressed in units of mAh/g. The term capacity may refer to charge capacity or discharge capacity. The term "discharge capacity" refers to the capacity of an electrochemical cell which the cell is capable of discharging. In some embodiments, the terms capacity and discharge capacity are used interchangeably.

The term "discharge-capacity stability", as used herein to determine or report a discharge-capacity stability at X cycles of an electrochemical spell, refers to the product of the following calculation: {(discharge capacity at cycle no. X)]/(highest discharge capacity)}, where: cycle no. X refers to a cycle count or (i.e., cycle number; i.e., X is a positive integer); and the value of "highest discharge capacity" is the highest discharge capacity determined between cycle no. 1 and cycle no. X, between cycle no. 1 and cycle no. 5, between cycle no. 1 and cycle no. 10, between cycle no. 1 and a cycle no. selected from the range of 5 to 10, between cycle no. 1 and cycle no. 50, or between cycle no. 1 and a cycle no. selected from the range of 5 to 50. For the purposes of an illustrative example: an electrochemical cell, such as a metal hydride battery, is cycled 200 times; the highest discharge capacity between cycle 1 and cycle 200, which may occur at any cycle between cycle 1 and cycle 200, is 500 mAh/g; the discharge capacity at cycle number 200 is 400 mAh/g; and the discharge-capacity stability at 200 cycles is therefore 0.8. Discharge-capacity stability may also be represented as a percent, wherein the above calculation is further multiplied by 100%, such that the discharge-capacity stability in the latter illustrative example is 80%. The discharge-capacity stability "at X cycles" is equivalent to the discharge-capacity stability "after X cycles". The discharge-capacity stability may be determined at a cycle number that is less than the maximum or total cycle count. In other words, a discharge-capacity stability may be determined at any cycle count between 1 and 100 for a battery cycled 100 times.

The term "discharge-capacity fade", as used herein to determine or report a discharge-capacity fade at X cycles of an electrochemical spell, refers to the product of the following calculation: {[(highest discharge capacity between cycle no. 1 and cycle no. X)–(discharge capacity at cycle no. X)]/(highest discharge capacity)}, where: cycle no. X refers to a cycle count or (i.e., cycle number; i.e., X is a positive integer); and the value of "highest discharge capacity" is the highest discharge capacity determined between cycle no. 1 and cycle no. X, between cycle no. 1 and cycle no. 5, between cycle no. 1 and cycle no. 10, between cycle no. 1 and a cycle no. selected from the range of 5 to 10, between cycle no. 1 and cycle no. 50, or between cycle no. 1 and a cycle no. selected from the range of 5 to 50. For the purposes of an illustrative example: an electrochemical cell, such as a metal hydride battery, is cycled 200 times; the highest discharge capacity between cycle 1 and cycle 200, which may occur at any cycle between cycle 1 and cycle 200, is 500 mAh/g; the discharge capacity at cycle number 200 is 400 mAh/g; and the discharge-capacity fade at 200 cycles is therefore 0.2. Discharge-capacity fade may also be represented as a percent, wherein the above calculation is further multiplied by 100%, such that the discharge-capacity fade in the latter illustrative example is 20%. The discharge-capacity fade "at X cycles" is equivalent to the discharge-capacity fade "after X cycles". The discharge-capacity fade may be determined at a cycle number that is less than the maximum or total cycle count. In other words, a discharge-capacity fade may be determined at any cycle count between 1 and 100 for a battery cycled 100 times.

The term "energy density", when applied to an electrochemical cell, such as a metal hydride battery, refers to an "energy mass density" or an "energy volume density".

Energy mass density refers to energy capacity of the electrochemical cell per unit volume of mass. Energy mass density may be expressed in units of Wh/kg (Watt-hours per kilogram). Energy volume density refers to energy capacity of an electrochemical cell per unit of volume. Energy volume density may be expressed in units of Wh/L (Watt-house per litter).

The term "discharge rate" refers to the current at which an electrochemical cell is discharged. Discharge rate may be expressed in units of milliamperes (mA) or milliamperes per gram (mA/g), where the mass refers to the mass of the alloy (e.g., metal hydride) portion of the electrode having said alloy (e.g., negative electrode). Alternatively, discharge rate can be normalized to the rated capacity of the electrochemical cell, and expressed as C/(X t), wherein C is the capacity of the electrochemical cell, X is a variable and t is a specified unit of time, which is typically equal to 1 hour.

"Current density" may refer to the current flowing per unit electrode area or current flower per unit mass of the alloy or of the electrode. Electrode area may refer to the area of the electrode exposed to the electrolyte. In some embodiments, current density" refers to the current flowing per unit per unit mass of the alloy of the negative electrode.

"Electrolyte" refers to an ionic conductor which can be in the solid state, the liquid state (most common) or more rarely a gas (e.g., plasma).

The term "cell voltage" refers a terminal voltage or an operating voltage measured between the negative terminal (or, the negative electrode external current collector tab) and the positive terminal (or, the positive electrode external current collector tab). Typically, the cell voltage refers to the voltage of an electrochemical cell, such as a metal hydride battery, during discharge of the electrochemical cell.

"Electrode potential" refers to a voltage between an electrode and a reference electrode. Unless otherwise noted, the electrode potential is given with respect to (or, "vs.") a mercury/mercury oxide (Hg/HgO) reference electrode.

The terms "voltage" and "potential" are used interchangeably herein. Generally, the term "voltage" is more commonly used to describe the voltage, or potential, across the terminals of an electrochemical cell. Generally, the term "potential" is more commonly used to describe the voltage, or potential, at a single electrode.

The term "cell cut-off voltage" or "cell cutoff voltage" refers to a limit on the cell voltage of an electrochemical cell such that said cell voltage, or absolute value (i.e., |x|) thereof, is limited to a value greater than or equal to the value of the cell cut-off voltage. In some embodiments, an electrochemical cell is not discharged further when the cell voltage approaches or reaches the cell cut-off voltage. An electrochemical cell subject to a cell cut-off voltage may be characterized as having a cell cut-off voltage applied thereto. A cell cut-off voltage may be applied via a hardware-imposed limit and/or a software-imposed limit, including by conventional means known in the art.

The term "electrode cut-off potential" or "electrode cutoff potential" refers to a limit on the potential at the negative electrode of an electrochemical cell such that said potential at said negative electrode is limited to a value less than (i.e., more negative) or equal to the value of the electrode cut-off potential. In some embodiments, an electrochemical cell is not discharged further when the potential at the negative electrode approaches or reaches the electrode cut-off potential. An electrochemical cell subject to an electrode cut-off potential may be characterized as having an electrode cut-off potential applied thereto. An electrode cut-off potential may be applied via a hardware-imposed limit and/or a software-imposed limit, including by conventional means known in the art The term "first cycle" may refer to the overall first cycle of an electrochemical cell.

The term "cycle" refers to a charge-and-discharge cycle of an electrochemical cell. In some embodiments, the discharge portion of each cycle is performed until a cell cut-off voltage or an electrode cut-off potential is reached. The capacity to which the electrochemical cell is charged is typically provided (e.g., charged to 500 mAh/g) when describing cycle characteristics of an electrochemical cell.

The term "reversible discharge capacity" refers to a discharge capacity the value of which is substantially equivalent to the discharge capacity corresponding to the one or more, five or more, or ten or more subsequent cycles. For example, if a series of 10 cycles of an electrochemical cell, such as the first 10 ten cycles, have a substantially equivalent discharge capacity, that discharge capacity may be referred to as a reversible discharge capacity. The term "irreversible discharge capacity" refers to a discharge capacity the value of which is substantially different from (i.e., substantially less than or substantially greater than) the discharge capacity corresponding to the one or more, five or more, or ten or more subsequent cycles. Generally, the irreversible discharge capacity is a discharge capacity value that is not recovered, or obtained again, in subsequent cycles. For example, if an electrochemical cell exhibits a discharge capacity of 500 mAh/g at cycle 5 and the discharge capacity decreases by 30% over the following 10 cycles, the discharge capacity of 500 mAh/g may be referred to as an irreversible discharge capacity.

The term "substantially equal" or "substantially equivalent", when used in conjunction with a reference value describing a property or condition, refers to a value that is within 10%, within 5%, within 1%, or is equivalent to the provided reference value. For example, a discharge capacity is substantially equal to 400 mAh/g if the discharge capacity is a value within 10%, within 5%, within 1%, or equivalent to 400 mAh/g. The term "substantially greater", when used in conjunction with a reference value describing a property or condition, refers to a value that is at least 2%, at least 5%, or at least 10% greater than the provided reference value. For example, a discharge capacity is substantially greater than 400 mAh/g if the discharge capacity is at least 2%, at least 5%, or at least 10% greater than 400 mAh/g. The term "substantially less", when used in conjunction with a reference value describing a property or condition, refers to a value that is at least 2%, at least 5%, or at least 10% less than the provided reference value. For example, a discharge capacity is substantially less than 400 mAh/g if the discharge capacity is at least 2%, at least 5%, or at least 10% less than 400 mAh/g.

The term "stable" when referring to a membrane or separator of an electrochemical cell refers to the membrane or separator being capable of not substantially dissolving or of not substantially degrading under when in contact with the electrolyte of the electrochemical cell. In some embodiments, a membrane or separator that is stable in the presence of an electrolyte is one that does not degrade or dissolve substantially over the course of at least 1 year, 5 years, 10 years, 15 years, or 20 years when in continuous contact with the electrolyte of an electrochemical cell.

The term "dissociate" refers to a process in which a chemical compound separates or splits into smaller chemical species. Dissolution is an exemplary dissociation process. For example, KOH may dissociate into $K^+$ and $OH^-$ ions in the presence of water. For example, $KVO_3$ may dissociate to form $K^+$ and $VO_4^{3-}$ ions in the presence of alkaline aqueous solution.

The term "primary vanadate ions" refers to those vanadate ions that are present in the electrolyte, of an electrochemical cell, as a result of the dissociation of an additive in the electrolyte. An additive is a chemical species that dissociates in the electrolyte to result in dissolved vanadate ions. An additive may be a salt. Exemplary additives include, but are not limited to, $V_2O_3$, $V_2O_5$, V, $KVSO_4$, $Fe(VO_2)_3$, $LiVO_3$, $NaVO_3$, $KVO_3$, $NH_4VO_3$, and any combination thereof. Vanadate ions include, but are not limited to, $VO_4^{3-}$. In an illustrative example, $KVO_3$ (an additive) is provided in the electrolyte to form $VO_4^{3-}$ ions upon dissociation of the $KVO_3$ in the electrolyte. Of course, it will be understood that the dissociation of an additive, such as $KVO_3$, may also form other ions, including, but not limited to, cations, such as $K^+$. Primary vanadate ions do not include those vanadate ions that are the result of dissolution of the negative electrode, or metal hydride alloy thereof, in the electrolyte.

The term "solubility", as used herein, refers to the ability of a chemical species, such as oxygen or potassium hydroxide, to dissolve in a liquid solvent, such as water. The term "solubility limit", when referring to a chemical species, is the maximum concentration at which the chemical species may be dissolved in a solvent, for a given temperature and pressure, before the chemical species precipitates out of solution or beyond which no further amount of the chemical species will dissolve in the solvent. Unless otherwise noted, the solubility limit is determined under standard temperature and pressure (STP), which is 0° C. and absolute pressure of 100 kPa.

"Electrical contact," "electrical communication", "electronic contact" and "electronic communication" refer to the arrangement of one or more objects such that an electric current efficiently flows from one object to another. For example, in some embodiments, two objects having an electrical resistance between them less than 100Ω are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

The term "electrochemical communication" refers to the ability of two or more elements, materials, chemical species, and/or structures to transfer charge, such as in the form of electrons, between each other through a solution. In some embodiments, components in electrochemical communication are in direct electrical communication wherein an electron is directly transferred from one component to another. In some embodiments, components in electrochemical communication are in indirect electrical communication wherein an electron is indirectly transferred from one component to another via one or more intermediate components.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Figures 31A, 31B:
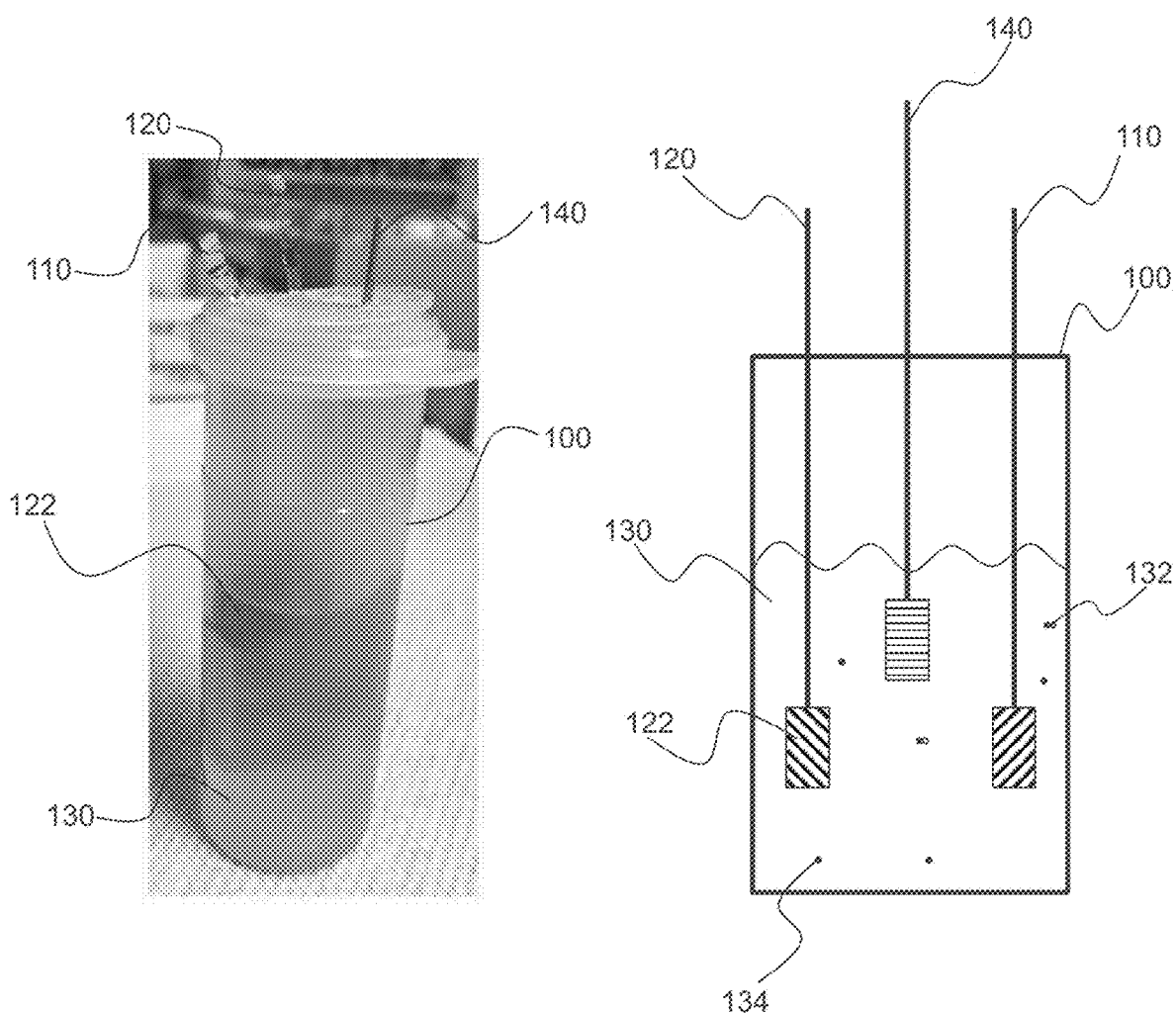
FIG. 31A is an image of an exemplary electrochemical cell and FIG. 31B is a corresponding schematic of the exemplary electrochemical cell of FIG. 31A.

FIG. 31A is an image of an exemplary electrochemical cell 100 and FIG. 31B is a corresponding schematic of exemplary electrochemical cell 100. Electrochemical cell 100 comprises a positive electrode 110, a negative electrode 120, and an electrolyte 130. Electrochemical cell optionally comprises a reference electrode 140. Negative electrode 120 comprises an alloy 122, the composition of which comprises vanadium (V). The alloy of negative electrode 120 may be configured to sorb hydrogen during charging of said electrochemical cell and desorb hydrogen during discharging of said electrochemical cell. Electrolyte 130 may have an additive 132 provided therein to form primary vanadate ions 134 upon dissociation of the additive in said electrolyte.

The invention can be further understood by the following non-limiting examples.

Example 1: High Capacity V-Based Metal Hydride Electrodes for Rechargeable Batteries Abstract In this example, $Ti_{29}V_{62-x}Ni_9Cr_x$ (x=0, 6, 12) body centered cubic metal hydride (MH) electrodes are demonstrated by addressing vanadium corrosion and dissolution in KOH solutions. By identifying oxygen as the primary source of corrosion and eliminating oxygen with an Ar-purged cell, the Cr-free $Ti_{29}V_{62}Ni_9$ alloy electrode achieved a maximum capacity of 594 mAh/g, double the capacity of commercial $AB_5$ MH electrodes. With coin cells designed to minimize oxygen evolution, the cycle stability of a $Ti_{29}V_{62}Ni_9$ alloy electrode was greatly improved with either vanadate ion additions to the electrolyte or Cr-substitution in the alloy. Together, both approaches resulted in a reversible capacity of around 500 mAh/g for at least 200 cycles. We performed energy density calculations for a 100 Wh MH-air cell utilizing the high capacity $Ti_{29}V_{62-x}Ni_9Cr_x$ electrodes and found that these cells are comparable in energy density to state-of-the-art Li-ion batteries.

Introduction

State-of-the-art conventional commercial metal hydride alloys (MH) are "$AB_5$" alloys based on the Haucke phase of $LaNi_5$. They offer a reversible capacity of around 300 mAh/g.[1-3] For many years, vanadium-based BCC alloys have been proposed as higher capacity alternatives to $AB_5$ materials.[4-7] Pure V absorbs up to two hydrogen atoms per metal atom (H/M), which corresponds to 3.9 mass % hydrogen storage capacity, or 1041 mAh/g theoretical electrochemical capacity. Upon gas-phase hydrogen absorption, the metal lattice transforms between BCC (V)→BCT (VH)→ FCC (VH$_2$) phases with some reversibility.[8,9] The VH→VH$_2$ phase transformation takes place at 4 atm hydrogen equilibrium pressure at 313 K, which can be altered to some extent by alloying with other transition metals.[8-10] The V→VH phase transformation occurs at a very low hydrogen equilibrium pressure (on the order of $10^{-6}$ atm) and this monohydride transition is generally considered to be too stable for electrochemical applications.[11] This limitation has been thought to restrict the accessible electrochemical capacity of V-based BCC alloys to half of their theoretical values.[12] There is little physical evidence, however, of the extent of the phase transformation or even if electrochemical dehydrogenation of the monohydride phase is possible at all.

Vanadium is often alloyed with titanium for lower cost and faster hydrogen absorption kinetics.[11,13-15] Nickel is indispensable for electrochemical activity,[6,16] and many studies focused on the Ti—V—Ni ternary system as electrode materials for MH—Ni batteries. The Ti—V—Ni-based alloys tend to unmix chemically on the BCC lattice, forming an electrocatalytically active Ni-rich mi-nority region (maximum hydrogen capacity of 1.3 mass %), and a majority V-rich region which forms a high capacity MH.[4,5,12,17-21] One of the highest capacity BCC alloy compositions is TiV$_{2.1}$Ni$_{0.3}$, or Ti$_{29}$V$_{62}$Ni$_9$. The hydrogen absorption capacity for Ti$_{29}$V$_{62}$Ni$_9$ was reported to be 4.0 mass % in gas-phase reactions; electrochemically, however, it discharges 470 mAh/g initially before quickly losing one third of its capacity in 10 cycles.[12] Dissolution of V from the electrode was identified as the cause of the electrode failure. The cycle performance was improved by alloying with Cr, but the capacity of Ti$_{29}$V$_{62-x}$Ni$_9$Cr$_x$(x≤12) alloy electrodes still decreased substantially over 30 cycles.[22] Recently, the same group reported further improvement of cycle stability for a Ti$_{29}$V$_{44}$Ni$_9$Cr$_{18}$ alloy, but with a much lower reversible capacity of about 300 mAh/g.[23] The trade-off between long cycle life and high capacity suggests it may not be possible to develop Ti—V—Ni-based alloy electrodes by Cr-substitution alone.

The corrosion behavior of Ti—V—Ni—Cr quaternary alloys may be qualitatively understood by using elemental Pourbaix diagrams and experimental corrosion studies. Of these four transition metals, Ti, Ni, and Cr show passivation behavior in strong alkaline environments by forming a metal oxide or hydroxide on the surface.[24-31] FIG. 1 shows the Pourbaix diagram of V plotted with corrected data from Post, et al.[24,32,33] According to the Pourbaix diagram, V corrodes and dissolves in strong alkaline solution as VO$_4^{3-}$ (vanadate) ions, which is the only stable pentavalent V species at a pH above 13.[34] Liu, et al., studied the redox behavior of vanadate ions in alkaline solutions with a glassy carbon electrode and observed the reduction process of VO$_4^{3-}$ at −1.93 V versus a saturated calomel electrode, which is well outside the operational voltage window for MH electrodes.[35] This shows that corrosion-induced V dissolution is irreversible, but the rate of corrosion may be controlled by adjusting the electrochemical and chemical environment of the V-based alloy electrode. For example, Al-Kharafi, et al. investigated the electrochemical behavior of V and found that the corrosion rate decreased upon removing oxygen from the alkaline solutions.[36] It should be noted that the Pourbaix diagram is a thermodynamic prediction with no information on kinetics. Furthermore, the corrosion of an alloy may differ from its elemental constituents. A systematic investigation of the corrosion behavior of alloy electrodes is still appropriate.

Further improvement of Ti$_{29}$V$_{62-x}$Ni$_9$Cr$_x$ alloy electrodes requires a better understanding of the phase transformations and corrosion that occurs during electrochemical hydriding/dehydriding cycles. In this work, we characterize structural changes and address corrosion by exploring the effects of pH, electrode potential, alloy composition, and the oxygen and vanadate ion concentration in the KOH electrolyte. By understanding and accounting for the limitations imposed on these electrodes by corrosion we were able to develop a MH anode system that reversibly delivers 500 mAh/g capacity for up to 300 cycles.

Experimental Methods

Ti—V—Ni—Cr Alloy Preparation

High purity Ti, V, Ni, and Cr metals were weighed then arc-melted under an argon atmosphere. The ingots were turned over and remelted three times to improve compositional homogeneity. The ingots were then crushed, weighed, and transferred to a Sievert's apparatus for activation. The crushed ingots were first subject to high vacuum at 653 K for several hours before the reactor was pressurized with 30 atm of high-purity hydrogen gas. The reactor was then cooled to room temperature. This process was repeated five times. After gas-phase activation, the ingots were ground in an Ar glovebox and sieved to a fine powder (200 mesh). This alloy powder was used for X-ray diffraction (XRD) analysis and electrode preparation.

Isotherm Measurements

Room temperature hydrogen absorption isotherms were performed on a volumetric Sievert's type apparatus. At least 1 gram of activated alloy powder was loaded into an AISI 316L stainless steel reactor and evacuated (baseline $10^{-6}$ Torr) at 673K for 8 hours. The reactor was allowed to cool to room temperature before the absorption measurements were performed. For each hydriding step, equilibration was reached when the pressure in the reactor did not change for a period of 15 minutes. After equilibration, the next quantity of hydrogen was introduced into the reactor.

Electrode Preparation

The alloy electrodes were prepared by pressing a mixture of alloy and Inco 525 Ni powder (1:3 mass ratio) onto an extruded Ni mesh (Dexmet Corporation) or Ni foam (MTI Corporation) current collector. Approximately 100 mg of powder mixture was hydraulically pressed onto a Ni mesh current collector with a surface area of 1.33 cm$^2$. This high loading procedure follows those commonly adopted in literature for evaluation of the electrochemical properties of metal hydride electrodes.[37,38] These electrodes were used to assemble air-saturated beaker cells, which were convenient for post-cycling analysis by methods such as XRD, X-ray photoelectron spectroscopy (XPS) and inductively coupled plasma mass spectrometry (ICP-MS). A smaller electrode was prepared by pressing approximately 5 mg of powder mixture onto Ni foam (0.32 cm$^2$). This type of electrode is more suitable for cycle stability tests, because the porous nature of the Ni foam produced an electrode that was more mechanically robust.

Cell Assembly and Testing

The electrolyte used in this study was an aqueous 30 wt % KOH solution (Alfa Aesar). For the open-air beaker cells, a Ni mesh based MH electrode was sandwiched between two sintered NiO(OH)/Ni(OH)$_2$ electrodes (4 cm$^2$ each) with nylon separators. The electrode stack was placed in a three-electrode beaker cell with Hg/HgO reference electrodes. The cell was filled with 24 mL electrolyte and let rest for at least 2 hours before testing. Coin cells were assembled in open air using Ni foam MH electrodes, 200 µL electrolyte, and NiO(OH)/Ni(OH)$_2$ positive electrodes. (See FIG. 13 and its accompanying description for the design and preparation of coin cells.) Both the beaker cells and coin cells were cycled with an Arbin multichannel potentiostat.

The Ar-purged three-electrode cells consisted of a Ni foam MH anode, a NiO(OH)/Ni(OH)$_2$ positive electrode (BASF-Ovonic, Rochester Hills, Mich., USA), and a Hg/HgO reference electrode inside a 4-neck flask, with the necks sealed by septums. 24 mL of KOH was added and Ar was allowed to bubble through for 30 minutes before the electrodes were lowered into the electrolyte. Cycling of the cell under continuous Ar flow was controlled by a Princeton Applied Research Versastat 4 potentiostat.

All cells were charged at 100 mA/g. Two discharge protocols were used: (1) single-step discharge at 20 mA/g, and (2) three-step sequential discharge at 100, 40, and 20 mA/g with a 5 minute rest period between each step. The charge capacities and cut-off voltages are specified in the text.

Characterization

Polished pieces of the alloy ingot were characterized using backscattered electron imaging (BES) and energy dispersive X-ray spectroscopy (EDS) on a Zeiss 1550VP Field Emission scanning electron microscope (SEM) equipped with an Oxford X-Max EDS system with a silicon drift detector (SDD). X-ray diffraction (XRD) analysis of the alloy and electrodes was performed with a PANalytical X'Pert Pro diffractometer utilizing Cu Kα radiation. The alloy powder or electrode powder was ground before XRD measurements. The 2θ positions of the diffraction peaks from the electrode powders were calibrated by the diffraction peaks of the internal Ni conductive binder. X-ray photoelectron spectroscopy (XPS) was conducted on the Ni mesh electrodes before and after electrochemical experiments with a Kratos Ultra XPS. Chemical analysis of the used electrolyte was determined by an Agilent inductively coupled plasma mass spectrometer (ICP-MS). The electrolyte samples for ICP-MS were collected from beaker cells and diluted with 3% nitric acid.

Results

Microstructure and Thermodynamics

Figure 2A:
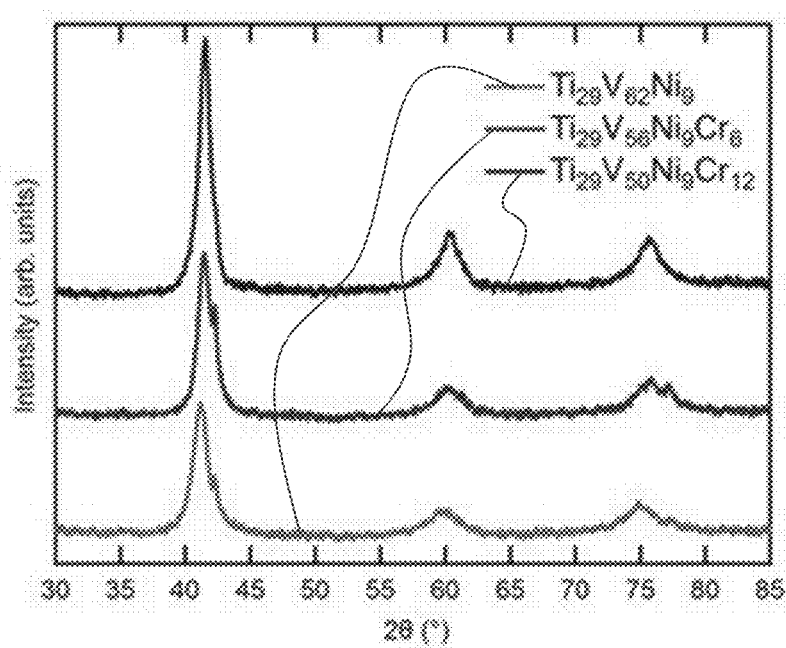
FIGS. 2A-2D. Microstructure and hydrogen absorption isotherms of $Ti_{29}V_{62-x}Ni_9Cr_x$ (x=0, 6, and 12) alloys.
Figure 8:
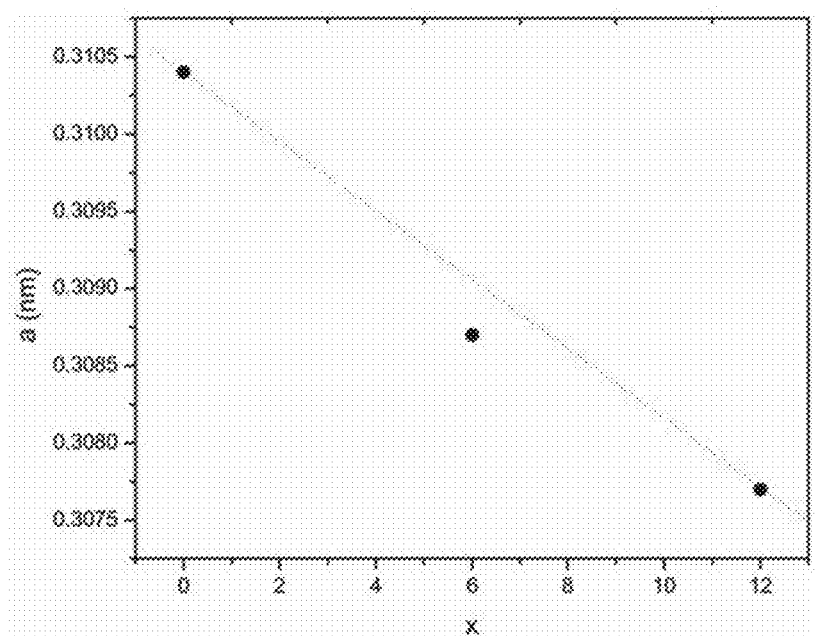
FIG. 8. Lattice parameter, a, of $Ti_{29}V_{62-x}Ni_9Cr_x$ (x=0, 6, and 12) alloys.

The microstructure and composition of three alloys ($Ti_{29}V_{62-x}Ni_9Cr_x$, x=0, 6, and 12) were characterized by XRD, SEM, and EDS (FIGS. 2A-2D). X-ray diffractograms of all three alloy compositions exhibit only the BCC structure (FIG. 2A). The diffraction peaks shift to higher angles with increasing Cr content, corresponding to a smaller lattice parameter for these alloys (FIG. 8). Smaller secondary peaks are also observed in the diffractograms for alloys with low Cr content, consistent with no change in crystal structure during chemical unmixing.

Figure 2B:
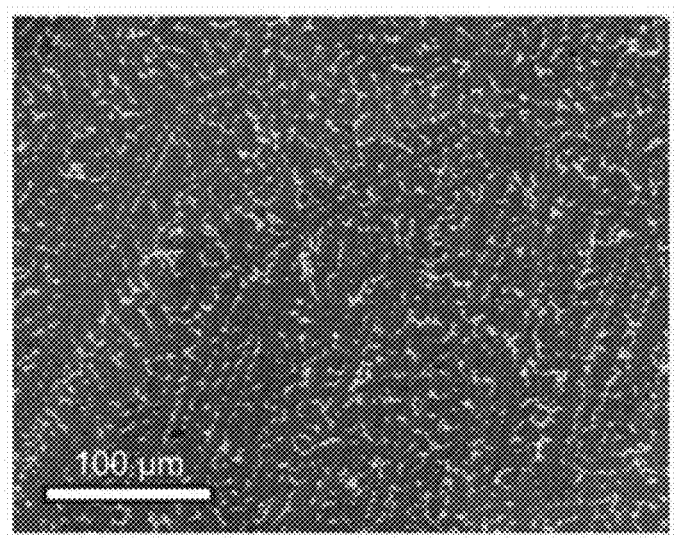
Figure 2C:
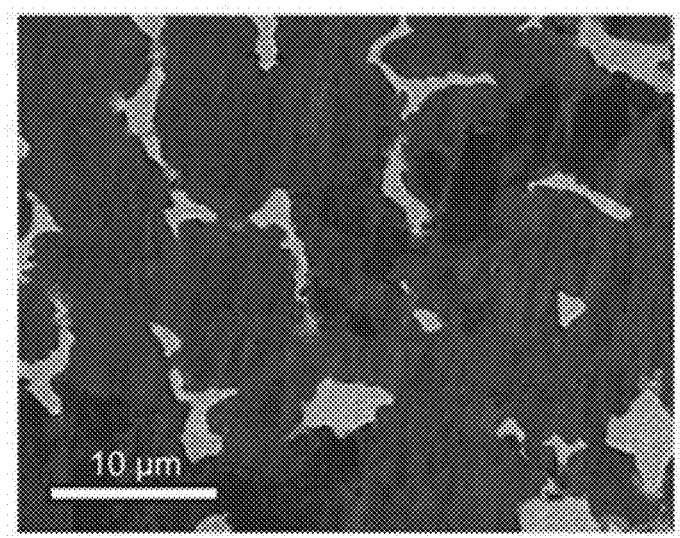
Figure 9A:
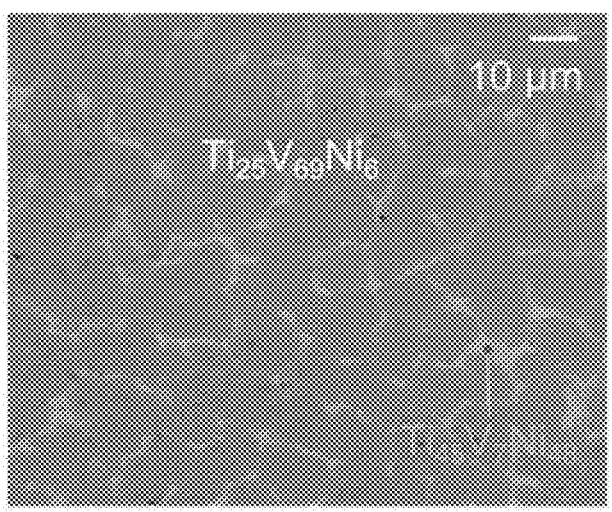
FIGS. 9A-9B. SEM images and EDS results of (FIG. 9A) $Ti_{29}V_{62}Ni_9$ and (FIG. 9B) $Ti_{29}V_{56}Ni_9Cr_6$ alloy ingots. The compositions reported are the average compositions of the V-rich (dark) and Ni-rich (light) regions as determined by EDS.
Figure 9B:
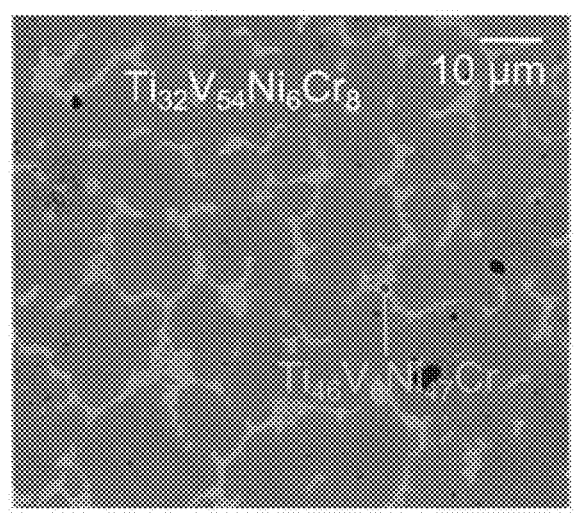

Backscattered electron images of polished $Ti_{29}V_{50}Ni_9Cr_{12}$ ingots are provided in FIGS. 2B and 2C. These images reveal that the microstructure of the alloy is composed of a minority Ni-rich network (light) dispersed in a majority V-rich matrix (dark). The $Ti_{29}V_{62}Ni_9$ and $Ti_{29}V_{56}Ni_9Cr_6$ alloys show similar a microstructure (FIGS. 9A-9B). The average composition of the majority and minority regions within the $Ti_{29}V_{62-x}Ni_9Cr_x$ (x=0, 6, and 12) alloys are listed in Table 1. For all three alloys, the composition of the V-rich region is close to the designed stoichiometric ratio, while the Ni-rich region contains a Ti:Ni ratio of roughly 1:1. The Ni-rich region contains little V and almost no Cr.

TABLE 1

Summary of the compositions of the majority V-rich and minority Ni-rich regions within the allow ingots. The reported compositions are the average compositions as determined by EDS.

| Alloy | V-rich region | Ni-rich region |
| --- | --- | --- |
| $Ti_{29}V_{62}Ni_9$ | $Ti_{29}V_{65}Ni_6$ | $Ti_{47}V_8Ni_{45}$ |
| $Ti_{29}V_{56}Ni_9Cr_6$ | $Ti_{28}V_{59}Ni_6Cr_7$ | $Ti_{49}V_8Ni_{42}Cr_1$ |
| $Ti_{29}V_{50}Ni_9Cr_{12}$ | $Ti_{23}V_{57}Ni_6Cr_{14}$ | $Ti_{46}V_7Ni_{47}$ |

The microstructure of the $Ti_{29}V_{62-x}Ni_9Cr_x$ alloys is similar to what has been reported previously.[22] The differences in the scale of the microstructure and compositional distribution are expected from the different cooling rates. These BCC alloys tend to unmix during cooling into V-rich and Ni-rich regions. The alloy as a whole is BCC, but the compositional unmixing generates regions with larger (V-rich) and smaller (Ni-rich) lattice parameters. The expected lattice parameters of the two regions can account for the primary and secondary peaks visible in FIG. 2A. The composition of the Ni-rich region is relatively constant with increasing Cr concentration, while the V-rich region is not. As a result we observe that the lattice parameter of the V-rich region decreases with increasing Cr content, shifting the peak position to the right in FIG. 2A until it overlaps the peaks associated with the Ni-rich region.

Figure 2D:
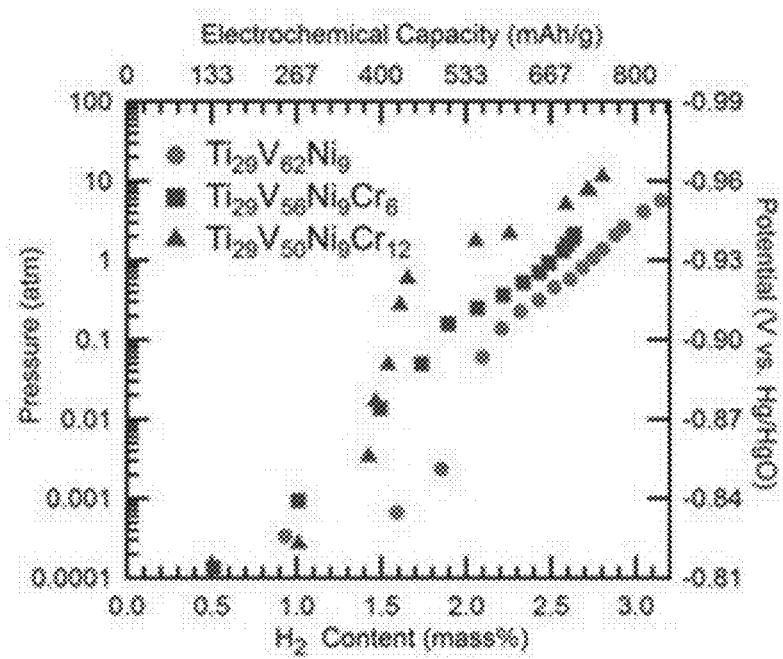

Room temperature hydrogen absorption isotherms of the alloys are provided in FIG. 2D. The maximum hydrogen absorption capacity decreases with increasing Cr content from 3.2 mass % ($Ti_{29}V_{62}Ni_9$) to 2.8 mass % ($Ti_{29}V_{50}Ni_9Cr_{12}$), which translates to electrochemical capacities of 854 to 748 mAh/g. This hydrogen absorption capacity is lower than that reported by Iwakura, et al., which is likely caused by difficulty in completely desorbing hydrogen from the solid solution BCC hydride phase.[12] (Note: The isotherm curves for $TiV_{2.1}Ni_{0.3}$ reported by Iwakura, et al. show a maximum uptake of closer to 1.75 H/M (3.5 mass %), not 1.99 H/M as stated in the text.)[12]

Chromium substitution also increases the plateau pressure. In the $Ti_{29}V_{50}Ni_9Cr_{12}$ alloy a significant amount of hydrogen is absorbed above 1 atm of hydrogen pressure, indicating potential difficulties when fully charging the alloy in MH—Ni cells at ambient pressure. The addition of Cr reduces the lattice parameter and therefore the interstitial volume of the alloy, resulting in a destabilization of the hydride. A higher chemical potential is therefore required for hydride formation.

Electrochemical Properties and Characterization

Figure 10:
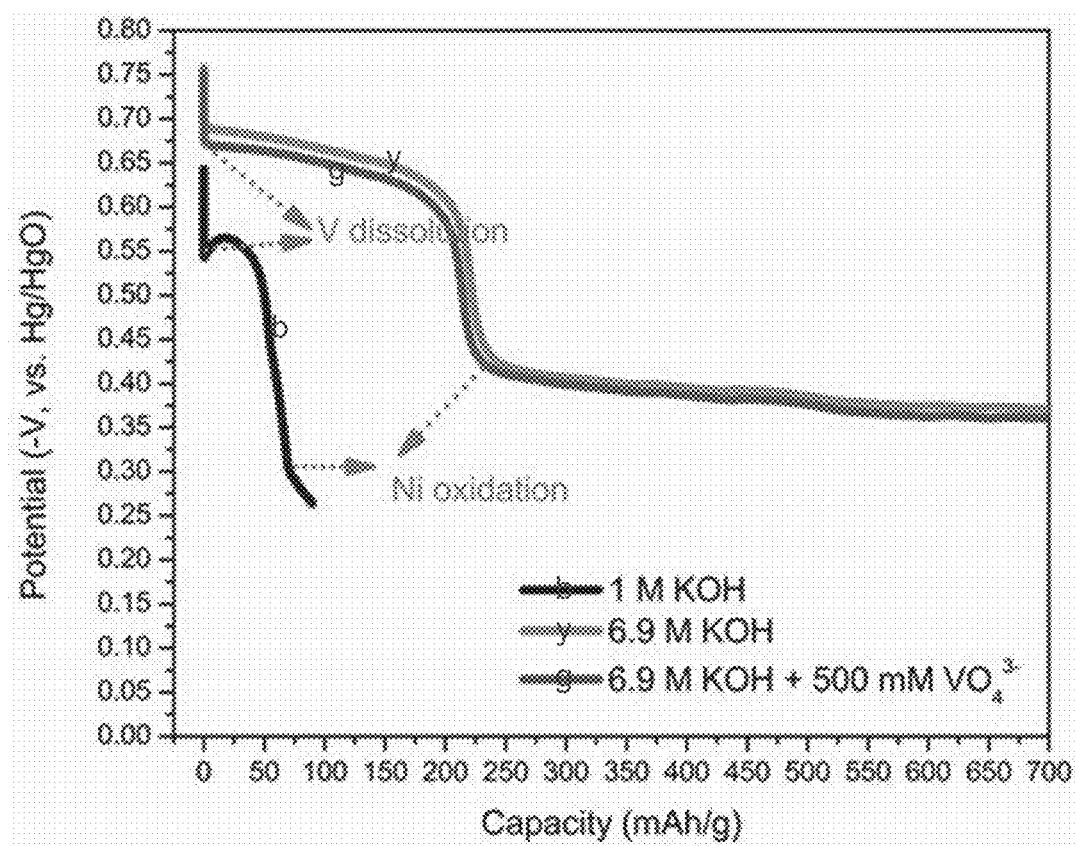
FIG. 10. Discharge curve of $Ti_{29}V_{62}Ni_9$ electrode in KOH solutions.

To understand the phase transformations and corrosion reactions associated with cycling these alloy electrodes, electrode and electrolyte samples at various states of charge were used for XRD, XPS and ICP-MS analysis. All samples were prepared in beaker cells in air. The cells were charged to 1200 mAh/g, or 150% of the maximum capacity estimated from the gas phase isotherm, and then discharged to −0.5 V versus Hg/HgO. The cut-off potential was chosen to include a wide potential window without oxidation of the conductive Ni binder at around −0.4 V (FIG. 10).

Figure 3A:
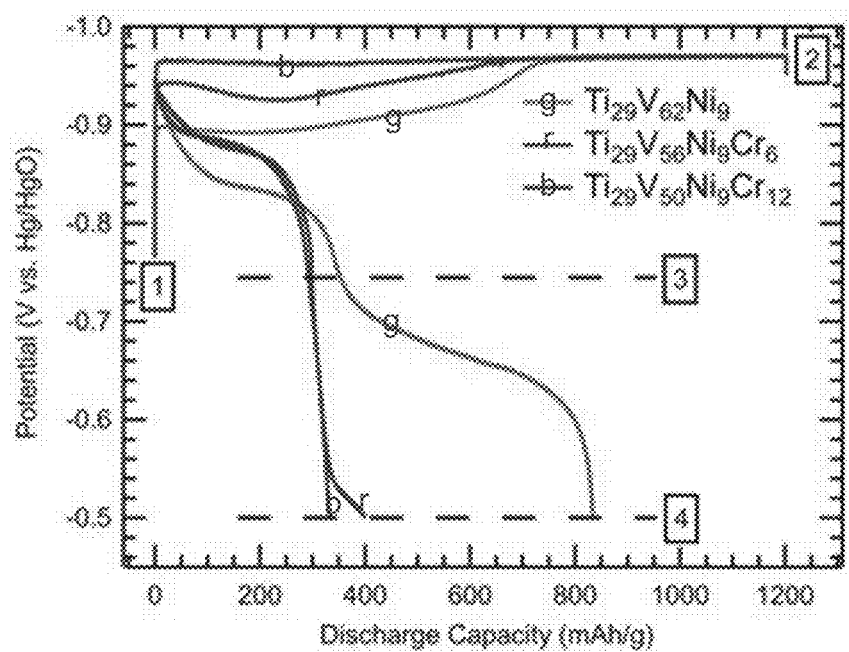
FIGS. 3A-3B. Characterization of the three alloy electrodes.

The charge/discharge profiles for the first cycle are plotted in FIG. 3A. The potential of the plateau during charge increases with Cr concentration, consistent with the gas phase measurement. The charge capacity approaches 800 and 710 mAh/g for the alloy electrode with 0 and 6 at. % Cr, respectively, before the hydrogen overcharge potential was reached at −0.97 V. The charge potential for the alloy electrode with 12 at. % Cr reaches the over-charge potential immediately after current is applied. On discharge, the midpoint potential for the first plateau (before −0.75V) follows the trend on charge and is observed at −0.83 V for $Ti_{29}V_{62}Ni_9$, and −0.88 V for the $Ti_{29}V_{56}Ni_9Cr_6$ and $Ti_{29}V_{50}Ni_9Cr_{12}$ alloys. A second discharge plateau was observed for the $Ti_{29}V_{62}Ni_9$ electrode starting at −0.70 V, and for the $Ti_{29}V_{56}Ni_9Cr_6$ electrode at −0.55 V. A second discharge plateau was not observed for the $Ti_{29}V_{50}Ni_9Cr_{12}$ electrode within the potential window. This observation seems to contradict previous studies ascribing the second discharge plateau to dehydrogenation of the monohydride phase, as Cr-substitution is expected to increase the hydrogen plateau pressure (negative shift on electrochemical scale) of both binary phase regions.[4,11,39] A more plausible hypothesis is continuous oxidation/dissolution of V at the second plateau, as indicated by the Pourbaix diagram (FIG. 1). The reduction of $VO_4^{3-}$ is irreversible over this potential range, thus the second plateau is not observed in the charging curve.[35]

Figure 3B:
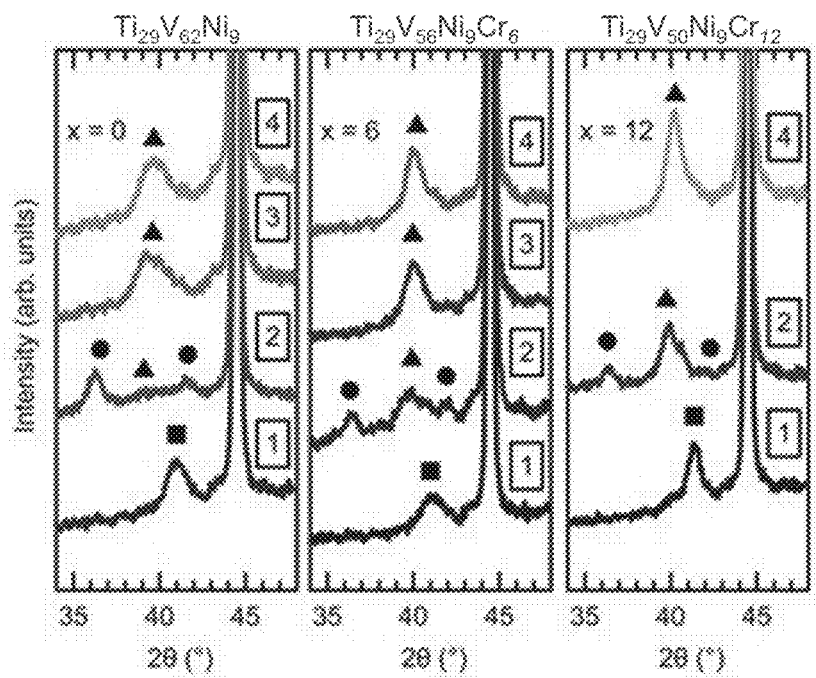

FIG. 3B shows x-ray diffractograms for the alloy electrodes collected at the corresponding states-of-charge (SoC) enumerated on FIG. 3A. The alloys start in the BCC phase and transform to a mixture of FCC and BCT phases after charging. The FCC phase fraction decreases with increasing Cr content, consistent with less of the dihydride transition occurring below 1 atm hydrogen partial pressure (FIG. 2A). Diffraction patterns taken after the electrodes are discharged past the first potential plateau (−0.75 V for $Ti_{29}V_{62}Ni_9$, $Ti_{29}V_{56}Ni_9Cr_6$ and −0.50 V for $Ti_{29}V_{50}Ni_9Cr_{12}$) contain only peaks from the BCT phase. Interestingly, the peak position of the BCT phase for all three electrodes shifts to higher 2θ angles, corresponding to a reduced lattice parameter from hydrogen desorption. The contraction of the BCT phase indicates that the discharge capacity includes hydrogen from both the FCC↔BCT transition and the BCT monohydride phase. A further shift of the BCT peaks occurs for the $Ti_{29}V_{62}Ni_9$ and $Ti_{29}V_{56}Ni_9Cr_6$ electrodes after discharge to −0.50 V. This peak shift was suspected to be caused by vanadium dissolution, and prompted elemental analysis of the electrolyte.

Table 2 shows the ICP-MS results for the electrolytes collected at the SoC indicated in FIG. 3A. The results are presented as the percentage of each element (by mass) which has dissolved from the pristine alloy electrode into the electrolyte. In the case of Ni, the mass of the binder and current collector are not included in the calculation. The amounts of dissolved Ti, Ni, and Cr (for the Cr containing alloys) are very small for all samples. The concentration of dissolved V, however, is much greater. A small amount of V dissolution is already observed after the first charge. During charging, a cathodic (reduction) current is applied to the MH electrode, indicating that V actively corrodes even when the electrode potential is the most negative. In fact, V corrodes and dissolves when the cell is in the open circuit condition. Table 3 shows the ICP-MS results for electrolyte taken from beaker cells that were left standing for 2 days, where 6% of the total V in the $Ti_{29}V_{62}Ni_9$ electrode has dissolved, compared to 2.47% from the $Ti_{29}V_{50}Ni_9Cr_{12}$ electrode. The most significant V dissolution, however, is observed for $Ti_{29}V_{62}Ni_9$ and $Ti_{29}V_{56}Ni_9Cr_6$ alloy electrodes discharged past −0.75 V, confirming our previous hypothesis that the second potential plateau is related to continuous V oxidation into vanadate ions. The total amount of V dissolved from the electrode after one cycle is 17.75%, 5.04%, and 0.95% for the electrodes with 0, 6, and 12 at. % Cr, respectively. After 10 cycles, the Cr free electrode loses 74% of the total V content. These results also demonstrate the ability of Cr substitution to significantly suppress V corrosion and dissolution.

TABLE 2

Results from ICP-MS analysis of KOH electrolyte collected from cells containing $Ti_{29}V_{62-x}Ni_9Cr_x$ (x = 0, 6, 12) alloy electrodes. Electrolyte was collected from cells fully charged, discharged to −0.75 V, and discharged to −0.50 V, as indicated in FIG. 3A. Data from a cell cycled 10 times are also presented.

| | % Loss from electrode | | | |
| Electrode State | Ti | V | Ni | Cr |
| --- | --- | --- | --- | --- |
| x = 0, charged | 0.33 | 1.24 | 0.7 | — |
| x = 0, −0.75 V | 0.04 | 2.16 | 0.01 | — |
| x = 0, −0.50 V | 0.21 | 17.75 | 0.09 | — |
| x = 6, charged | 0.02 | 1.34 | 0.18 | 0.38 |
| x = 6, −0.75 V | 0.05 | 0.92 | 0.30 | 0.20 |
| x = 6, −0.50 V | 0.08 | 5.04 | 0.33 | 0.19 |
| x = 12, charged | 0.04 | 0.40 | 0.64 | 0.14 |
| x = 12, =0.50 V | 0.03 | 0.95 | 0.15 | 0.19 |
| x = 0, 10 cycles | 0.04 | 74.03 | 0.24 | — |

TABLE 3

ICP-MS results of the KOH solutions in which $Ti_{29}V_{62-x}Ni_9Cr_x$ (x = 0 and 12) alloy electrodes were stored for 2 days.

| | % Loss from electrode | | | |
| Alloy Composition | Ti | V | Ni | Cr |
| --- | --- | --- | --- | --- |
| $Ti_{29}V_{62}Ni_9$ | 0.04 | 6.77 | 0.11 | — |
| $Ti_{29}V_{50}Ni_9Cr_{12}$ | 0.09 | 2.47 | 0.07 | 0.15 |

Figure 11:
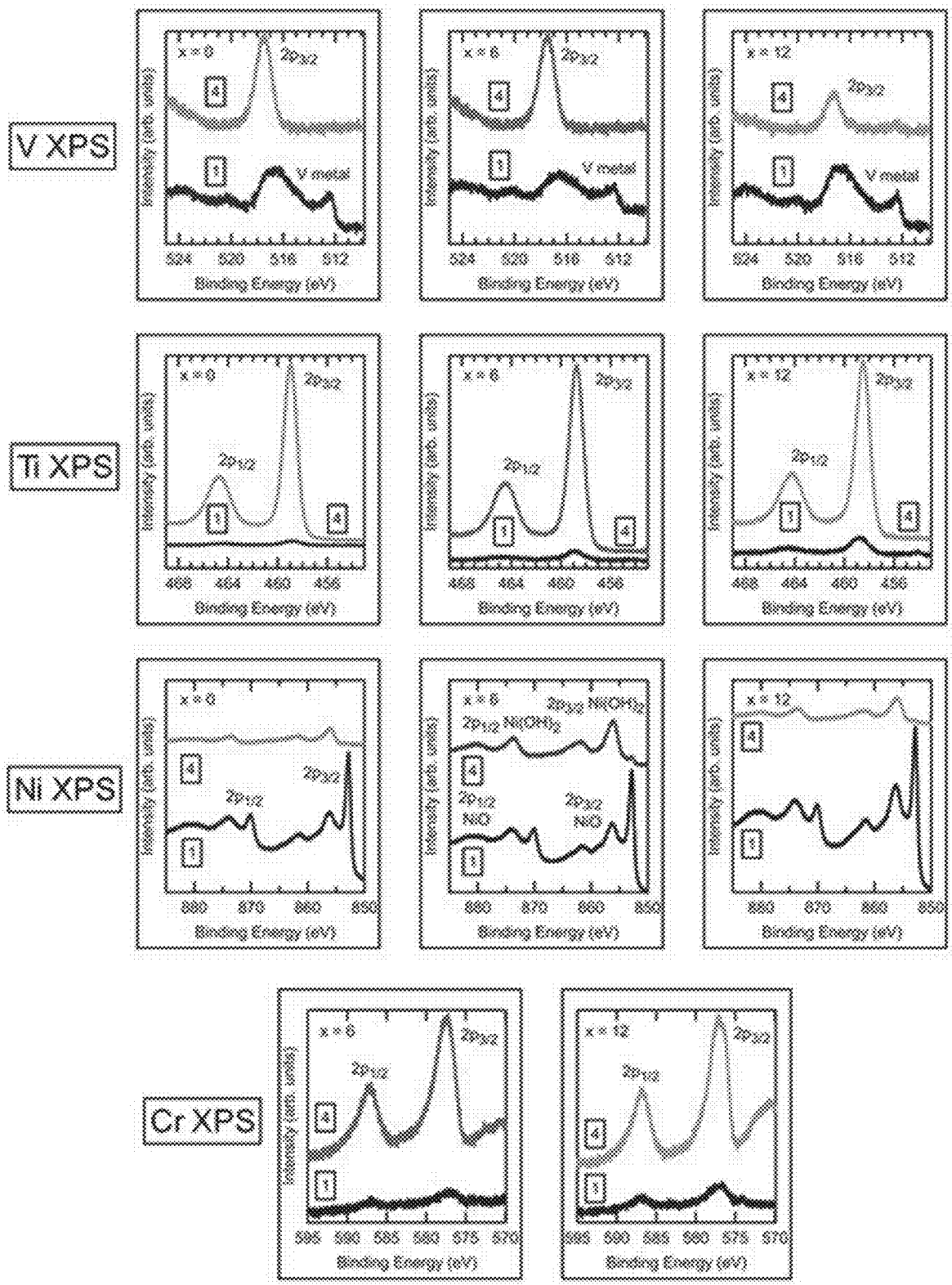
FIG. 11. XPS spectra of V, Cr, Ni, and Ti prior to charge and after full discharge of $Ti_{29}V_{62-x}Ni_9Cr_x$ (x=0, 6, and 12) alloys. Boxed numbers correspond to the state of charge indicated in FIG. 3A.

We further characterized the surface of the electrodes by XPS, and the results are presented in FIG. 11. Aside from Ti, the elemental XPS spectra for all three electrodes shift to higher oxidation states associated with oxides or hydroxides. An in-depth analysis to determine the exact oxide species is difficult due to the multicomponent nature of the alloys, as well as the broad peaks in the V and Cr spectra. The spectra confirm, however, that surface V has oxidized to a higher oxidation state (that will dissolve into solution) as a result of deep discharge.

Corrosion Suppression and Electrochemical Performance

Figure 12:
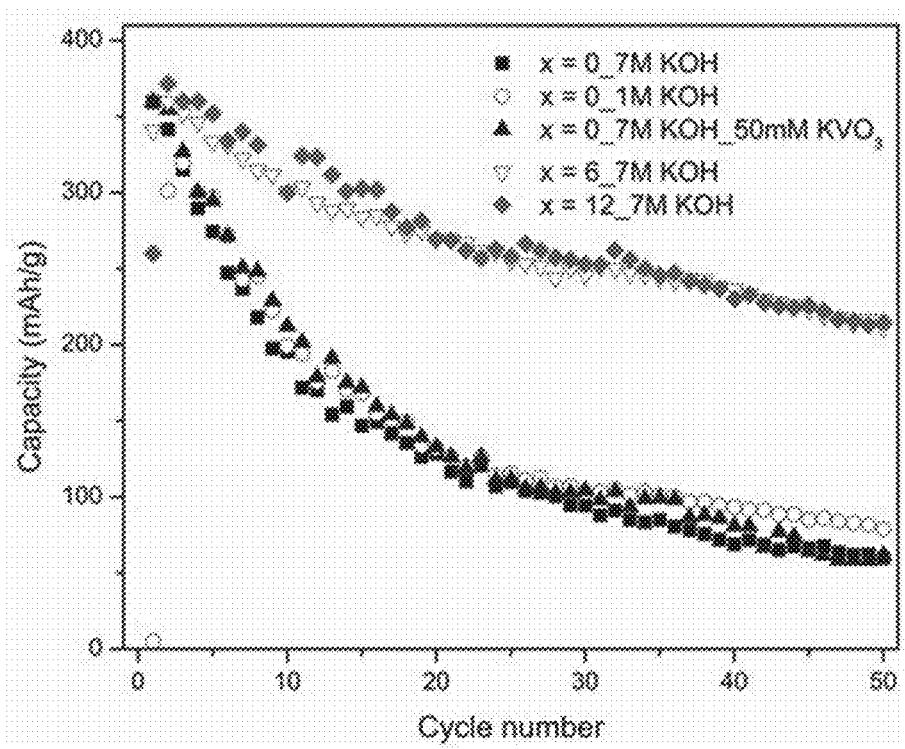
FIG. 12. Cycle performance of $Ti_{29}V_{62}Ni_9Cr_x$ (x=0, 6, and 12) alloy electrodes in various electrolytes. All tests were performed in air-saturated beaker cells. Cells were charged to 800 mAh/g, then discharged following the three-step procedure to −0.75 V.

The Pourbaix diagram indicates that V corrosion is affected by four factors that modify the electrochemical and chemical environment of the alloy electrode: (1) electrode potential, (2) pH, (3) vanadate ion concentration, and (4) oxygen concentration near the electrode surface. From our previous analysis (see Table 2), it is clear that the $Ti_{29}V_{62}Ni_9$ alloy electrodes must not be discharged past −0.75 V to avoid catastrophic V dissolution. FIG. 12 further explores controlling factors (2) and (3) in aerated KOH solution and shows no improvement in cycle stability. Compared to these strategies, Cr-substitution within the alloy improves cycle performance in aerated electrolytes, although capacity loss is still high at over 40% for 50 cycles.

Figure 4A:
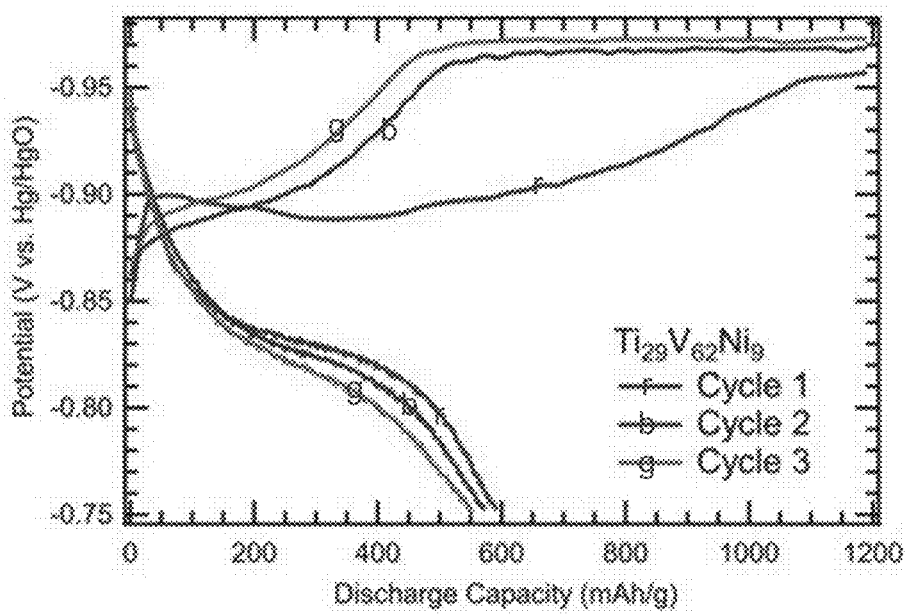
FIGS. 4A-4B. The charge/discharge curves for FIG. 4A: $Ti_{29}V_{62}Ni_9$
Figure 4B:
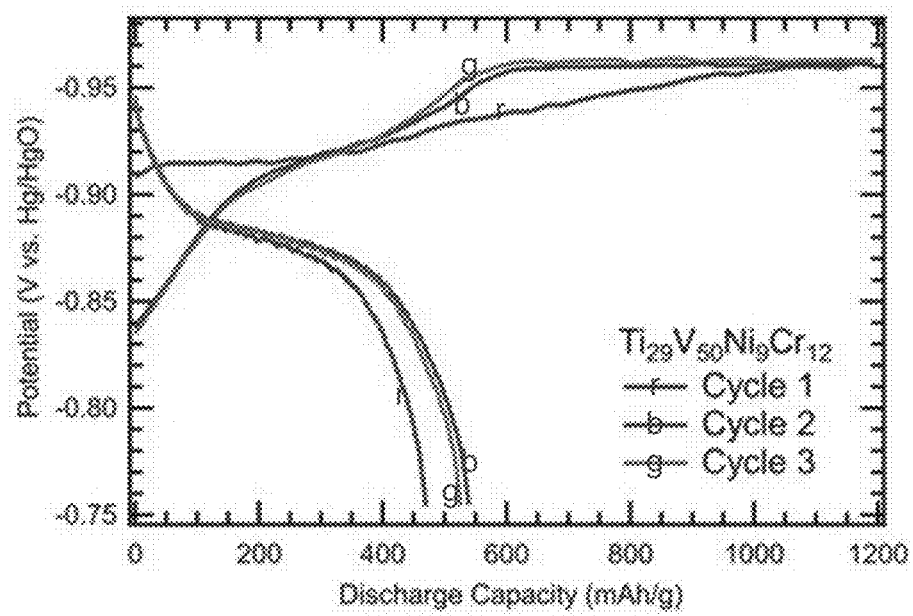

FIGS. 4A-4B show the first three charge/discharge cycles of $Ti_{29}V_{62}Ni_9$ and $Ti_{29}V_{50}Ni_9Cr_{12}$ alloy electrodes in a deaerated, Ar-purged three-electrode beaker cell. The electrodes were charged to 1200 mAh/g, and discharged at 20 mA/g to a cutoff potential of −0.75 V. The first charge process for both electrodes differ from that observed in aerated electrolyte (FIG. 3A) in that the charge capacity exceeds the estimated gas-phase capacity of 800 mAh/g before the hydrogen over-charge potential is reached. This capacity could be a result of side reactions occurring at the electrode surface, such as an oxide film that can only be reduced in deareated electrolytes. Future studies of the surface chemistry of the alloy electrodes may provide insight into this question. The voltage profiles of the first discharge processes, however, are consistent with that seen in FIG. 3A and the midpoint potentials are again observed at −0.83 and −0.87 V vs. Hg/HgO for the $Ti_{29}V_{62}Ni_9$ and $Ti_{29}V_{50}Ni_9Cr_{12}$ electrodes, respectively. In the following two cycles, the charge and discharge potential profiles are more symmetrical, with charge capacities slightly exceeding dis-charge (aside from the overcharge region of the charging curve). The $Ti_{29}V_{62}Ni_9$ electrode initially discharges 594 mAh/g capacity, which fades slightly over the next two cycles. This capacity decay process occurs in conjunction with an increasing potential hysteresis, indicating that corrosion still occurs but at a much slower rate. After an initial activation cycle, the $Ti_{29}V_{50}Ni_9Cr_{12}$ electrode reversibly discharges 520 mAh/g, together with stable potential profiles. Compared to a previous study[22] and our preliminary data in air-saturated cells (FIG. 12), our results clearly show that a higher reversible capacity can be attained by suppressing vanadium corrosion by using a deaerated electrolyte.

To explore the effects of Cr and vanadate ion addition on the long-term cycling behavior of the $Ti_{29}V_{62-x}Ni_9Cr_x$ (x=0, 6, and 12) alloy electrodes in deaerated electrolyte, sealed coin cells were prepared with excess cathode material (at least 40 times the MH capacity). The cycling performance of these coin cells is presented in FIGS. 5A-5C. An abundance of cathode material is used to prevent oxygen evolution during charging and provide a relatively stable cathode potential to serve both as the counter and reference electrode. The small internal volume of the coin cell limits the amount of oxygen in the cell, even if the cell is sealed in ambient conditions (see more details of coin cell preparation in FIG. 13 and description therein). The coin cells were charged to either 550 or 400 mAh/g and discharged to 1.10 V following the three-step discharge procedure.

Figure 5A:
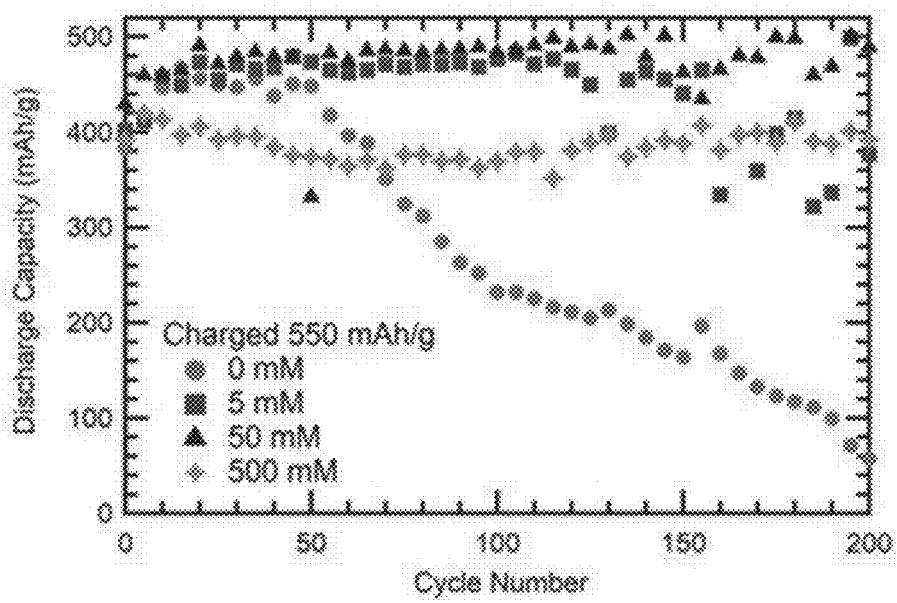
FIGS. 5A-5C. Cycling performance of coin cells containing

The effect of vanadate ion concentration was investigated by preparing KOH electrolyte with 5, 50, and 500 mM of added $KVO_3$ for use in coin cells with $Ti_{29}V_{62}Ni_9$ electrodes (FIG. 5A). Compounds such as $LiVO_3$, $NaVO_3$, and $KVO_3$ may all be used to prepare electrolytes containing vanadate ions.[35] We selected $KVO_3$ to avoid introducing another cation species into the KOH electrolyte. The valence state of V in both solid $KVO_3$ and aqueous $VO_4^{3-}$ is 5+. The $VO_4^{3-}$ ions in an ionic compound are polymerically linked by a single oxygen atom.[40] This ionic compound dissociates into the corresponding cations and $VO_4^{3-}$ anions.

These cells were previously activated (not shown) by sequentially cycling 5 times each to charge capacities of 100, 300, and 500 mAh/g. This step-activation process was necessary to prevent early failure of the $Ti_{29}V_{62}Ni_9$ electrodes (manifesting as unstable capacity in FIGS. 5B-5C). Despite this, the cycle stability of $Ti_{29}V_{62}Ni_9$ electrodes is rather poor in pure KOH electrolyte, but greatly improves with increasing vanadate ion concentration. The cell with 5 mM $KVO_3$ in KOH electrolyte discharged 480 mAh/g maximum capacity, but began to fail after 130 cycles. The cells containing 50 mM $KVO_3$ in KOH electrolyte performed best, discharging nearly 500 mAh/g for 200 cycles. With the addition of 500 mM $KVO_3$ the cycle stability is maintained, but at a lower capacity of 400 mAh/g, probably due to slower ion migration in the electrolyte. The capacity fluctuations at later cycles are likely related to the repetitive formation and disruption of the surface oxide layer during charge/discharge cycles.

Figure 5B:
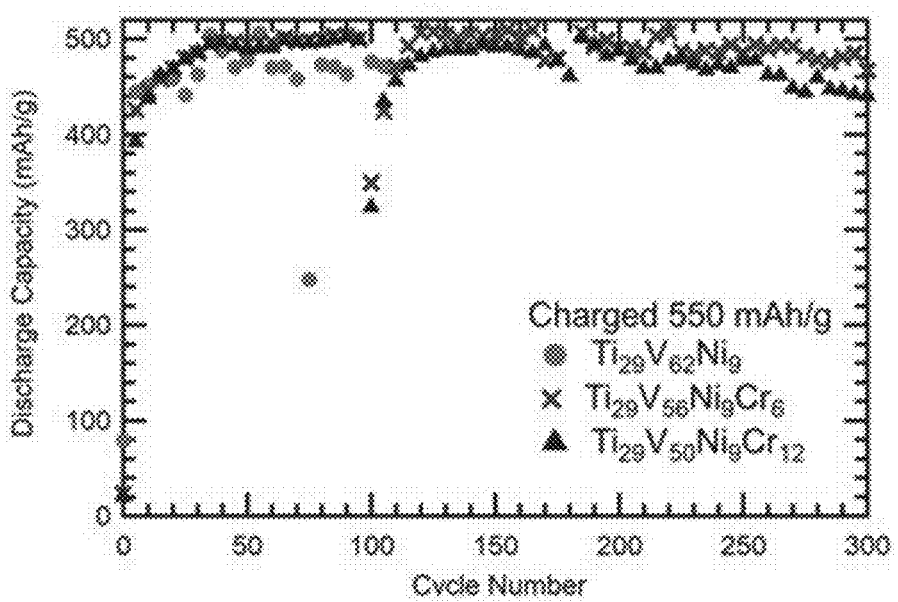
Figure 5C:
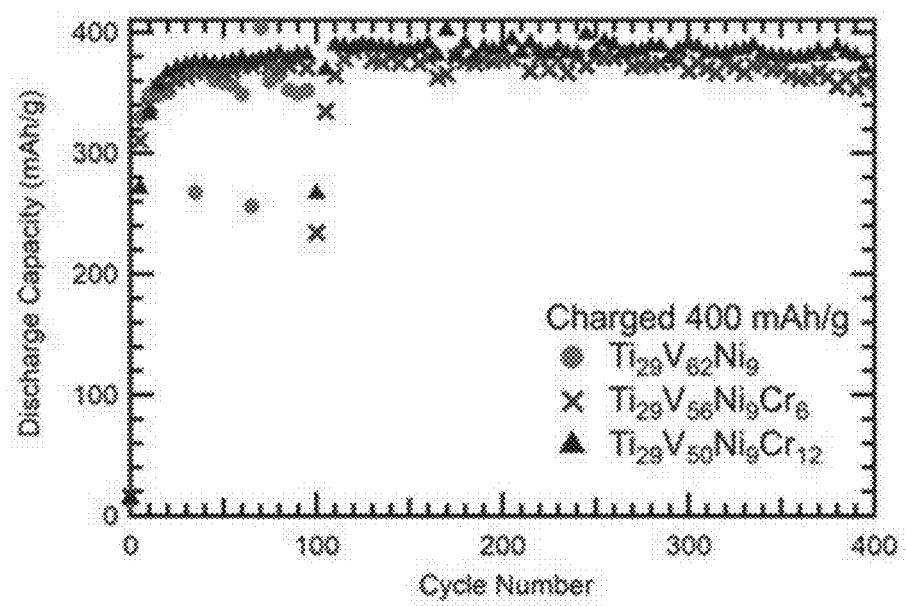
Figure 14A:
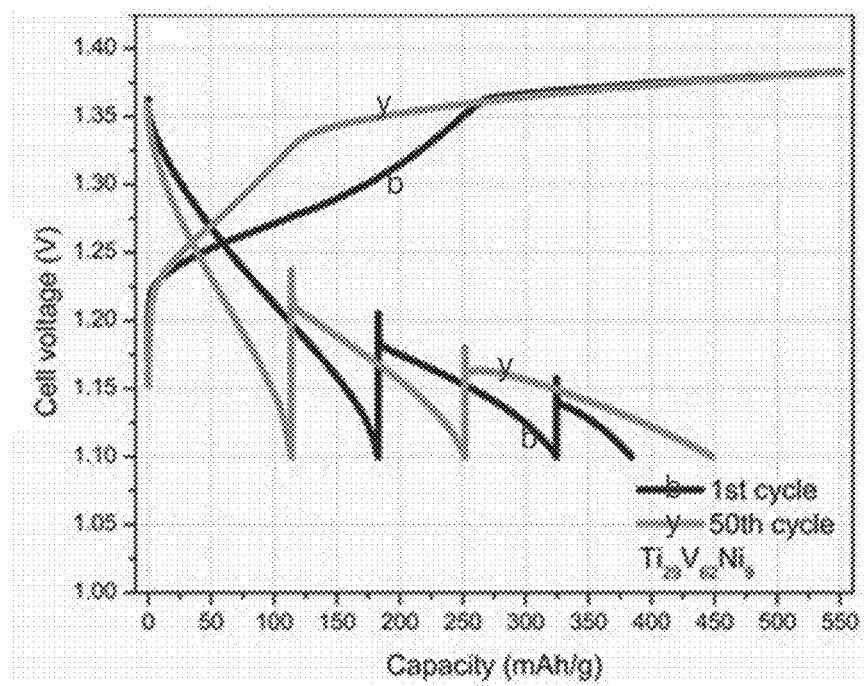
FIGS. 14A-14B. Charge/discharge curves of $Ti_{29}V_{62}Ni_9$ and $Ti_{29}V_{50}Ni_9Cr_{12}$ electrodes in the coin cell configuration. The cells were charged for 550 mAh/g and three-step discharged at 100, 40 and 20 mA/g to 1.10 V. The decrease of discharge capacity at the high current step shows that the rate capability of the MH electrode decreases with cycling, despite excellent capacity retention.
Figure 14B:
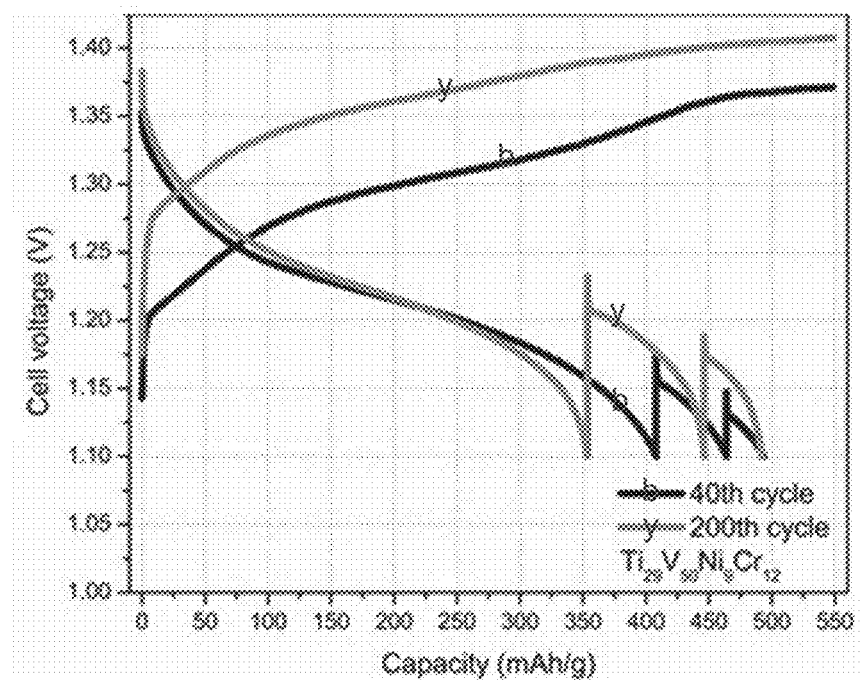

We compared the strategy of vanadate ion addition to that of Cr substitution in the same coin cell setup. FIG. 5B compares the cycle stability of the $Ti_{29}V_{62-x}Ni_9Cr_x$ (x=0, 6, and 12) alloy electrodes in pure KOH electrolyte. It was found that the step-activation process used in FIG. 5A was not necessary for the Cr-containing electrodes. The x=6 and 12 electrodes exhibit excellent cycle stability, delivering 500 mAh/g of capacity for 300 cycles. In some cases when cells were stopped and restarted due to rearrangement of test channels or instrument power failure during the 9 months of cycling (see FIGS. 5A-5C caption), the capacity was recovered after a few cycles. The capacity of the $Ti_{29}V_{62}Ni_9$ electrodes was not recovered, potentially indicating the formation of a thick passivation layer on the electrode surface. The excellent cycle stability of $Ti_{29}V_{62-x}Ni_9Cr_x$ (x=0, 6, and 12) al-loy electrodes is also seen in FIG. 5C, in which the x=6 and 12 electrodes were charged to 400 mAh/g and cycled stably for 400 cycles with around 95% coulombic efficiency after activation. Despite the excellent capacity retention, the voltage hysteresis and rate capability decreases with cycling (FIGS. 14A-14B), indicating a growing surface oxide film.

Discussion

Extent of Phase Transformations

The $VH_x$ isotherm exhibits two distinct two-phase regions (plateaus) separated by 6 orders of magnitude in pressure.[9,11] In contrast, the phase boundaries of the $Ti_{29}V_{62-x}Ni_9Cr_x$ alloys are much less distinct (FIG. 2D). Sloping plateaus are common in solid solution alloys because their heterogeneous local chemistry creates a distribution of interstitial site energies for hydrogen occupancies.[11] The plateau associated with the BCT-FCC phase transformation is apparent in these alloy isotherms, however it is more sloping and occurs over a smaller range of hydrogen concentration than for pure V. As a result, part of the electrochemical capacity may be accessed from the wide, sloping BCT monohydride phase region before the corresponding electrochemical potential favors oxidation.

Mechanisms of Vanadium Oxidation

Figure 6A:
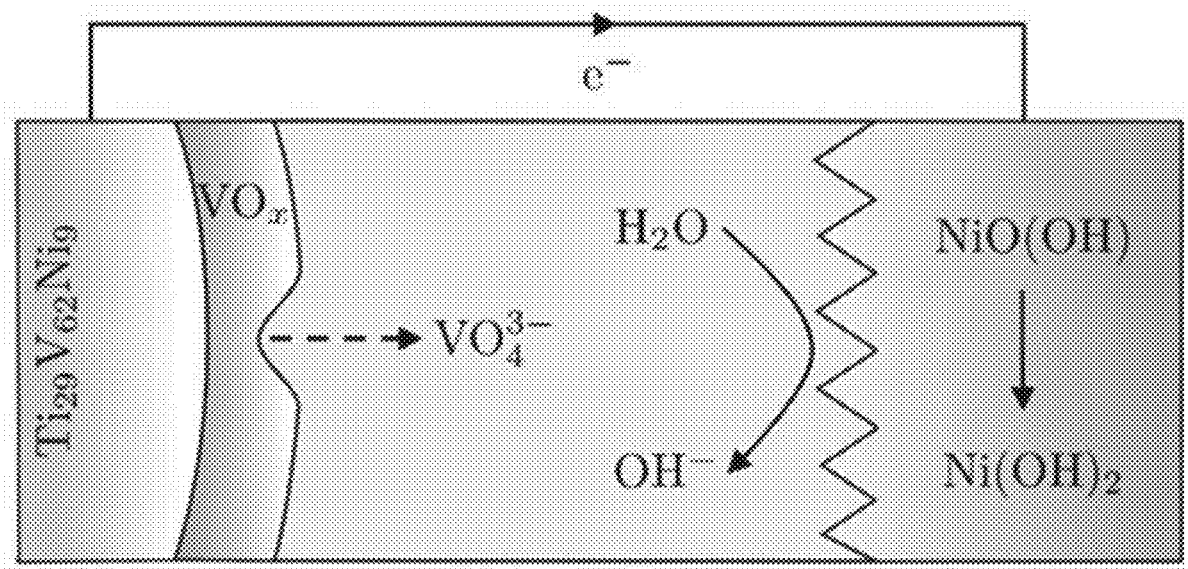
FIGS. 6A-6B. Schematics illustrating the (FIG. 6A) operational and (FIG. 6B) local oxidation that occurs for V in the $Ti_{29}V_{62}Ni_9$ alloy electrodes.
Figure 6B:
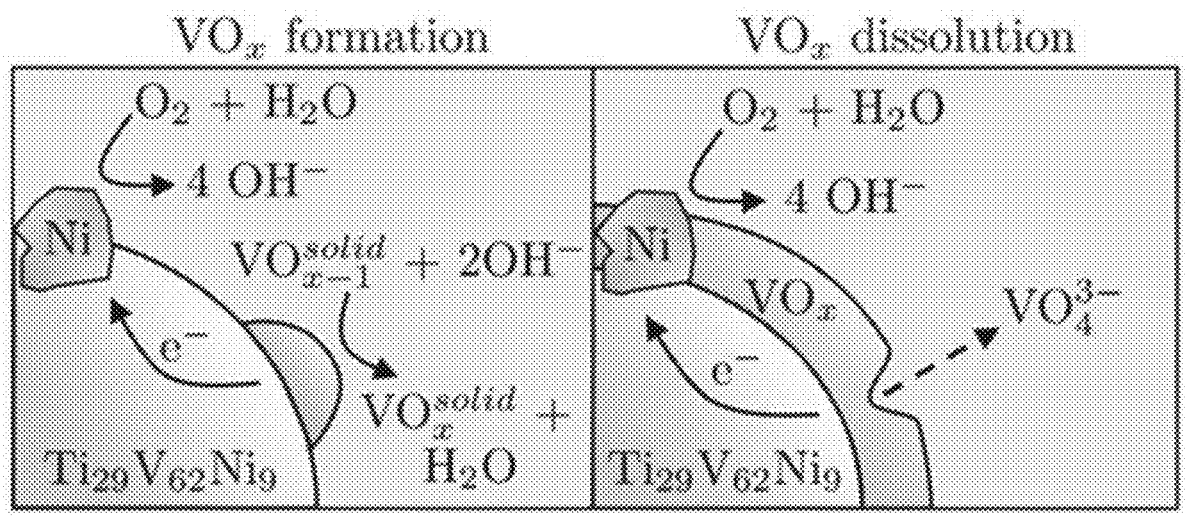

To access the high capacity suggested by the gas-phase isotherms, the irreversible dissolution of V must be suppressed. The oxidation/dissolution of V in the alloy electrodes occurs by two distinct pathways, illustrated schematically in FIGS. 6A-6B. When the MH electrode is electrochemically discharged past the V dissolution potential, the corresponding cathodic reaction is the reduction of NiO(OH) to $Ni(OH)_2$ and the anodic reaction is the oxidation of $VO_x$ to $VO_4^{3-}$. This process is mitigated by imposing a discharge cut-off potential more negative than the dissolution potential. In addition to this "operational oxidation", local oxidation reactions take place internally within the MH alloy electrode regardless of the presence of a $Ni(OH)_2$ counter electrode (FIG. 6B). In this case the V oxidation is coupled with the following reduction reactions:

(1)

or

(2)

with Eq. (1) strongly favored in highly alkaline media.[41] During the $VO_x$ formation in the left panel of FIG. 6B, the oxidation state of V is less than +5. The interaction with V and the $OH^-$ in the electrolyte was proposed by Al-Kharafi, et al.[36] The heterogeneous nature of the alloy electrodes, consisting of the Ni current collector and Ni binder in addition to the Ni-rich and V-rich regions of the MH itself, likely results in a varying electrode potential across the surface. The ICP-MS results of Tables 1 and 3 show that V is the only element undergoing significant corrosion, indicating that the V-rich region of the alloy is the anodic component which donates electrons to other parts of the electrode to facilitate the reduction reactions of Eqs. (1) and (2).

Corrosion Suppression and Capacity Retention

A combination of a low oxygen environment and either vanadate ion additions to the electrolyte or Cr substitutions to the alloy are necessary for suppressing V corrosion. Without the removal of oxygen from the electrolyte, the capacity of the electrodes in FIG. 12 begins to fade immediately. The vanadate ion additions have little effect on the cyclability of $Ti_{29}V_{62}Ni_9$ electrodes, whereas Cr additions do show limited improvement. Much like its role in stainless steel, Cr has been thought to form a passivating surface oxide layer on the metal hydride which suppresses corrosion.

By itself, reducing the amount of oxygen in the system does not solve the issue of continued V oxidation. An improvement in the cyclability of the $Ti_{29}V_{62}Ni_9$ electrode is observed when it is cycled in the Ar purged cell (FIGS. 4A-4B) as compared to the beaker cell (FIG. 12). As shown in FIGS. 5A-5C, the capacity of coin cells with the $Ti_{29}V_{62}Ni_9$ electrode in pure KOH electrolyte begins to fade after 50 cycles. In this case, removing oxygen from the electrolyte forces the cathodic reaction to go from reaction (1) to (2), which may be kinetically much slower.[36,41]

The addition of vanadate ions to the electrolyte or substitution of Cr in the alloy suppress V corrosion in the low oxygen environment of the coin cells. As seen in FIG. 5A, the $Ti_{29}V_{62}Ni_9$ electrode stably cycles at 500 mAh/g for 200 cycles with the addition of 50 mM $KVO_3$ to the KOH electrolyte. The improvement can be explained with Le Chatelier[4]'s principle: as the concentration of the product ($VO_4^{3-}$) is increased, the equilibrium shifts towards the reactants ($VO_x$). The $Ti_{29}V_{56}Ni_9Cr_6$ and $Ti_{29}V_{50}Ni_9Cr_{12}$ electrodes cycled in coin cells exhibit excellent capacity and cycle stability of 500 mAh/g for 300 cycles (FIG. 5B) or 400 mAh/g for 400 cycles (FIG. 5C).

Integration into Rechargeable Batteries

Commercial MH—Ni batteries rely on the MH electrode to reduce oxygen evolved at the $Ni(OH)_2$ positive electrode during cell over-charging. The combination of a porous separator and electrolyte-starved design facilitate this protection mechanism.[42] The optimum Cr concentration for Ti—V—Ni—Cr-based alloys to survive in this environment remains an open question. Increasing the Cr content beyond 12 at % may further improve corrosion resistance, but this will likely reduce the reversible capacity and require tailoring the alloy composition to maintain a suit-able equilibrium hydrogen pressure.[23] It may also be prudent to adopt different charging protocols for MH—Ni batteries utilizing the $Ti_{29}V_{62-x}Ni_9Cr_x$ alloy electrodes.

Alternatively, the $Ti_{29}V_{62-x}Ni_9Cr_x$ alloy electrodes can be incorporated into a MH-air system. In a MH-air cell an anion exchange membrane (AEM) stable in alkaline media can be used to prevent oxygen crossover.[43] Replacing the heavy $Ni(OH)_2$ electrode with an air electrode will greatly improve the energy density. We calculated the cell level energy density of a MH-air system as a function of MH electrode capacity and thickness, and the results are plotted in FIGS. 7A-7B. A description of the cell geometry and calculation details are provided in the Example 1A. This is an optimistic calculation assuming the BCC electrodes are engineered to the same quality as modern $AB_5$ MH electrodes. The shaded regions in the figure correspond to the range of energy densities for 18650 type Li-ion cells.[44,45] With an anode capacity of 500 mAh/g, the maximum energy densities of 240 Wh/kg and 550 Wh/L are obtained with an anode thickness of 2-2.5 mm.

The gravimetric energy density is comparable to 18650 type Li-ion cells, whereas the volumetric energy density is approximately 15% less. The discrepancy in volumetric energy density is due to the inclusion of the air channel in the 100 Wh cell volume; we expect a similar loss in volumetric energy density when the volume of cooling channels between 18650 cells is considered.

Conclusions

The microstructure, hydrogen absorption, and electrochemical properties of $Ti_{29}V_{62-x}Ni_9Cr_x$ (x=0, 6 and 12) alloy electrodes were investigated. Vanadium dissolution leads to irreversible capacity loss, which can be addressed by a combination of strategies: (1) removing oxygen from the system, (2) increasing vanadate ion concentration in the electrolyte, and (3) increasing Cr content in the alloy. Capacities as high as 594 mAh/g and 520 mAh/g for the $Ti_{29}V_{62}Ni_9$ and $Ti_{29}V_{50}Ni_9Cr_{12}$ alloy electrodes, respectively, were demonstrated with Ar-purged cells. Coin cells containing Cr-substituted alloy electrodes and Cr-free alloy electrodes with vanadate ion containing electrolyte delivered around 500 mAh/g for up to 300 cycles. These V-based BCC MH electrodes achieve high capacity by accessing the monohydride phase, once V corrosion is sufficiently suppressed. This may open the door for future development of high capacity MH electrodes enabling safe and high energy density aqueous batteries.

REFERENCES CORRESPONDING TO EXAMPLE 1

1 J. H. N. van Vucht, F. A. Kuijpers and H. C. A. M. Bruning, Philips Res. Rept., 1970, 25, 133-140.
2 T. Sakai, H. Yoshinaga, H. Miyamura, N. Kuriyama and H. Ishikawa, Journal of Alloys and Compounds, 1992, 180, 37-54.
3 T. Sakai, H. Miyamura, N. Kuriyama, I. Uehara, M. Muta, Takagi, U. Kajiyama, K. Kinoshita and F. Isogai, Journal of Alloys and Compounds, 1993, 192, 158-160.
4 M. Tsukahara, K. Takahashi, T. Mishima, T. Sakai, H. Miyamura, N. Kuriyama and I. Uehara, Journal of Alloys and Compounds, 1995, 224, 162-167.
5 M. Tsukahara, K. Takahashi, T. Mishima, T. Sakai, H. Miyamura, N. Kuriyama and I. Uehara, Journal of Alloys and Compounds, 1995, 226, 203-207.
6 M. Tsukahara, K. Takahashi, T. Mishima, H. Miyamura, T. Sakai, N. Kuriyama and I. Uehara, Journal of Alloys and Compounds, 1995, 231, 616-620.
7 H. Inoue, S. Arai and C. Iwakura, Electrochimica Acta, 1996, 41, 937-939.
8 A. J. Maeland, T. R. P. Gibb and D. P. Schumacher, Journal of the American Chemical Society, 1961, 83, 3728-3729.
9 J. J. Reilly and R. H. Wiswall, Inorganic Chemistry, 1970, 9, 1678-1682.
10 S. Ono, K. Nomura and Y. Ikeda, Journal of the Less Common Metals, 1980, 72, 159-165.
11 H. Yukawa, D. Yamashita, S. Ito, M. Morinaga and S. Yamaguchi, Materials Transactions, 2002, 43, 2757-2762.

12 C. Iwakura, W. K. Choi, R. Miyauchi and H. Inoue, Journal of The Electrochemical Society, 2000, 147, 2503-2506.
13 T. Hagi, Y. Sato, M. Yasuda and K. Tanaka, Transactions of the Japan Institute of Metals, 1987, 28, 198-204.
14 G. Libowitz and A. Maeland, Materials Science Forum, 1988, 31, 177-196.
15 A. Kagawa, E. Ono, T. Kusakabe and Y. Sakamoto, Journal of the Less Common Metals, 1991, 172, 64-70.
16 M. Tsukahara, K. Takahashi, T. Mishima, A. Isomura and T. Sakai, Journal of Alloys and Compounds, 1996, 243, 133-138.
17 M. Tsukahara, K. Takahashi, A. Isomura and T. Sakai, Journal of Alloys and Compounds, 1999, 287, 215-220.
18 R. Guo, L. X. Chen, Y. Q. Lei, B. Liao, T. Ying and Q.-D. Wang, International Journal of Hydrogen Energy, 2003, 28, 803-808.
19 H. Inoue, R. Miyauchi, R. Shin-ya, W.-K. Choi and C. Iwakura, Journal of Alloys and Compounds, 2002, 330, 597-600.
20 L. Sun, J. Lin, Z. Cao, F. Liang and L. Wang, Journal of Alloys and Compounds, 2015, 650, 15-21.
21 R. Burch and N. B. Mason, Journal of the Chemical Society, Faraday Transactions 1: Physical Chemistry in Condensed Phases, 1979, 75, 561-577.
22 H. Inoue, S. Koyama and E. Higuchi, Electrochimica Acta, 2012, 59, 23-31.
23 H. Inoue, N. Kotani, M. Chiku and E. Higuchi, Journal of Alloys and Compounds, 2015, 645, S136-S139.
24 M. Pourbaix, Atlas of electrochemical equilibria in aqueous solutions, National Association of Corrosion Engineers, 1974.
25 B. Beverskog and I. Puigdomenech, Corrosion Science, 1997, 39, 43-57.
26 B. Beverskog and I. Puigdomenech, Corrosion Science, 1997, 39, 969-980.
27 W. Wilhelmsen and T. Hurlen, Electrochimica Acta, 1987, 32, 85-89.
28 R. S. Schrebler Guzman, J. R. Vilche and A. J. Arvia, Corrosion Science, 1978, 18, 765-778.
29 L. Wang, J. Zhang, Y. Gao, Q. Xue, L. Hu and T. Xu, Scripta Materialia, 2006, 55, 657-660.
30 S. Mentus, J. Pjescic and N. Blagojevic, Materials and Corrosion, 2002, 53, 44-50.
31 J. H. Kim, H. Lee, P. S. Lee, C.-Y. Seo and J. Y. Lee, Journal of Alloys and Compounds, 2003, 348, 293-300.
32 K. Post and R. G. Robins, Electrochimica Acta, 1976, 21, 401-405.
33 G. Inzelt, A. Lewenstam and F. Scholz, Handbook of Reference Electrodes, Springer, Dordrecht, 2013.
34 L. G. Hepler, J. O. Hill and I. G. Worsley, Chemical Reviews, 1971, 71, 127-137.
35 B. Liu, S. Zheng, S. Wang, Y. Zhang, A. Ortega, N. S. Kim, K. Han and H. Du, Electrochimica Acta, 2012, 76, 262-269.
36 F. M. Al-Kharafi and W. A. Badawy, Electrochimica Acta, 1997, 42, 579-586.
37 H. Yang, Y. Chen, M. Tao, C. Wu, J. Shao and G. Deng, Electrochimica Acta, 2010, 55, 648-655.
38 Y. Liu, H. Pan, M. Gao, R. Li and Q. Wang, The Journal of Physical Chemistry C, 2008, 112, 16682-16690.
39 X. B. Yu, Z. Wu, B. J. Xia and N. X. Xu, The Journal of Chemical Physics, 2004, 121, 987-990.
40 H. T. Evans, Zeitschrift für Kristallographie—Crystalline Materials, 1960, 114, 257-277.
41 E. McCafferty, Introduction to Corrosion Science, Springer New York, N.Y., 2010.
42 T. B. Reddy and D. Linden, Linden's handbook of batteries, McGraw-Hill, New York, 4th edn., 2011.
43 K. J. T. Noonan, K. M. Hugar, H. A. Kostalik, E. B. Lobkovsky, H. D. Abruña and G. W. Coates, Journal of the American Chem-ical Society, 2012, 134, 18161-18164.
44 J. W. Choi and D. Aurbach, Nature Reviews Materials, 2016, 1, 16013.
45 W. F. Howard and R. M. Spotnitz, Journal of Power Sources, 2007, 165, 887-891.

Example 1A: Supplementary Information—High Capacity V-Based Metal Hydride Electrodes for Rechargeable Batteries The microstructures of the $Ti_{29}V_{62-x}Ni_9Cr_x$ (x=0, 6, and 12) alloys were characterized by x-ray diffraction (XRD), scanning electron microscopy (SEM) with backscattered electron imaging (BES), and energy dispersive x-ray spectroscopy (EDS). Alloy samples characterized by XRD were pulverized to a fine powder via the procedures outlined in the main text. For SEM and EDS, the samples were mounted in graphite and polished to a mirror finish.

Measuring the lattice parameter is challenging because of the broad, overlapping peaks from regions of the BCC phase with different chemical compositions. The lattice parameter, a, of the majority V-rich region clearly decreases with higher Cr content, however. From our analysis of the backscattered electron images, we estimate the fraction of the Ni-rich region to be about 9 vol %. The small amount of the Ni-rich region, the small number of reflections in the measured $2\theta$ range, and the broad, overlapping peaks makes analysis of the lattice parameter of this region difficult. Given that the second peak has nearly disappeared in the x=12 sample, we estimate that the lattice parameter of the Ni-rich region is slightly smaller, on the order of 0.3065-0.307 nm.

Electrochemical cells were assembled using electrodes of the $Ti_{29}V_{62-x}Ni_9Cr_x$ (x=0, 6, and 12) alloys. Three types of cells were used: (1) 3-electrode beaker cells assembled in air, (2) a 3-electrode Ar purged cell, and (3) coin cells assembled in air. In addition to electrochemical cycling, elemental analysis of the electrolyte was performed with inductively coupled plasma mass spectrometry (ICP-MS), and the surface oxidation states of the cycled electrodes were characterized by x-ray photoelectron spectroscopy (XPS).

FIG. 10 shows the discharge curves of $Ti_{29}V_{62}Ni_9$ electrodes in pristine 1 M KOH, 6.9 M KOH, and 6.9 M KOH with 500 mM $KVO_3$. All three electrodes were assembled in air in three-electrode beaker cells. The Hg/HgO reference electrodes were prepared with the corresponding KOH solutions. The experiments were performed by discharging at a small current of 10 mA/g based on the loading of the alloy powder. These cells were discharged without prior charging, so the capacity is a result of metal oxidation rather than oxidation of absorbed hydrogen. According to the Pourbaix diagram, vanadium oxidation to vanadate ions is expected at around −0.9 V vs. Hg/HgO (pH=15) for a pure vanadium electrode. The corresponding dissolution potential for the alloy is approximately −0.7 V in 6.9 M KOH solution, consistent with that reported in the main text (FIG. 3A). Increasing the vanadate ion concentration in the electrolyte, or reducing the pH, both shift the dissolution potential to a more positive value, as predicted by the Pourbaix diagram. Slower kinetics may also contribute to the shift in dissolution potential, however.

The XPS spectra for the $Ti_{29}V_{62-x}Ni_9Cr_x$ (x=0, 6, 12) electrodes before cycling (spectra [1]) and after charging and discharging to −0.50 V (spectra [4]) are presented in FIG. 11. The V $2p_{3/2}$ metallic peaks disappear for the $Ti_{29}V_{62}Ni_9$ and $Ti_{29}V_{56}Ni_9Cr_6$ electrodes, and the oxide $2p_{3/2}$ peaks shift to a higher binding energy. This shift corresponds to an increase in the oxidation state of the V. The surface oxide is likely a mixed oxide and manifests as a broad peak. There are no shifts in the Ti $2p_{3/2}$ or $2p_{1/2}$ peaks; the native oxide layer appears to be stable in the electrolyte environment. The XPS spectra for Ni show a disappearance of the metallic $2p_{3/2}$ and $2p_{1/2}$ peaks and emergence of the corresponding $Ni(OH)_2$ peaks. The NiO $2p_{3/2}$ and $2p_{1/2}$ peaks persist during cycling. The broad Cr $2p_{3/2}$ and $2p_{1/2}$ peaks have a small shift to higher energy and an increase in amplitude, indicating that a $CrO_x$ layer has formed on the surface. Similar to V, the $CrO_x$ layer is likely a mixed oxide.

Figure 13:
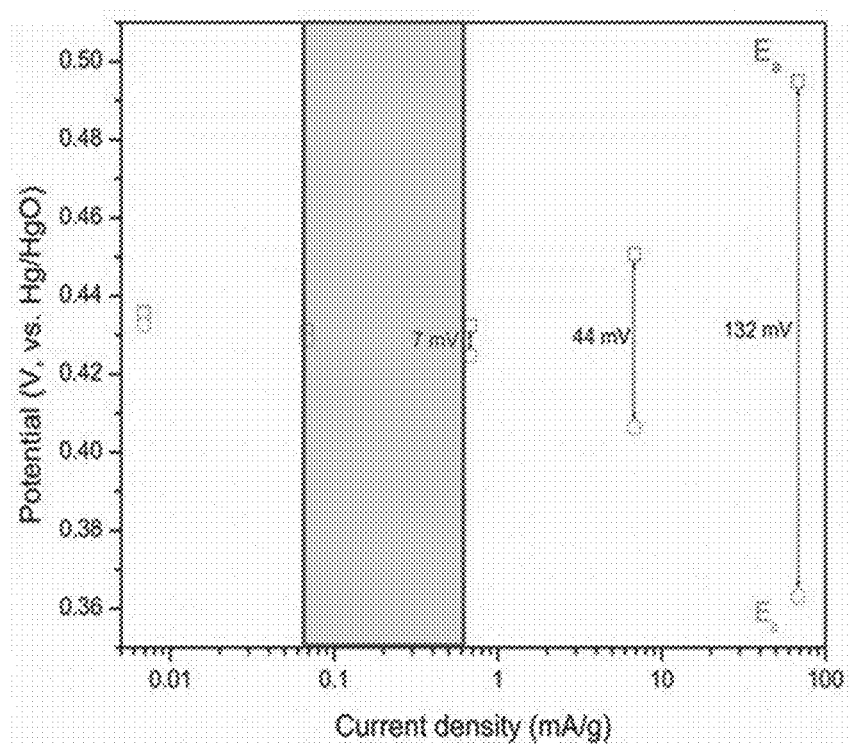
FIG. 13. Operation potential for the $Ni(OH)_2/NiO(OH)$ electrode used for coin cell assembly. Current density is based on the mass loading of the $Ni(OH)_2$ electrode powder mixture. $E_a$ and $E_c$ correspond to the plateau potentials on charge and discharge, respectively. The shaded area corresponds to the applied current density range for the paired MH electrode (10 to 100 mA/g based on 3 mg/cm² loading).

The design of the coin cells considered the following factors: (1) with a small internal volume, the cells can be sealed in air with negligible amount of oxygen trapped inside the cells; (2) the MH electrode is paired with a much larger $Ni(OH)_2$ positive electrode, so that the positive electrode does not evolve oxygen during cell overcharge and the potential remain relatively stable as a reference electrode. This configuration is also more sensitive to capacity degradation of the MH electrode. FIG. 13 shows the operation potential of the $Ni(OH)_2/NiOOH$ electrode used in this study. These electrodes were obtained from BASF (BASF-Ovonic, Rochester Hills, Mich., USA) and punched into disks with a 1.27 cm diameter. The capacity of each electrode is about 24 mAh. The results shown in FIG. 13 were obtained by first charging a $Ni(OH)_2$ electrode to 12 mAh, converting part of the $Ni(OH)_2$ to NiOOH. The $Ni(OH)_2/NiOOH$ electrode was then charged at the specific current density shown in FIG. 13 for 7200 s, rested for 1200 s, and discharged at the same current density for 7200 s. The charge ($E_a$) and discharge ($E_c$) plateau potentials were recorded and plotted in FIG. 13. The smallest current for the discharge of the coin cells was 20 mA/g, and the vanadium dissolution potential for Cr-free alloy is at about −0.7 V versus Hg/HgO (FIG. 8 and FIG. 3A). For these reasons, and to allow a voltage window as large as possible, the cut-off voltage for all coin cells was set at 1.10 V. All coin cells were assembled with the half-charged cathodes.

The $Ti_{29}V_{50}Ni_9Cr_{12}$ electrodes in FIGS. 5A-5B were charged for 550 mAh/g, which is higher than its maximum discharge capacity as measured in FIGS. 4A-4B. The Coulombic efficiency of these coin cells are also less than 100%. As a result, a small amount of hydrogen is evolved during charging, which may be consumed on the positive electrode by reducing NiO(OH) to $Ni(OH)_2$.[1]

Section 3: Energy Density Calculations of a MH-Air Battery Cell

Figure 15:
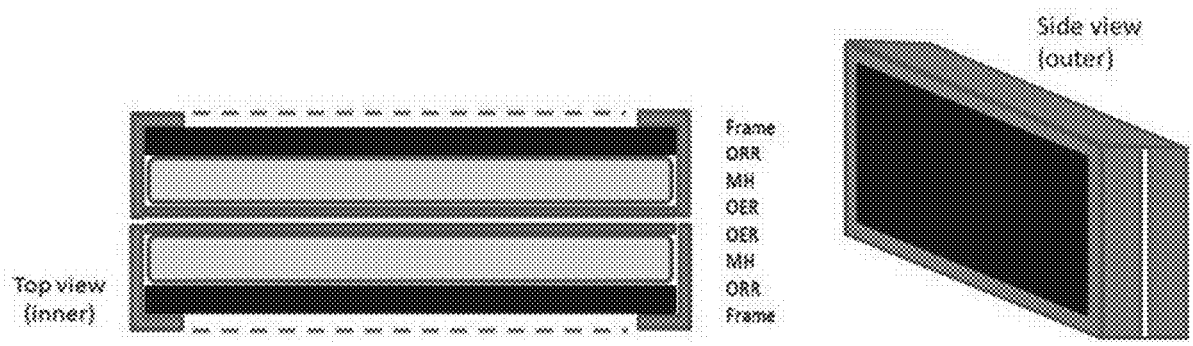
FIG. 15. Top view (left) and 3D side view (right) drawings of the 100-Wh MH-air cell (dimensions not proportional).

Energy density calculations of the MH-air batteries are based on a prismatic cell design. This MH-air cell has three electrodes: oxygen-reduction-reaction (ORR) electrode, oxygen-evolution-reaction (OER) electrode, and a MH anode. The ORR electrode is a commercial alkaline fuel cell air electrode from Electric Fuel (Electric Fuel Limited, Bet Shemesh, Israel) with the catalytic $MnO_2$ on a substrate film of PTFE.[2] The OER electrode is made from Monel mesh. The MH anode is made by pressing MH alloy powder onto a nickel mesh substrate. FIG. 15 shows the layout of the two-sided prismatic cell. The cell consists of two ORR-MH-OER stacks with the OER electrodes facing the interior of the cell. The OER electrodes are separated by a channel through which electrolyte flows. Flowing electrolyte is utilized to compensate for local changes in electrolyte concentration and pH due to water loss or generation as the cell charges or discharges.

Figure 16:
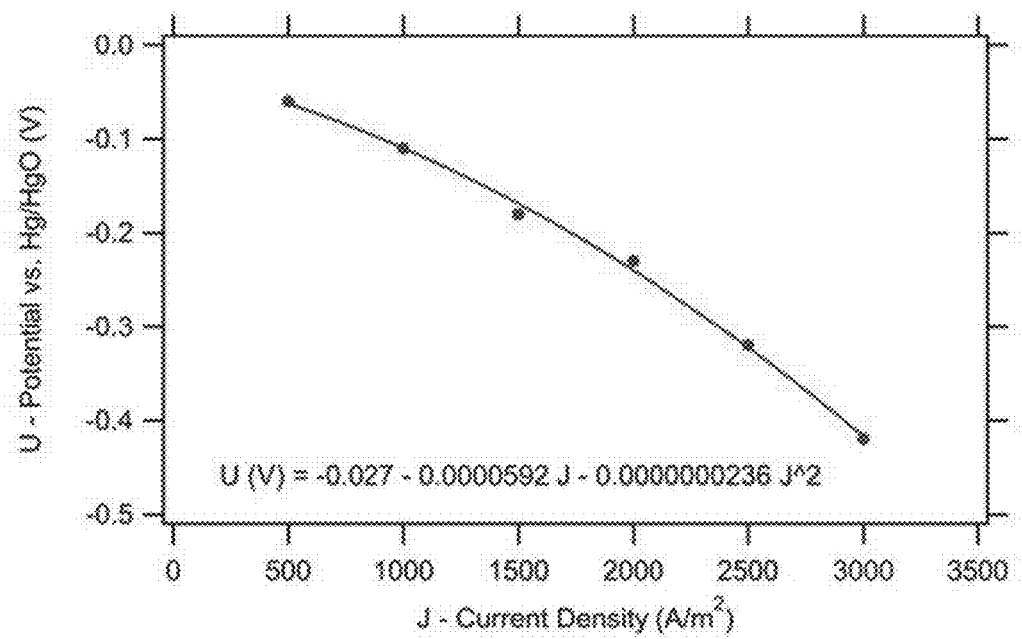
FIG. 16. Plot of electrode potential versus current density for the air electrode manufactured by Electric Fuel.

The cell was designed to achieve 100 Wh with an overall dimension of 20.2 cm×10.2 cm×1.13 cm. The cell discharge potential is determined from the ORR overpotential data as a function of cell current density, provided by the vendor of ORR electrode, and our cycling data for the MH anode. The air electrode potential is presented in FIG. 16. The current density needed from the ORR electrode is chosen to match the specifications of the MH anode for a given discharge rate. The total weight of the cell also includes those of passive components of electrode substrates, separators, frame, and seal materials. Key input parameters of this model are the MH anode thickness and MH anode specific discharge capacity. Other input parameters including dimension of the prismatic cell, dimensions of the two air electrodes, and the cell discharge C-rate, are preset based on project targets and some of the preliminary lab testing results.

Figure 7A:
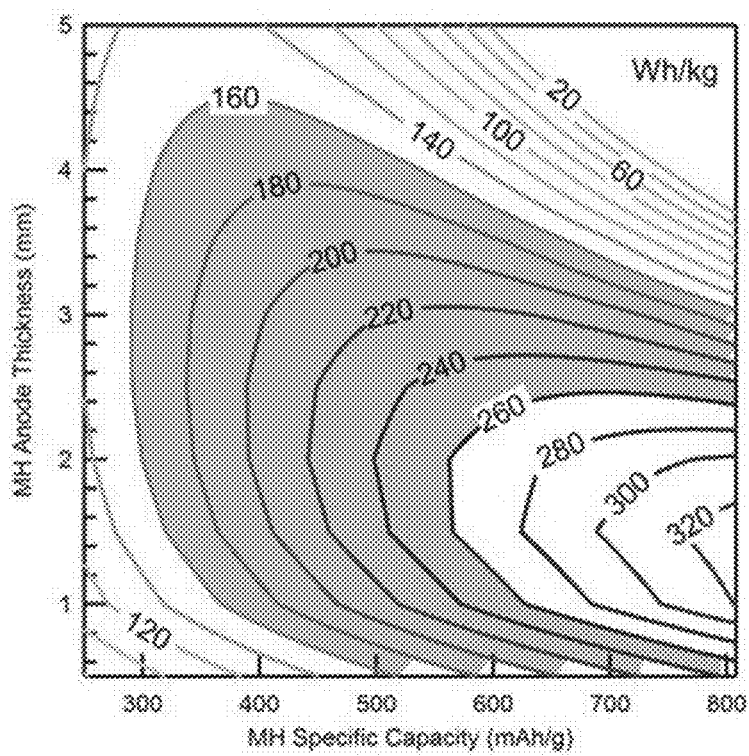
FIGS. 7A-7B. Gravimetric and volumetric energy density analysis of a MH air cell as a function of the specific capacity and thickness of the MH electrode. The shaded areas indicate the published energy density ranges for 18650 type Li-ion batteries.
Figure 7B:
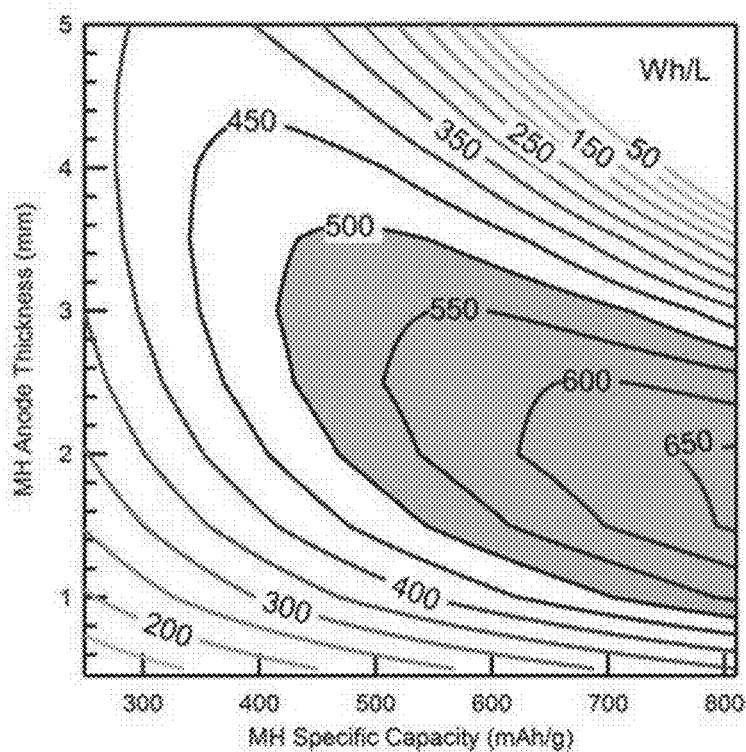

Based on the preliminary experimental results of the cell similar to this design, the MH anode specific discharge capacity is in a range of 150-550 mAh/g, and the practical thickness of the anode is above 300 microns. The model varies the MH anode capacity from 0-800 mAh/g, and thickness from 0.3-5 mm. Varying these two parameters leads to a 2D contour plot of cell level gravimetric and volumetric energy density as shown in the main text FIGS. 7A-7B. The colored lines are regions of constant energy density in Wh/kg or Wh/L. MH anodes containing $Ti_{29}V_{62-x}Ni_9Cr_x$ (x=0, 6, 12) were demonstrated in the manuscript to have a specific capacity of more than 400 mAh/g, making it possible to achieve 200 Wh/kg. From the sensitivity analysis of FIGS. 7A-7B, there is also an optimized range of the MH anode thickness in this prismatic model, based on the targeted energy density. For example, with a target of 200 Wh/kg, the MH anode thickness is optimally 2-2.5 mm. The inputs and results from an individual calculation for the contour plots of FIGS. 7A-7B are provided in Table 4 below. The input values in the EXAMPLE CASE column are based on the specifications determined by FIG. 16 and our MH cycling data. For this example, an anode capacity of 400 mAh/g and thickness of 2.2 mm are chosen. The nominal cathode current is set to match the specifications of the MH anode with a discharge rate of C/3. The model then returns a specific energy density of 207 Wh/kg and a volumetric energy density of 427 Wh/L.

TABLE 4

Input values and energy density results for an example case of a 100 Wh MH-Air cell.
Table of Cell Parameters

| INPUTs | | | OUTPUTs | | | EXAMPLE CASE | | |
|---|---|---|---|---|---|---|---|---|
| Cathode density | 4.00E+03 | kg/m^3 | Cell width | 2.02E−01 | m | Cathode nominal current | 1.30E+03 | A/m^2 |
| Anode density | 4.00E+03 | kg/m^3 | Cell length | 1.02E−01 | m | Cathode nominal potential | −1.44E−01 | V |
| KOH Density | 1.25E+03 | kg/m^3 | Cell thickness w/o frame | 9.30E−03 | m | vs. Hg/HgO | | |

TABLE 4-continued

Input values and energy density results for an example case of a
100 Wh MH-Air cell.
Table of Cell Parameters

| INPUTs | | | OUTPUTs | | | EXAMPLE CASE | | |
|---|---|---|---|---|---|---|---|---|
| Plastic density | 9.00E+02 | kg/m^3 | Cell thickness w/frame | 1.13E−02 | m | Anode capacity | 4.00E+02 | Ah/kg |
| Stainless steel density | 8.00E+03 | kg/m^3 | Frame area on air electrode | 2.90E−03 | m^2 | Anode nominal potential vs. Hg/HgO | −8.50E−01 | V |
| Aluminum density | 2.70E+03 | kg/m^3 | Active area, 2 sides | 3.42E−02 | m^2 | Anode thickness | 2.20E−03 | m |
| Nickel mesh density | 2.50E+02 | kg/m^3 | Frame volume | 1.15E−05 | m^3 | Cell nominal potential | 7.06E−01 | V |
| Cell Width | 2.00E−01 | m | Whole cell volume | 2.33E−04 | m^3 | Corresponding anode C-rate | 3.16E−01 | 1/h |
| Cell Length | 1.00E−01 | m | Frame weight | 1.03E−02 | kg | Corresponding cell current | 4.45E+01 | A |
| Frame width | 5.00E−03 | m | Cathode weight | 8.00E−02 | kg | Cell Power | 3.14E+01 | W |
| Cathode thickness | 5.00E−04 | m | Anode weight | 3.52E−01 | kg | Cell theoretical capacity | 1.41E+02 | Ah |
| Anode thickness | 2.20E−03 | m | Aux electrode weight | 2.50E−03 | kg | Cell nominal energy | 9.94E+01 | Wh |
| Aux electrode thickness | 5.00E−04 | m | Cell total weight w/o KOH | 4.45E−01 | kg | Specific energy | 2.07E+02 | Wh/kg |
| Separator thickness | 1.20E−04 | m | Cell total weight w/KOH | 4.81E−01 | kg | Volumetric energy | 4.27E+02 | Wh/L |
| Frame thickness | 1.00E−03 | m | | | | | | |
| Flow chn thickness | 2.92E−03 | m | | | | | | |
| Cooling thickness | 5.00E−04 | m | | | | | | |
| KOH to MH mass ratio | 2.05E−01 | g/g | | | | | | |

REFERENCES CORRESPONDING TO EXAMPLE 1A

1 Purushothaman, B. K. & Wainright, J. S. Analysis of Pressure Variations in a Low-Pressure Nickel-Hydrogen Battery—Part 2: Cells with Metal Hydride Storage. J. Power Sources 206, 421-428, doi:10.1016/j.jpowsour.2012.01.149 (2012).
2 "Electric Fuel Air Electrodes" http://electric-fuel.com/rd/zinc-air/air-electrode/(2015).

Example 2: Additional Data

In Examples 1 and 1A, we described why controlling the electrode potential of the metal hydride electrode is important, as deep discharge may lead to dissolution of vanadium into the electrolyte. This example shows that a very high discharge capacity may be obtained from the BCC metal hydride electrode by a deep discharge. Most of the capacity obtained in this case is irreversible due to the nature of vanadium dissolution in alkaline solutions. However, the ability for such a battery to provide more energy in emergency situations may be useful for certain applications. In such situations, the rechargeable metal hydride battery may be operated as a primary battery to obtain higher discharge capacity. In addition, certain system control parameters affect how the irreversible capacity can be extracted, such as charge per cycle, amount of electrolyte, continuous discharge versus intermittent discharge, etc.

Figure 17A:
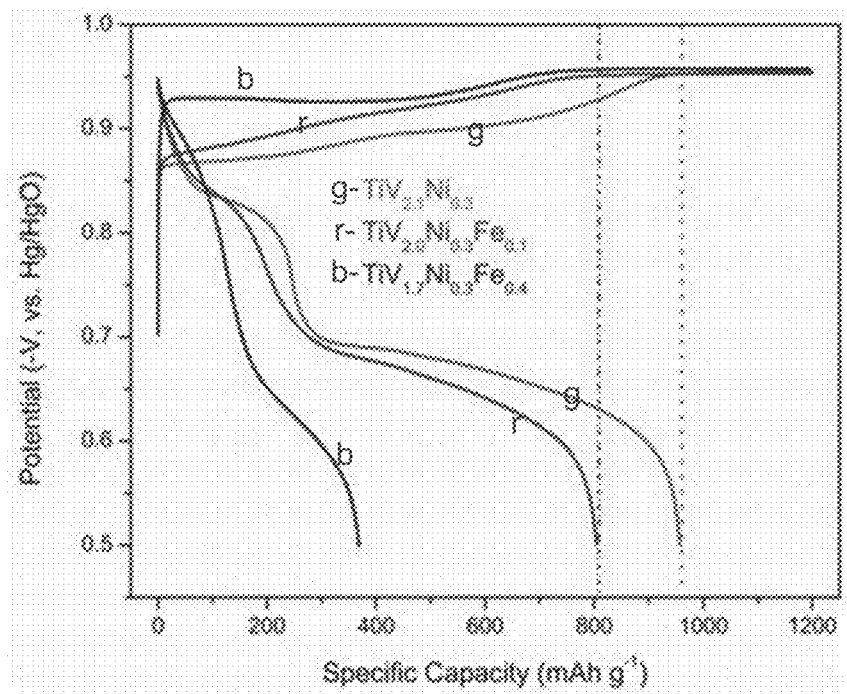
FIGS. 17A-17B. Negative electrode potential vs. discharge specific capacity for alloys having Ti—Ni or Ti—Ni—Fe. Deep discharge yields irreversible discharge capacities that are greater than respective reversible discharge capacities.
Figure 17B:
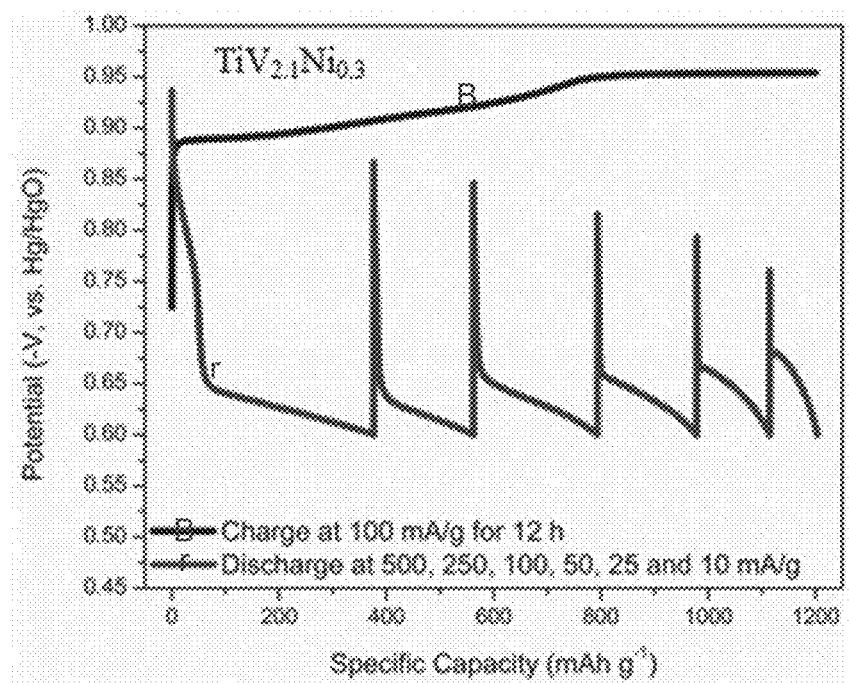

Referring to FIGS. 17A and 17B, deep discharge (discharge past −0.75 V) after the first charge shows very high initial discharge capacity, but all of the capacity obtained between −0.75 and −0.5 V are due to irreversible vanadium dissolution. Fe-substitution could significantly reduce material cost, but the energy density decreases with higher Fe concentration. Even higher capacity are obtained from multiple step discharge. FIG. 17B in particular shows intermittent discharge with 5 minutes rest period in between the discharge steps.

Cumulative discharge capacity can be controlled by charge per cycle and amount of electrolyte. Referring to FIGS. 18-21, this set of experiments explored the capacity fading over 10 cycles in a large 3-electrode cell (e.g., FIG. 20A) versus a much smaller syringe cell (e.g., FIG. 20B). Comparing the blue (triangles) and red (circles) curves in FIG. 18, it shows that the metal hydride electrodes were gradually activated in the syringe cell, whereas the capacity reaches the maximum at the second cycle and fades quickly afterwards in the 3-electrode cell.

Figure 18:
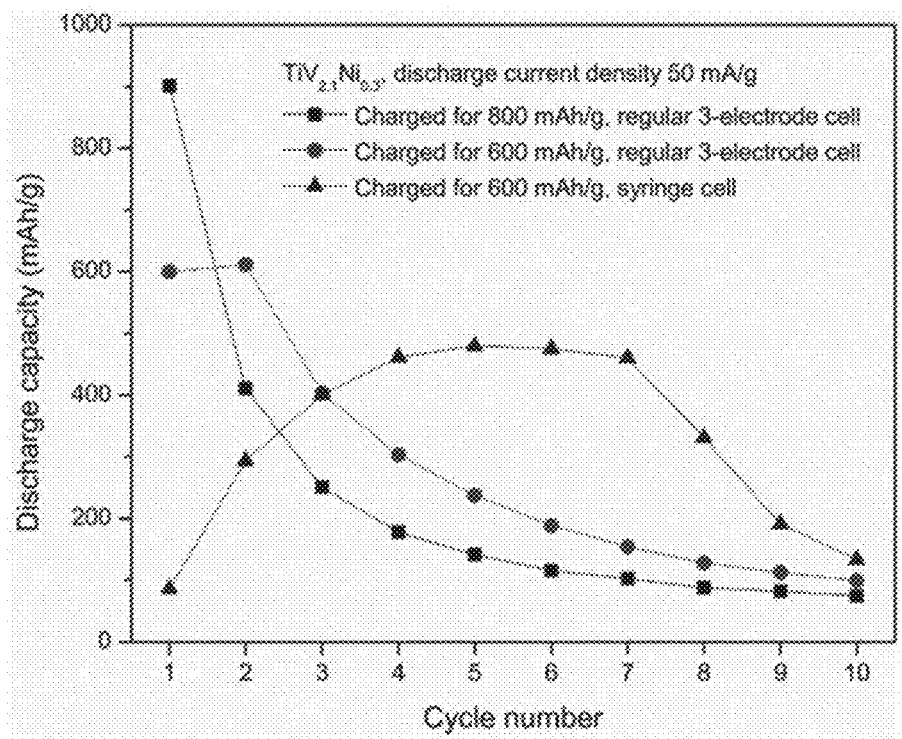
FIG. 18. Discharge capacity vs. cycle number of $TiV_{2.1}Ni_{0.3}$ electrode over 10 cycles demonstrating discharge-capacity fade under three different scenarios: the cell being charged to 800 mAh/g or 600 mAh/g and configured as demonstrated in FIG. 20A, for example, or the cell being charged to 600 mAh/g and configured in a syringe as demonstrated in FIG. 20B, for example.

The capacity fade behavior can be further controlled by adjusting the charge capacity (comparing black (squares) vs. red (circles) curves of FIG. 18). A larger charge capacity per cycle leads to higher initial discharge capacity and faster capacity fade over cycles.

Figure 19:
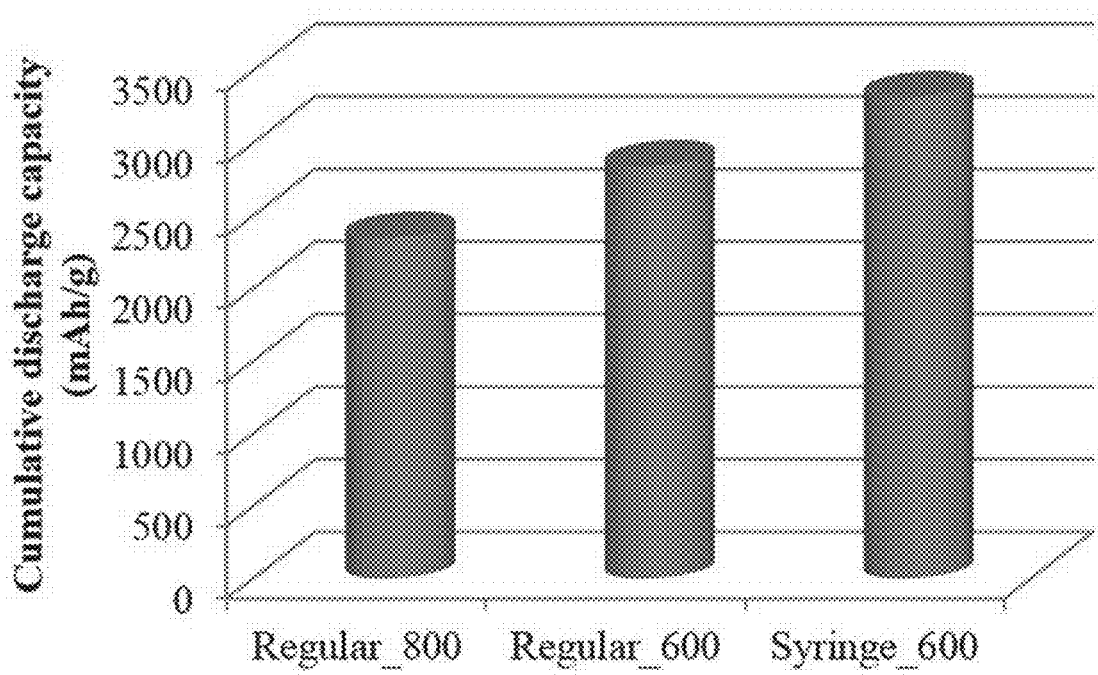
FIG. 19. Total discharge capacity of $TiV_{2.1}Ni_{0.3}$ electrode over 10 cycles corresponding to the three different scenarios of FIG. 18.
Figure 20A:
FIG. 20A. An exemplary electrochemical cell configuration, having 3-electrodes (positive, negative, and reference) and 30 mL of electrolyte.
Figure 20B:
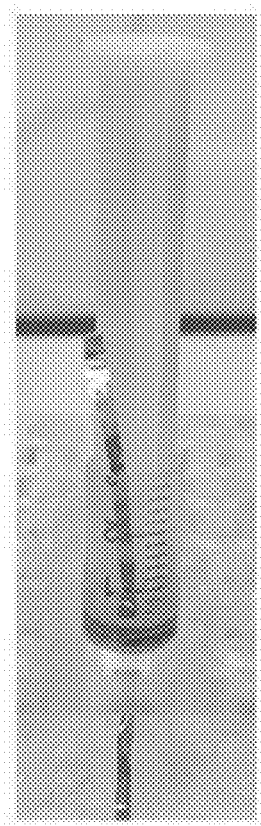
FIG. 20B. Electrochemical cell configured in a syringe with <0.5 mL of electrolyte.
Figure 21:
FIG. 21. Electrochemical cell configured in an exemplary button cell <0.1 mL electrolyte.

Overall, smaller amount of electrolyte and lower total charge per cycle increases the cumulative usable discharge capacity (see FIG. 19).

It should be noted that, in 7 M KOH, the oxygen solubility is $8 \times 10^{-5}$ M. It should be noted that the amount of oxygen is negligible in button cells (<0.1 mL electrolyte). Assuming electrolyte is saturated with oxygen upon cell assembly, amount of oxygen in the system is smaller than $0.8 \times 10^{-8}$ mol.

The 3-electrode cell (e.g., FIG. 20A) and syringe cell (e.g., FIG. 21) may be unsealed, in which case they have constant access to oxygen and thus have an equilibrium concentration of oxygen.

Examples of potential salt additives in KOH electrolyte that can enhance corrosion resistance of V-based metal hydride electrodes: $LiVO_3$, $NaVO_3$, $KVO_3$, $V_2O_3$, and other salts that dissolve into vanadate ions.

Example 3: High Capacity V-Based BCC Hydrogen Storage Alloys as Negative Electrodes for Aqueous Batteries with Modified Alkaline Electrolyte Background Aqueous metal hydride-air (MH-air) and metal hydride/nickel (MH/Ni) batteries could be safe alternatives to flammable Li-ion batteries. The energy density of the metal hydride material needs to be improved for such systems to be competitive in application areas such as electric vehicles. Higher energy density can be realized by developing high capacity MH electrode (>400 mAh/g), replacing commercially available $AB_5$-type alloy electrode (~300 mAh/g). V-based body-centered cubic (BCC) solid solution alloys could theoretically absorb 3.9 wt % of hydrogen (2 hydrogen per metal atom), which translates to an electrochemical capacity of 1050 mAh/g, 3 times higher than that of $AB_5$ alloys. Upon hydrogen absorption, the metal lattice undergoes BCC to BCT (V-VH) phase transformation, and subsequently BCT to FCC (VH-VH2) phase transformation.

Upon hydrogen desorption, the phase transformation is reversed, with the VH-V reaction requiring high temperatures up to 500 K in gas phase reactions. As a result of the stability of vanadium monohydride, the VH-V phase transformation has been generally thought to be too difficult to utilize in an electrochemical system, except for a few reports that attributed a lower second potential plateau to this reaction. Despite this ambiguity, even half of the theoretical capacity (~500 mAh/g) of V-based BCC alloy is significantly higher than that of $AB_5$ alloy.

The $TiV_{2.1}Ni_{0.3}$ alloy was discovered as a high capacity electrode material [Ref: Iwakura et al., J. Electrochem. Soc., 147 (2000) 2503]. It has a hydrogen plateau pressure of slightly lower than 1 atm and high hydrogen absorption capacity of 3.5 wt %. However, significant vanadium corrosion was found for this alloy and similar alloy compositions during cell cycling. Therefore, suppressing vanadium corrosion is essential if this alloy electrode is to find application in rechargeable batteries. Cr-substituted Ti—V—Ni alloys were developed with capacity reaching 450 mAh/g and much improved cycle life [Ref: Inoue et al., Electrochimica Acta (2012), 59, 23-31]. We believe that Cr suppresses corrosion by forming a surface regenerative oxide layer, similar to its role in stainless steel. However, a relatively large amount of Cr is required for long cycle life, which tends to reduce capacity and in some cases increases the plateau pressure to slightly above 1 atm, too high for a metal hydride electrode. The surface Cr oxide layer may also lower the kinetics by impeding charge transfer reaction at the alloy surface. Therefore, it is apparent that an alternative method that does not require Cr-substitution is preferred for the purpose of retaining high capacity, kinetics, and cycle stability.

Summary

Disclosed are systematic methods of controlling vanadium corrosion in aqueous rechargeable batteries using alkaline electrolyte, in order to achieve high capacity, rate capability, and cycle stability of V-based metal hydride electrodes. Specifically, we claim that any of the following three approaches could suppress vanadium corrosion in alkaline electrolytes: (1) operating V-based metal hydride electrodes in an oxygen-free system; (2) preventing oxygen from crossing over to the surface of the metal hydride electrode during cell operation and standing, i.e., employing an anion exchange membrane or a large volume of alkaline electrolyte; and/or (3) adding vanadate ions into the alkaline electrolyte.

Description.

(i) Vanadium corrosion contributes to high first cycle discharge capacity, which could be utilized for a primary (non-rechargeable) battery electrode.

Figure 22:
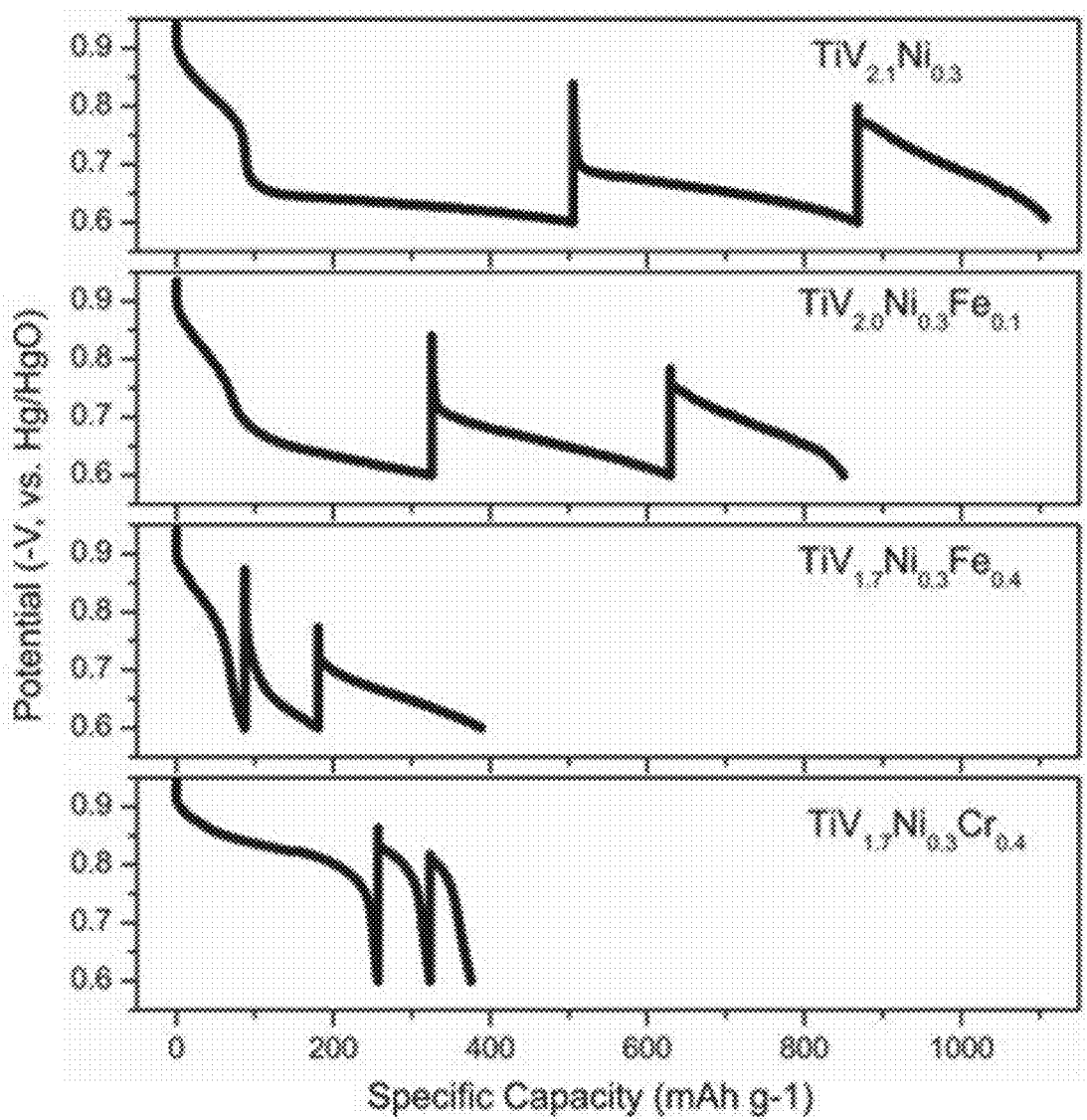
FIG. 22. Discharge curve of $TiV_{2.1-x}Ni_{0.3}M_x$, (M=Fe or Cr, x=0, 0.1 or 0.4) alloy electrodes.

FIG. 22 presents the discharge curves for $TiV_{2.1-x}Ni_{0.3}M_x$, (M=Fe or Cr, x=0, 0.1 or 0.4) alloys after charging at 100 mA/g for 8 hours. All cells were discharged by a 3 step procedure of +167 mA/g, +50 mA/g, +10 mA/g. The discharge capacity decreases with increasing Fe or Cr content. The $TiV_{2.1}Ni_{0.3}$ alloy electrode shows a much higher discharge capacity (~1100 mAh/g) compared to charge (800 mAh/g), which indicates side reactions other than the primary hydrogen desorption reaction from the metal lattice.

Figure 23:
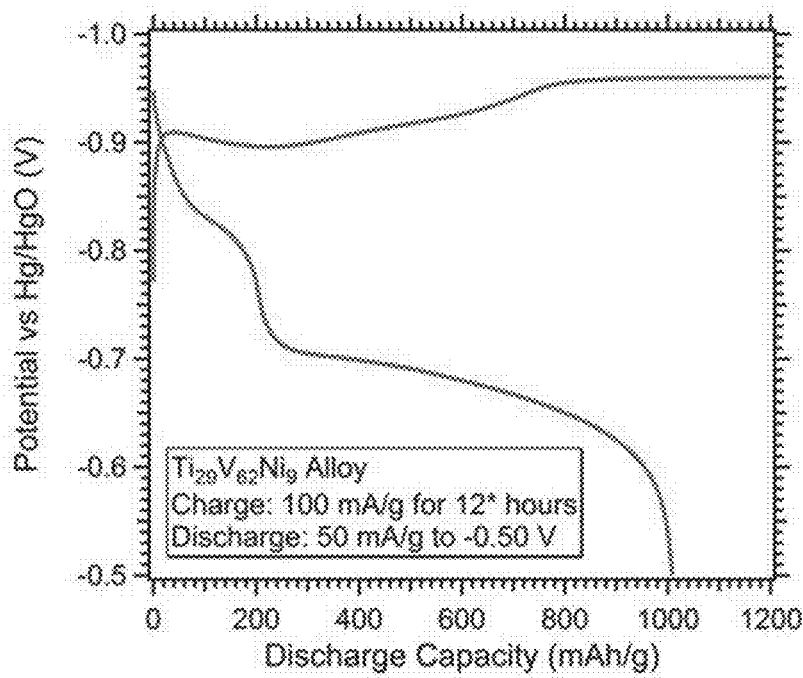
FIG. 23. First cycle charge and discharge curves for $TiV_{2.1}Ni_{0.3}$ alloy electrode.

FIG. 23 presents the charge/discharge curve with a single-step discharge process at 50 mA/g. The second potential plateau locates at around −0.7 V vs. Hg/HgO.

Figure 24:
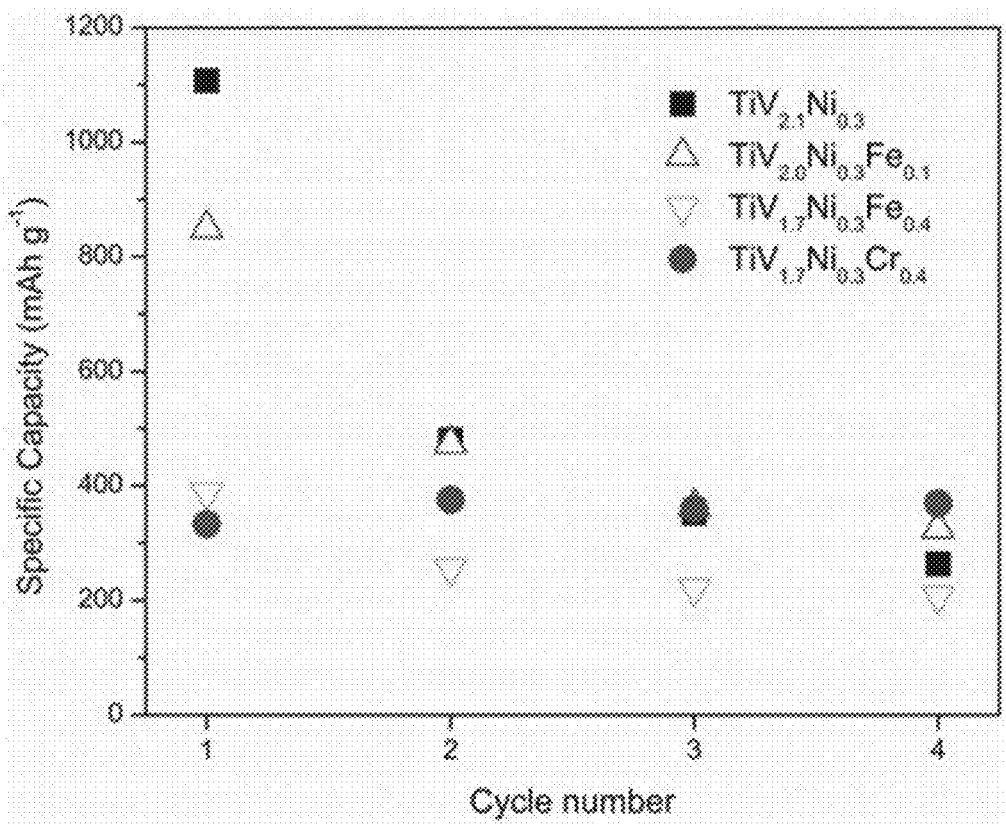
FIG. 24. Discharge capacity of $TiV_{2.1-x}Ni_{0.3}M_x$, (M=Fe or Cr, x=0, 0.1 or 0.4) alloy electrodes for the first four cycles.

FIG. 24 shows the discharge capacity in the first four cycles for the $TiV_{2.1}Ni_{0.3}$, $TiV_{2.0}Ni_{0.3}Fe_{0.1}$, $TiV_{1.7}Ni_{0.3}Fe_{0.4}$ and $TiV_{1.7}Ni_{0.3}Cr_{0.4}$ alloy electrodes. It can be seen that only the Cr-substituted alloys show good capacity retention.

Figure 25:
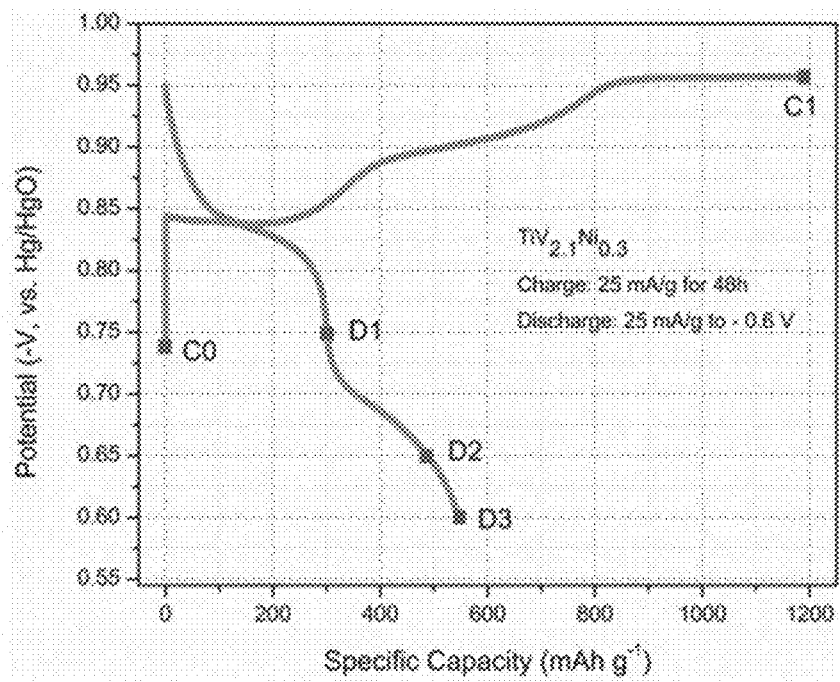
FIG. 25. Small current charge/discharge curve for preparing ex-situ XRD samples.
Figure 26:
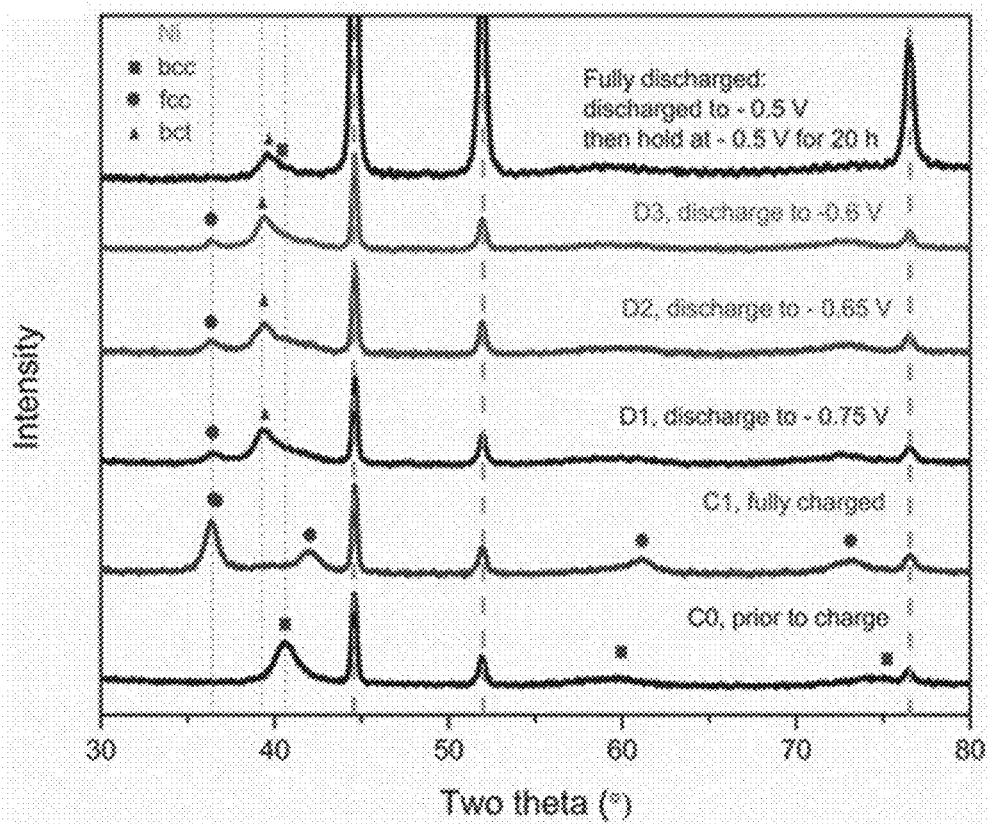
FIG. 26. Ex-situ XRD patterns of $TiV_{2.1}Ni_{0.3}$ electrode powder prepared at various SOC %.

To understand the reactions at the two discharge voltage plateaus, ex-situ XRD samples were prepared at various states of charge (SOC) during charge and discharge. FIG. 25 shows the charge/discharge curve for preparing these samples. The electrodes used in this experiment were prepared by mixing the $TiV_{2.1}Ni_{0.3}$ metal hydride with 20% Ni, instead of 300% for all other tests. Changing the electrode mixture improves the signal-to-noise ratio of the diffraction patterns, but also reduces charge/discharge kinetics. As a result, the discharge capacity is around 600 mAh/g, less than that obtained with electrodes prepared by mixing with 300% Ni powder (FIG. 22). Nevertheless, the features of the discharge curve are similar. FIG. 26 clearly shows the phase transformation from BCC to FCC after a full charge. XRD results show a mixture of FCC and BCT phases at the end of the first discharge plateau. From D1 to D3 these phases persist, indicating that the second plateau may be a combination of dehydriding and corrosion. The discharge capacity was lower than expected so another cell with an electrode prepared by mixing with 300% Ni powder was assembled and cycled to full discharge. This fully discharged electrode shows a single diffraction peak corresponding to the BCT phase, which appears to the right of the BCT peak at D3. This result may indicate that part of the capacity from the $2^{nd}$ potential plateau comes from BCT-BCC phase transformation. It is also possible that vanadium corrosion leads to vanadium dissolution in alkaline solution, thus changing the composition of the Ti—V—Ni alloy. Nevertheless, the phase transformation of FCC-BCT-BCC assisted by corrosion leads to high capacity and has not been reported before.

The extremely high discharge capacity we discovered may be utilized for a primary battery. FIG. 22 shows that small amounts of Fe-substitution are possible without significantly reducing the capacity, indicating that a ferrovanadium master alloy may be used to lower the cost of the electrode material.

(ii) Eliminating Oxygen to Improve Cyclability

Figure 27:
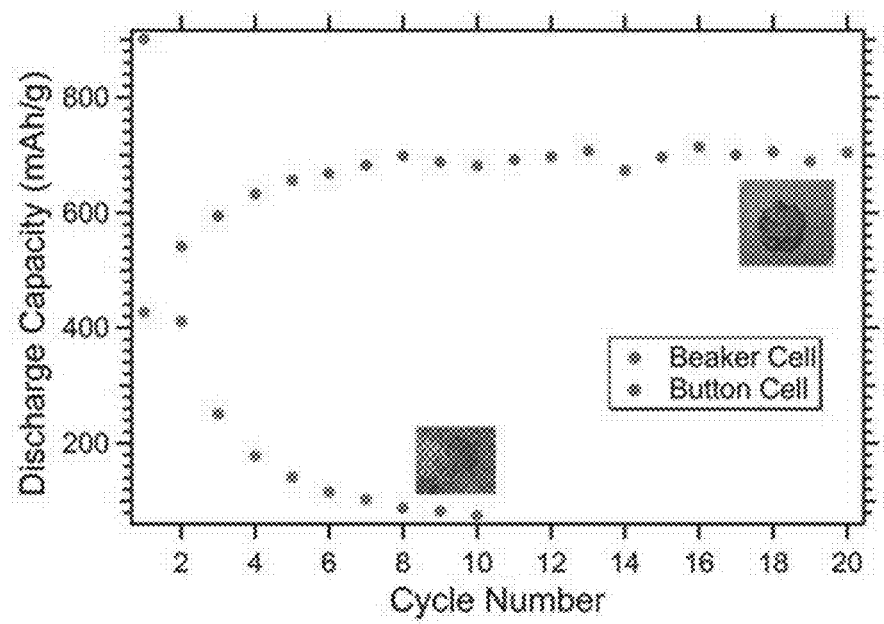
FIG. 27. Discharge capacity versus cycle number of an electrochemical cell configured as button cell and an electrochemical cell configured in a beaker.
Figure 28:
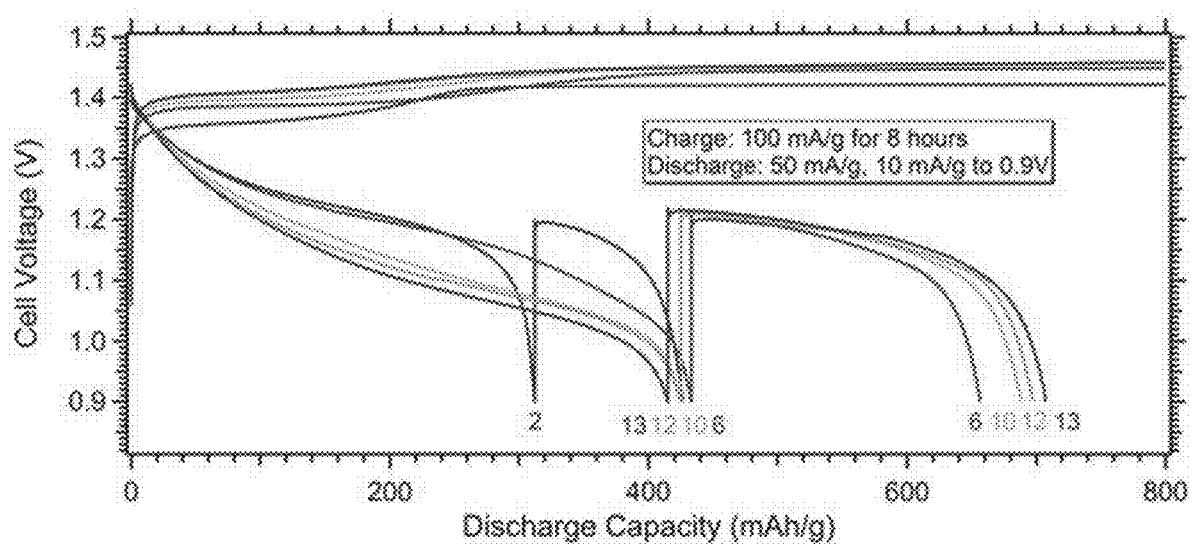
FIG. 28. Charge-discharge profiles of $TiV_{2.1}Ni_{0.3}$ electrodes in button cells.

It was discovered that vanadium corrosion in alkaline media takes place by interaction with oxygen [Ref: Al-Kharafi et al., Electrochimica Acta, 42 (1997) 579]. Therefore eliminating oxygen in the cell should theoretically enable stable cycling of Ti—V—Ni alloy electrode without Cr-substitution. In this section, we use sealed button cells to demonstrate good cycle stability of $TiV_{2.1}Ni_{0.3}$ electrodes (FIG. 27). The amount of oxygen present in the cell is dramatically reduced by using button cells with <0.1 mL of KOH electrolyte. These button cells show improved cycle stability and discharge at a single voltage plateau region (FIG. 28). Due to the MH limited cell design, overcharging produces $H_2$ gas. This additional hydrogen in the system may contribute extra capacity during discharge. Reduced corrosion is evident by visual inspection of the cycled electrodes.

This finding demonstrates the importance of protecting the metal hydride surface from reacting with oxygen. In MH-air systems, protection of the metal hydride electrode can be achieved by adding an anion exchange membrane on the top of the metal hydride electrode. The operation of MH-air batteries also requires high volume of concentrated alkaline electrolyte, which has low solubility of oxygen. In addition, the air electrode is designed to allow gas diffusion. Therefore, V-based metal hydride electrodes could function as high capacity negative electrodes in MH-air systems.

During overcharge of MH/Ni batteries, the metal hydride electrode is required to reduce oxygen from the positive electrode, so the pressure does not build up in the cell. For this reason, elimination of oxygen is not a viable option. In the next section, we discuss the addition of vanadate ions in alkaline solution to suppress vanadium corrosion.

(iii) Adding Vanadate Ions into Alkaline Electrolyte to Suppress Corrosion

The corrosion of vanadium in alkaline solution involves oxygen, and the corrosion product is vanadate ions dissolved in alkaline solution [Ref: Liu et al., Electrochimica Acta, 76 (2012) 262]. It is therefore possible that adding vanadate ions into the alkaline electrolyte may shift the chemical equilibrium to the left. When the corrosion reaction is suppressed, oxygen is expected to be reduced at the electrode surface with hydrogen and form $H_2O$.

Figure 29:
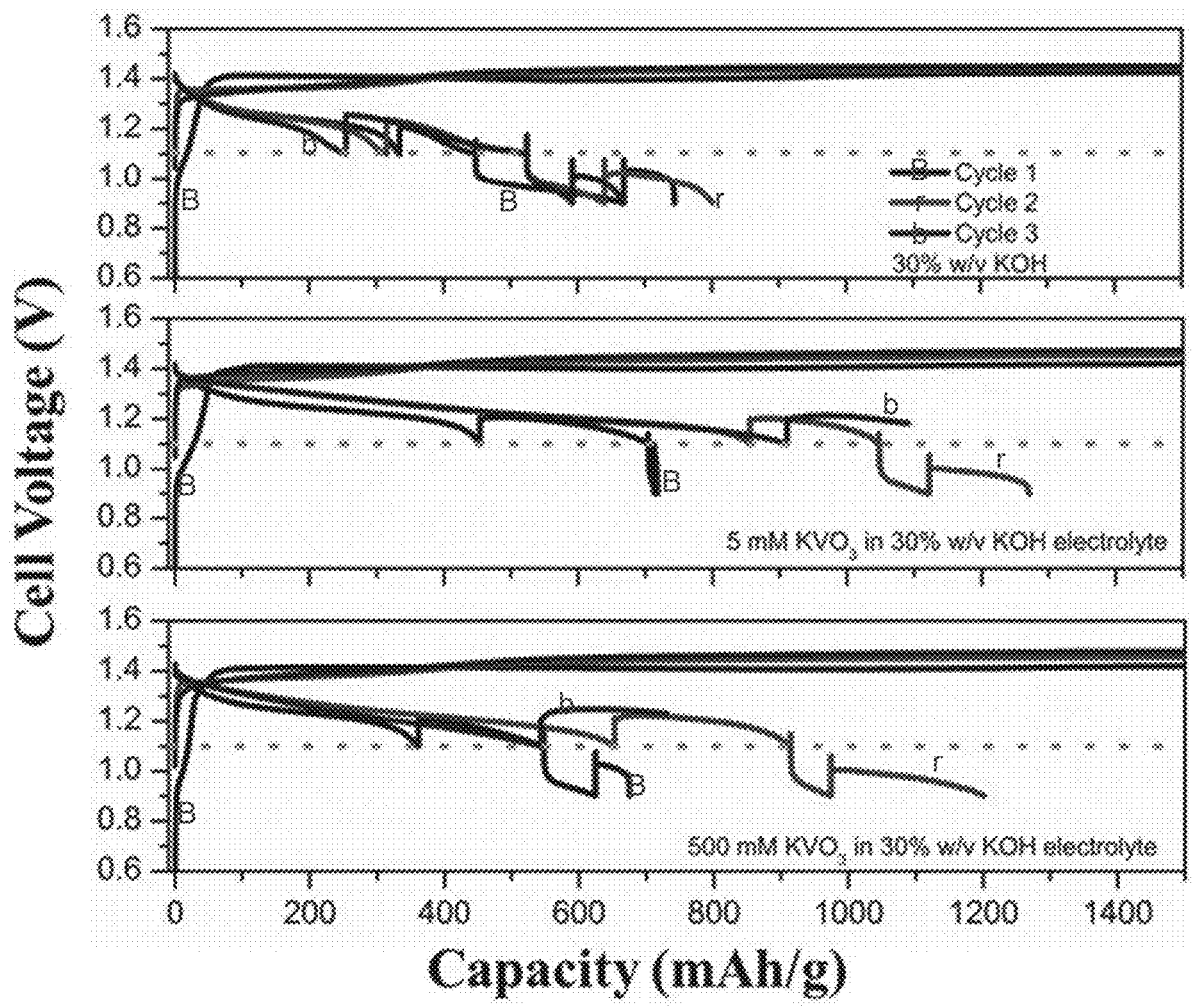
FIG. 29. Charge/discharge curves of $TiV_{2.1}Ni_{0.3}$ electrodes with $KVO_3$-added KOH electrolyte.

FIG. 29 shows the charge/discharge curves of $TiV_{2.1}Ni_{0.3}$ electrodes with $KVO_3$-added KOH electrolyte. These electrodes were charged for 1500 mAh/g, and discharged at 50 and 10 mA/g to 1.1 V first, and then 0.9 V. The purpose of the multistep discharge is to separate the capacity that is obtainable during high current, high operation voltage to the total useable capacity. The charge capacity is higher than the theoretical capacity of $TiV_{2.1}Ni_{0.3}$ alloy, therefore some gas phase hydrogen is expected to exist in the button cell. FIG. 29 clearly shows that the electrochemical performance of $TiV_{2.1}Ni_{0.3}$ electrode is greatly improved in $KVO_3$-added KOH electrolyte. With 5 mM $KVO_3$-added KOH solution, the $TiV_{2.1}Ni_{0.3}$ electrode shows the highest discharge capacity of 1300 mAh/g (including gas phase hydrogen). More importantly, most of the capacity was obtained from a high current discharge step cut-off at high cell voltage (1.1 V).

Figure 30:
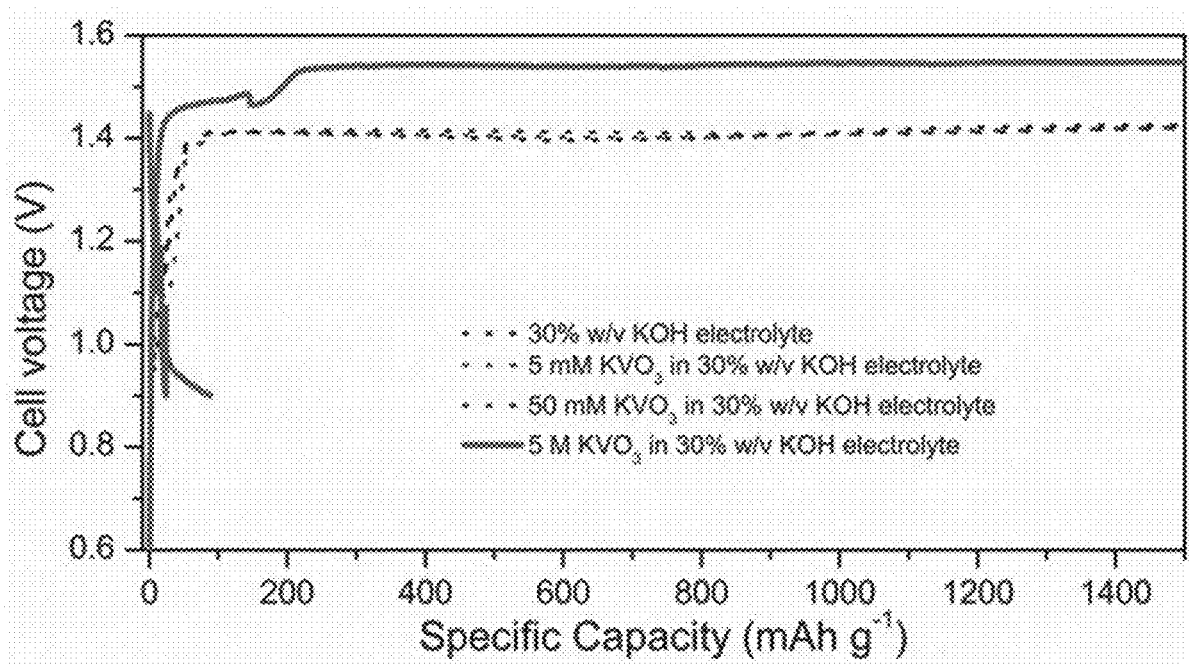
FIG. 30. Charge/discharge curves of $TiV_{2.1}Ni_{0.3}$ electrodes with 0, 5, 50 and 5000 mM $KVO_3$-added KOH electrolyte.

Further increase of vanadate ion concentration is not beneficial, probably because it increases electrolyte viscosity and impedes ion movement. When the concentration of $KVO_3$ reaches 5 M, the charging voltage is very high (>1.5 V) and no discharge capacity was observed above 1.1 V (FIG. 30). As a result, there appears to be an optimal concentration range of vanadate ion in the range of 5 mM to 500 mM.

Based on FIGS. 28 and 29, V-based metal hydride electrodes can also be operated with a tank of hydrogen gas, or a metal hydride bed which is not in contact with the electrolyte, both approaches supplying extra hydrogen and thus greatly increasing the energy density of the cell.

In summary, our inventions could enable high capacity V-based BCC metal hydride electrodes to be used in the following scenarios:

A primary (non-rechargeable) battery with the metal hydride electrode of capacity exceeding 1000 mAh/g. The high capacity comes from the FCC-BCT-BCC phase transformations during hydrogen desorption from the V-based alloys, and partly from vanadium corrosion. Because of the nature of corrosion, electrolyte may be separated from the cell, and injected at the time of service.

Cr-containing V-based metal hydride alloys could be used as the negative electrodes for existing design of MH/Ni and MH/air batteries.

Cr-free metal hydride alloys with high capacity and kinetics could be used as the negative electrodes for MH/air batteries, provided that oxygen crossover to the surface of the negative electrodes is suppressed. This can be achieved by placing a anion exchange membrane which blocks oxygen, or utilize a high volume of alkaline electrolyte, or a combination of both approaches.

Cr-free metal hydride alloys with high capacity and kinetics could be used as the negative electrodes for MH/air and MH/Ni batteries, provided that a certain concentration of vanadate ions exist in the alkaline solution. This method may be combined with method (3) to provide the optimal results in terms of cycle stability.

V-based metal hydride electrode could be used in combination with a hydrogen gas tank or a metal hydride bed that is separated from the electrolyte. Both additional devices could supply and store extra hydrogen during cell operation, thus dramatically improving the energy density of the cell.

V-based metal hydride could be used as the metal hydride bed, separated from the electrolyte. In this case, the electrodes may be fabricated by other types of metal hydride alloys. For example, an $AB_5$-type metal hydride electrode with high rate capability combined with high capacity V-based metal hydride bed may greatly improves the energy and power density of the cell.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrochemical cell, the electrochemical cell comprising:
   a. a positive electrode;
   b. a negative electrode, said negative electrode having an alloy;
      i. wherein said alloy has a composition comprising V; and
   c. an electrolyte;
      i. wherein an additive is provided in said electrolyte to form primary vanadate ions upon dissociation of said additive in said electrolyte; and
   wherein said electrochemical cell is a metal hydride battery.

2. An electrochemical cell, the electrochemical cell comprising:
   a. a positive electrode;
   b. a negative electrode, said negative electrode having an alloy that is configured to sorb hydrogen during charging of said electrochemical cell and desorb hydrogen during discharging of said electrochemical cell;
      i. wherein said alloy has a composition comprising V and Cr; and
   c. an electrolyte;
      i. wherein an additive is provided in said electrolyte to form primary vanadate ions upon dissociation of said additive in said electrolyte.

3. An electrochemical cell, the electrochemical cell comprising:
   a. a positive electrode;
   b. a negative electrode, said negative electrode having an alloy that is configured to sorb hydrogen during charging of said electrochemical cell and desorb hydrogen during discharging of said electrochemical cell;
      i. wherein said alloy has a composition comprising V and Cr; and
   c. an electrolyte;
      i. wherein said electrolyte has a pH selected from the range of 13 to 15.

4. The electrochemical cell of claim 1, wherein said electrolyte has a pH selected from the range of 13 to 15.

5. The electrochemical cell of claim 1, wherein said alloy is configured to sorb hydrogen during charging of said electrochemical cell and desorb hydrogen during discharging of said electrochemical cell.

6. The electrochemical cell of claim 1, wherein a concentration of said primary vanadate ions in said electrolyte is selected from the range of 5 mM to 500 mM.

7. The electrochemical cell of claim 1, wherein said vanadate ions are $VO_4^{3-}$ ions.

8. The electrochemical cell of claim 1, wherein said additive is selected from the group consisting of $V_2O_3$, $V_2O_5$, V, $KVSO_4$, $Fe(VO_2)_3$, a salt having $VO_3^-$, and any combination thereof.

9. The electrochemical cell of claim 1, wherein said primary vanadate ions provide for a discharge-capacity stability increase of at least 300% at 200 cycles compared to an otherwise equivalent electrochemical cell free of said primary vanadate ions.

10. The electrochemical cell of claim 1, wherein said alloy composition comprises V, Cr, and at least one of Ti, Ni, Fe, Co, and Zr.

11. The electrochemical cell of claim 1, wherein said alloy composition has the formula $TiV_{2.1-x}Ni_{0.3}(Cr_yM_{1-y})_x$, where M is Fe, Co, or Zr, y is greater than 0 and less than or equal to 1, and x is greater than 0 and equal to or less than 0.4; or wherein said alloy composition has the formula $Ti_{29}V_{62-x}Ni_9(Cr_yM_{1-y})_x$, where M is Fe, Co, or Zr, y is greater than 0 and less than or equal to 1, and x is greater than 0 and equal to or less than 12.

12. The electrochemical cell of claim 1, wherein said alloy has a face centered cubic (FCC) crystal structure, a body center tetragonal (BCT) crystal structure, a body centered cubic (BCC) crystal structure, or a combination of these, during charging and discharging of said electrochemical cell.

13. The electrochemical cell of claim 1, wherein said alloy has a combination of FCC crystal structure and BCT crystal structure during charging and discharging of said electrochemical cell; wherein a fraction of said alloy having said FCC crystal structure during charging of said electrochemical cell is greater than said fraction during discharging of said electrochemical cell; and wherein a fraction of said alloy having said BCT crystal structure during discharging of said electrochemical cell is greater than said fraction during charging of said electrochemical cell.

14. The electrochemical cell of claim 1, wherein a ratio of H to V in said alloy is selected from the range of 0.2 to 2 during charging and discharging of said electrochemical cell; or wherein a maximum hydrogen absorption capacity of said alloy is selected from the range of 2.8 mass % and 3.2 mass %.

15. The electrochemical cell of claim 1, wherein said electrochemical cell has a discharge-capacity fade of less than or equal to 15% at 200 cycles.

16. The electrochemical cell of claim 1, wherein said electrochemical cell has a reversible discharge capacity of at least 400 mAh/g at 200 cycles.

17. The electrochemical cell of claim 1, wherein said electrochemical cell has an irreversible discharge capacity of at least 800 mAh/g.

18. The electrochemical cell of claim 1, further comprising a circuit configured to apply a cell cut-off voltage to said electrochemical cell during discharge of said electrochemical cell; wherein said cell cut-off voltage is 1.10 V.

19. The electrochemical cell of claim 1, further comprising a circuit configured to apply an electrode cut-off potential to said electrochemical cell during discharge of said electrochemical cell; wherein said electrode cut-off potential is selected from the range equivalent to −0.65 V to −0.75 V vs. Hg/HgO reference electrode in said electrolyte having a pH in the range of 14 to 15.

20. The electrochemical cell of claim 1, wherein a concentration of dissolved oxygen gas in said electrolyte is less than $1.10^{-4}$ M.

21. The electrochemical cell of claim 1, wherein a ratio of amount of V in said alloy to amount of dissolved oxygen gas in said electrolyte is selected from the range of 60 to 80.

22. The electrochemical cell of claim 1, wherein said positive electrode comprises nickel.

23. The electrochemical cell of claim 1, wherein said negative electrode is isolated from ambient air by one or more materials that are substantially impermeable to dissolved oxygen gas.

24. The electrochemical cell of claim 23, further comprising a membrane, said membrane being permeable to anions present in said electrochemical cell and being substantially impermeable to dissolved oxygen gas; wherein said membrane is positioned between said negative electrode and ambient air, between said negative electrode and said positive electrode, both between said negative electrode and both ambient air and said positive electrode.

25. The electrochemical cell of claim 23, wherein said positive electrode is an air electrode.

26. A method for operating an electrochemical cell, the method comprising steps of:
  a. providing an electrochemical cell, the electrochemical cell comprising:
    i. positive electrode;
    ii. a negative electrode, said negative electrode having an alloy that is configured to sorb hydrogen during charging of said electrochemical cell and desorb hydrogen during discharging of said electrochemical cell;
      A. wherein said alloy has a composition comprising V; and
    iii. an electrolyte;
      A. wherein an additive is provided in said electrolyte to form primary vanadate ions upon dissociation of said additive in said electrolyte; and
  b. applying a cell cut-off voltage to said electrochemical cell during discharge of said electrochemical cell; or
  c. applying an electrode cut-off potential to said electrochemical cell during discharge of said electrochemical cell.

27. A method for forming an electrochemical cell, the method comprising steps of:
  a. providing an electrochemical cell, the electrochemical cell comprising:
    i. a positive electrode;
    ii. a negative electrode, said negative electrode having an alloy;
      A. wherein said alloy has a composition comprising V; and
    iii. an electrolyte;
  b. providing an additive in said electrolyte to form primary vanadate ions upon dissociation of said additive in said electrolyte; and
  wherein said electrochemical cell is a metal hydride battery.

28. A method for forming an electrochemical cell, the method comprising steps of:
  a. providing an electrochemical cell, the electrochemical cell comprising:
    i. a positive electrode;
    ii. a negative electrode, said negative electrode having an alloy that is configured to sorb hydrogen during charging of said electrochemical cell and desorb hydrogen during discharging of said electrochemical cell;
  A. wherein said alloy has a composition comprising V and Cr; and
 iii. an electrolyte;
b. providing an additive in said electrolyte to form primary vanadate ions upon dissociation of said additive in said electrolyte; and
wherein said electrochemical cell is a metal hydride battery.

29. A method for forming an electrochemical cell, the method comprising steps of:
a. providing an electrochemical cell, the electrochemical cell comprising:
 i. a positive electrode;
 ii. a negative electrode, said negative electrode having an alloy that is configured to sorb hydrogen during charging of said electrochemical cell and desorb hydrogen during discharging of said electrochemical cell;
   A. wherein said alloy has a composition comprising V and Cr; and
 iii. an electrolyte;
   A. wherein said electrolyte has a pH selected from the range of 13 to 15.

* * * * *